United States Patent
Taguchi et al.

(10) Patent No.: US 7,048,789 B2
(45) Date of Patent: *May 23, 2006

(54) INKJET INK, INK SET AND INKJET RECORDING METHOD

(75) Inventors: Toshiki Taguchi, Shizuoka (JP); Manabu Ogawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,452

(22) Filed: Mar. 23, 2004

(65) Prior Publication Data

US 2004/0189765 A1    Sep. 30, 2004

(30) Foreign Application Priority Data

Mar. 24, 2003  (JP)  ............ P.2003-080677
Mar. 24, 2003  (JP)  ............ P.2003-080828

(51) Int. Cl.
*C09D 11/02*  (2006.01)

(52) U.S. Cl. ............ 106/31.43; 106/31.47; 106/31.49; 106/31.58; 106/31.59

(58) Field of Classification Search ............ 106/31.43, 106/31.47, 31.49, 31.58, 31.59; 347/100
See application file for complete search history.

(56) References Cited

U.S. PATENT DOCUMENTS

| | | | |
|---|---|---|---|
| 5,540,765 A | 7/1996 | Gundlach et al. | |
| 5,973,026 A | 10/1999 | Burns et al. | |
| 5,980,623 A * | 11/1999 | Hiraoka et al. | 106/31.49 |
| 6,039,793 A * | 3/2000 | Gundlach et al. | 106/31.28 |
| 6,923,854 B1 * | 8/2005 | Taguchi et al. | 106/31.43 |
| 2004/0011248 A1 * | 1/2004 | Taguchi et al. | 106/31.28 |
| 2004/0055508 A1 * | 3/2004 | Miyamoto et al. | 106/31.47 |
| 2004/0080595 A1 * | 4/2004 | Taguchi et al. | 347/100 |
| 2004/0194660 A1 * | 10/2004 | Taguchi et al. | 106/31.43 |
| 2004/0200385 A1 * | 10/2004 | Taguchi et al. | 106/31.43 |
| 2005/0001890 A1 * | 1/2005 | Taguchi et al. | 347/100 |
| 2005/0178288 A1 * | 8/2005 | Taguchi et al. | 106/31.13 |

FOREIGN PATENT DOCUMENTS

| | | |
|---|---|---|
| EP | 1 375 608 A1 | 1/2004 |
| EP | 1 378 550 A1 | 1/2004 |
| EP | 001473336 A1 * | 11/2004 |
| JP | 2004-26900 A | 1/2004 |
| WO | WO 03/066756 A1 | 8/2003 |

OTHER PUBLICATIONS

Patent Abstracts of Japan, 3 277671, vol. 0160, No. 98 Dec. 1991.
Patent Abstracts of Japan, 2000 135854, vol. 2000, No. 8 May 2000.
European Search Report dated Jul. 7, 2004.

* cited by examiner

*Primary Examiner*—Helene Klemanski
(74) *Attorney, Agent, or Firm*—Sughrue Mion, PLLC

(57) ABSTRACT

An ink containing a water, a water-soluble organic solvent, a dye, and a betaine compound, which optionally further contains a nonionic surfactant or at least one another betaine compound.

12 Claims, No Drawings

INKJET INK, INK SET AND INKJET RECORDING METHOD

FIELD OF THE INVENTION

This invention relates to inkjet inks, ink sets and an inkjet recording method whereby a high durability of an image and excellent image qualities in a high density part can be established under highly humid conditions.

BACKGROUND OF THE INVENTION

With the recent diffusion of computers, inkjet printers have been widely employed in printing on papers, films, fabrics and so on not only in offices but also in homes.

Inkjet recording methods include a system of jetting ink droplets under pressurization with the use of a piezo device, a system of foaming an ink by heating and thus jetting ink droplets, a system using ultrasonic wave, and a system of electrostatically sucking and jetting ink droplets. As ink compositions for inkjet recording by these systems, use is made of water-base inks, oil-base inks or solid (molten) inks. Among these inks, water-base inks are mainly employed from the viewpoints of production, handling properties, odor, safety and so on.

Requirements for a coloring agent to be used in these inkjet recording inks are as follows: being highly soluble in solvents, enabling high density recording, having a favorable color hue, having high fastness to light, heat, air, water and chemicals, having favorable fixation properties on an image receiving material with little bleeding, being excellent in storage properties as an ink, having no toxicity, having a high purity, and being available at a low cost. However, it is highly difficult to search for a coloring agent satisfying these requirements at a high level. Although various dyes and pigments have been already proposed and practically employed in inkjet recording, no coloring agent satisfying all of the above requirements has been found out yet. Using well known dyes and pigments typified by those having color indexes (C.I.) assigned thereto, it is highly difficult to satisfy both of such color hue and fastness as required in inkjet recording inks. Investigations have been made on dyes having favorable color hue and high fastness to develop excellent coloring agents for inkjet printing. However, it is unavoidable that a compound usable as a water-soluble dye has water-soluble substituents. There has been found out a problem that in the case of increasing the number of these water-soluble substituents in order to improve the stability of an ink, the resultant image is liable to bleed under highly humid conditions.

The present inventor has found out that use of a betaine compound is efficacious in overcoming this bleeding phenomenon.

In the case of using such a betaine compound alone, however, it is revealed that the bleeding can be relived but deposition of a color material arises in a high-density part and the thus formed image frequently suffers from bronzing.

SUMMARY OF THE INVENTION

The problem that the invention is to solve is to provide inkjet inks showing little bleeding even under highly humid conditions, ink sets and an inkjet recording method.

The problem of the invention has been solved by providing the inkjet inks, ink set and inkjet printing method 1) to 5) as will be described hereinafter.

1) An inkjet ink containing at least water, a water-soluble organic solvent and a dye characterized in that the ink contains at least one betaine compound and at least one nonionic surfactant.

2) An inkjet ink according to the above 1) characterized in that the betaine compound is a compound represented by the following formula (1).

formula (1)

In this formula, R represents a hydrogen atom, an alkyl group, an aryl group or a heterocyclic group. L represents a divalent linking group. M represents a hydrogen atom, an alkali metal atom, an ammonium group, a protonated organic amine- or nitrogen-containing heterocyclic group or a quaternary ammonium ion group and, in the case where it serves as the counter ion of an ammonium ion comprising the N atom in the formula, it represents a group not occurring as a cation (in the case where when p+r is 4, one of Ms is not present). q is an integer of 1 or more and r is an integer of from 1 to 4. k is an integer of from 0 to 4 and m is an integer of 1 or more. p is an integer of from 0 to 4, provided that p+r is 3 or 4. In the case where p+r is 4, the N atom is a protonated ammonium atom. In the case where m is 2 or more, L's may be either the same or different. In the case where q is 2 or more, COOM's may be either the same or different. In the case where r is 2 or more, $L^m$-$(COOM)_q$'s may be either the same or different. In the case where k is 2 or more, R's may be either the same or different. In the case where p is 2 or more, $R^k$'s may be either the same or different.

3) An inkjet ink according to the above 1) or 2) characterized in that the nonionic surfactant is a compound represented by any of the following formulae (2) to (4).

formula (2)

In the formula (2), $R_{21}$ represents an alkyl group having from 5 to 40 carbon atoms. $m^1$ represents the average number of ethylene oxide moles added which ranges from 2 to 40.

formula (3)

In the formula (3), $R_{22}$ represents an alkyl group having from 5 to 40 carbon atoms. $m^2$ represents the average number of ethylene oxide moles added which ranges from 2 to 40.

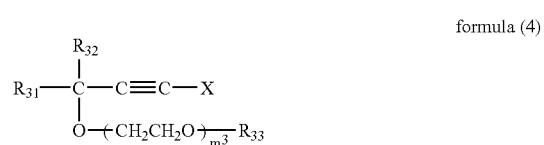

formula (4)

In the formula (4), $R_{31}$ and $R_{32}$ independently represent each an alkyl group having from 1 to 18 carbon atoms. $R_{33}$ represents a hydrogen atom, an alkyl group having from 1 to 6 carbon atoms or a phenyl group. X represents a hydrogen atom or

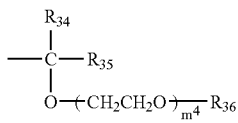

wherein $R_{34}$ and $R_{35}$ independently represent each an alkyl group having from 1 to 18 carbon atoms; $R_{36}$ represents a hydrogen atom, an alkyl group having from 1 to 6 carbon atoms or a phenyl group; and $m^3$ and $m^4$ represent each the average number of ethylene oxide moles added provided that $m^3+m^4$ is from 0 to 100.

In the case where $m^3$ is 0, $R_{33}$ represents a hydrogen atom. In the case where $m^4$ is 0, $R_{36}$ represents a hydrogen atom. In the case where X is a hydrogen atom, $m^3$ is from 1 to 100.

4) An ink set characterized by containing at least one of the inkjet inks according to the above 1) to 3).

5) An inkjet recording method characterized in that an image is recorded with an inkjet printer by using an ink according to any of the above 1) to 3) and/or an ink set according to the above 4).

6) An inkjet ink containing at least water, a water-soluble organic solvent, a dye and at least two betaine compounds.

7) An ink set characterized by containing at least one of the inkjet inks according to the above 6).

8) An inkjet recording method characterized in that an image is recorded with an inkjet printer by using an ink according to the above 6) and/or an ink set according to the above 7).

DETAILED DESCRIPTION OF THE INVENTION

Next, the invention will be described in greater detail.

The inkjet ink according to the invention has water, a water-soluble organic solvent, a coloring material, at least one betaine compound and at least one nonionic surfactant.

The term "betaine compound" as used herein is defined as a compound which has both of a cationic site and an anionic site in its molecule. Among such compounds, a surface active compound is preferred. Examples of the cationic site include an amine form nitrogen atom, a nitrogen atom in an aromatic heterocycle, a boron atom having 4 carbon-bonds, phosphorus atom and so on. Among them, an amine form nitrogen atom and a nitrogen atom in an aromatic heterocycle are preferred. A quaternary nitrogen atom is still preferable. Examples of the anionic site include a hydroxyl group, a thio group, a sulfonamido group, a sulfo group, a carboxyl group, an imido group, a phosphate group, a phosphonate group and so on. Among them, a carboxyl group and a sulfo group are preferable. Although the whole surfactant molecule may be cationically, anionically or neutrally charged, a neutral charge is preferable.

It is particularly preferable that the betaine compound to be used in the invention is a compound represented by the above formula (1).

In the formula (1), R represents a hydrogen atom, an alkyl group, an aryl group or a heterocyclic group. L represents a divalent linking group. M represents a hydrogen atom, an alkali metal atom, an ammonium group, a protonated organic amine- or nitrogen-containing heterocyclic group or a quaternary ammonium ion group and, in the case where it serves as the counter ion of an ammonium ion comprising the N atom in the formula, it represents a group not occurring as a cation. q is an integer of 1 or more, and r is an integer of from 1 to 4. k is an integer of from 0 to 4, and m is an integer of 1 or more. p is an integer of from 0 to 4, provided that p+r is 3 or 4. In the case where p+r is 4, the N atom is a protonated ammonium atom. In the case where m is 2 or more, L's may be either the same or different. In the case where q is 2 or more, COOM's may be either the same or different. In the case where r is 2 or more, $L^m$-$(COOM)_q$'s may be either the same or different. In the case where k is 2 or more, R's may be either the same or different. In the case where p is 2 or more, $R^k$'s may be either the same or different.

Among the compounds represented by the above formula (1) it is particularly preferable to employ a compound represented by the following formula (5) or (6) as the betaine compound to be used in the invention.

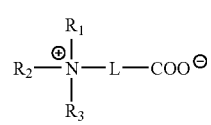

formula (5)

In the above formula, $R_1$ to $R_3$ represent each an alkyl group (optionally being substituted and preferably having from 1 to 20 carbon atoms, such as methyl group, ethyl group, propyl group, butyl group, hexyl group, octyl group, dodecyl group, cetyl group, sterayl group or oleyl group), an aryl group (optionally being substituted and preferably having from 6 to 20 carbon atoms, such as phenyl group, tolyl group, xylyl group, naphthyl group, cumyl group, dodecyl group or phenyl group), or a heterocyclic group (optionally being substituted and preferably having from 2 to 20 carbon atoms, such as pyridyl group or quinolyl group). $R_1$ to $R_3$ may be bonded together to from a cyclic structure. Among them, alkyl groups are particularly preferable. L represents a divalent linking group. Preferable examples thereof include divalent linking groups having an alkylene group or an arylene group as a fundamental constituting unit. It may contain a hetero atom such as an oxygen atom, a sulfur atom or a nitrogen atom in the main linking chain. $R_1$ to $R_3$ and L may have various substituents. Examples thereof include alkyl groups (preferably having from 1 to 20 carbon atoms, still preferably from 1 to 12 carbon atoms and particularly preferably from 1 to 8 carbon atoms, such as methyl, ethyl, iso-propyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and 3-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), amino groups (preferably having from 0 to 20 carbon atoms, still preferably from 0 to 12 carbon atoms and particularly preferably from 0 to 6 carbon atoms, such as amino, methylamino, dimethylamino, diethylamino, diphenylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-napthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyloxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methylthio and ethyltio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (such as fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms and still preferably from 1 to 12 carbon atoms and having, as a hetero atom, nitrogen atom, oxygen atom or sulfur atom, more specifically, imidazoyl, pyridyl, quinolyl, furyl, thienyl, piperidyl, morpholino, benzoxazolyl, benzoimidazolyl, benzothiazolyl, carbozolyl and azepinyl), silyl groups (preferably having from 3 to 40 carbon atoms, still preferably from 3 to 30 carbon atoms and particularly preferably from 3 to 24 carbon atoms, such as trimethylsilyl and triphenylsilyl) and so on. Such a substituent may be further substituted. In the case of having 2 or more substituents, these substituents may be either the same or different. If possible, these substituents may be bonded together to form a ring. Moreover, the compound may contain plural betaine structures via $R_1$ to $R_3$ or L.

The betaine compound to be used in the invention contains a group having 8 or more carbon atoms as at least one of $R_1$ to $R_3$ and L. A compound having long chain alkyl groups as $R_1$ to $R_3$ is particularly preferred.

$$(R)_p\text{-N-}[L^m\text{-}(COOM^1)_q]_r \quad \text{Formula (6)}$$

In the above formula, R, L, q, r, m and p have each the same meaning as defined in the formula (1). $M^1$ represents an alkali metal ion or a hydrogen atom, provided that p+r is 3. In the case where p is 2 or more, R's may be either the same or different.

Next, the formula (1) and the formula (6) will be described.

In these formulae, R represents an alkyl group (optionally substituted and preferably having from 1 to 20 carbon atoms such as methyl group, ethyl group, propyl group, butyl group, hexyl group, octyl group, dodecyl group, cetyl group, stearyl group or oleyl group), an aryl group (optionally substituted and preferably having from 6 to 20 carbon atoms such as phenyl group, tolyl group, xylyl group, naphthyl group, cumyl group or dodecylphenyl group) or a heterocyclic group (optionally substituted and preferably having from 2 to 20 carbon atoms such as pyridyl group and quinolyl group) and R's may be bonded to each other to form a cyclic structure. Among all, alkyl groups are particularly preferred.

L represents a divalent or higher linking group. As examples thereof, divalent or higher linking groups having an alkylene group or an arylene group as the fundamental constituting unit. It may have a hetero atom such as an oxygen atom, a sulfur atom or a nitrogen atom in the main linking chain.

R or L may have various substituents. Examples thereof include alkyl groups (preferably having from 1 to 20 carbon atoms, still preferably from 1 to 12 carbon atoms and particularly preferably from 1 to 8 carbon atoms, such as methyl, ethyl, iso-propyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and 3-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), amino groups (preferably having from 0 to 20 carbon atoms, still preferably from 0 to 12 carbon atoms and particularly preferably from 0 to 6 carbon atoms, such as amino, methylamino, dimethylamino, diethylamino, diphenylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-napthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyloxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methylthio and ethyltio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl) ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (such as fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms and still preferably from 1 to 12 carbon atoms and having, as a hetero atom, nitrogen atom, oxygen atom or sulfur atom, more specifically, imidazoyl, pyridyl, quinolyl, furyl, thienyl, piperidyl, morpholino, benzoxazolyl, benzoimidazolyl, benzothiazolyl, carbozolyl and azepinyl), silyl groups (preferably having from 3 to 40 carbon atoms, still preferably from 3 to 30 carbon atoms and particularly preferably from 3 to 24 carbon atoms, such as trimethylsilyl and triphenylisilyl) and so on. Such a substituent may be further substituted. In the case of having 2 or more substituents, these substituents may be either the same or different. If possible, these substituents may be bonded together to form a ring. Moreover, the compound may contain plural betaine structures via R or L.

M represents a hydrogen atom, an alkali metal cation (such as sodium ion, potassium ion, lithium ion or cesium ion), an ammonium ion, or an amine type organic cation (in the case of a primary to tertiary amine, a protonated one, such as protonated methylamine, dimethylamine, ethylamine, diethylamine, triethylamine, diazabicycloundecene, diazabicyclooctane, piperidine, pyrrolidine, morpholine, N-methylpyridine, N-methylmorpholine, pyridine, pyrazine, aniline or N,N-dimethylaniline; and in the case of a quaternary amine, for example, tetramethylammonium ion, tetraethylammonium ion, trimethylbenzylammonium ion, methylpyridinium ion, benzylpyridinium ion). Among all, an alkali metal ion or a hydrogen atom is preferable therefor.

q is an integer of 1 or more (preferably 5 or less and still preferably 5 or less). r is an integer of from 1 to 4 (preferably 1 or 2). k is an integer of from 0 to 4. m is an integer of 1 or more (preferably 4 or less and still preferably 1). p is an integer of from 0 to 4 (preferably 1 or 2) and p+r is 3 or 4. In the case where p+r is 4, the N atom serves as a quaternary ammonium cation while one of M's serves as a dissociated anion. In the case where m is 2 or more, L's may be either the same or different. In the case where q is 2 or more, COOM's may be either the same or different. In the case where r is 2 or more, $L^m$-$(COOM)_q$'s may be either the same or different. In the case where k is 2 or more, R's may be either the same or different. In the case where p is 2 or more, $R^k$'s may be either the same or different.

It is still preferable that R or L contains a hydrocarbon group having 8 or more carbon atoms. It is most desirable to use a compound represented by the following formula (7).

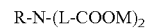  Formula (7)

R and L are each as defined above. Two (L-COOM)'s may be either the same or different (wherein 2 L's and 2 M's may be either the same or different). It is particularly preferable that R is an alkyl group and L is an alkylene group.

As the betaine compound, it is preferable to use a combination of at least one compound represented by the above-described formula (5) with at least one compound represented by the above-described formula (6). It is still preferable to use a combination of at least one compound represented by the above-described formula (5) with at least one compound represented by the above-described formula (7). The ratio of the compound represented by the above-described formula (5)/the compound represented by the above-described formula (6) (the compound represented by the formula (7)) ranges from 1/100 to 100/1 (by mass (weight)), preferably from 1/10 to 10/1 and still preferably from 1/5 to 5/1.

Although the betaine compound can be added over a broad range of the addition level (the total content), it preferably ranges from 0.001 to 50% by mass, still preferably from 0.01 to 20% by mass, in the ink composition. In the case of using 2 or more betaine compounds, the compound having the maximum content is employed in an amount from 1 to 10000 times by mass as much as the compound having the minimum content.

Next, preferable examples of the betaine compound will be cited, though it is needless to say that the invention is not restricted thereto.

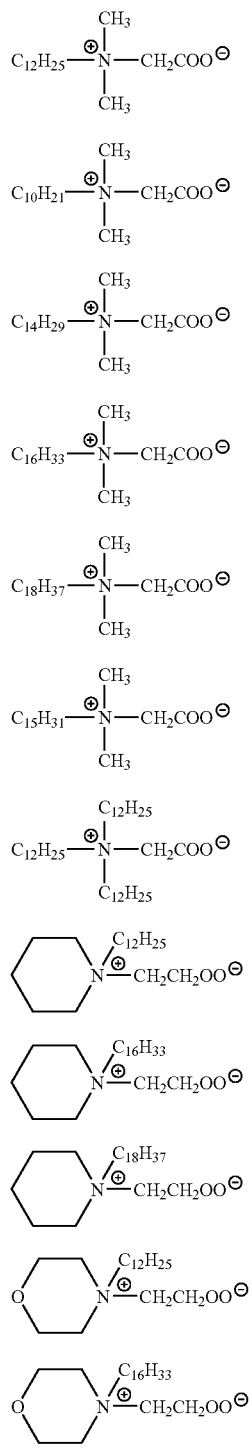
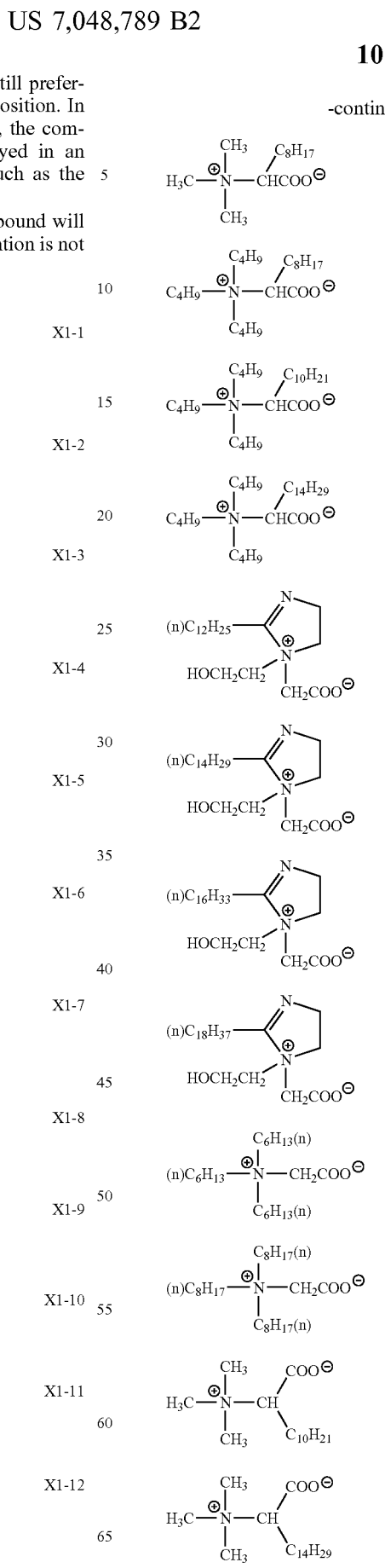

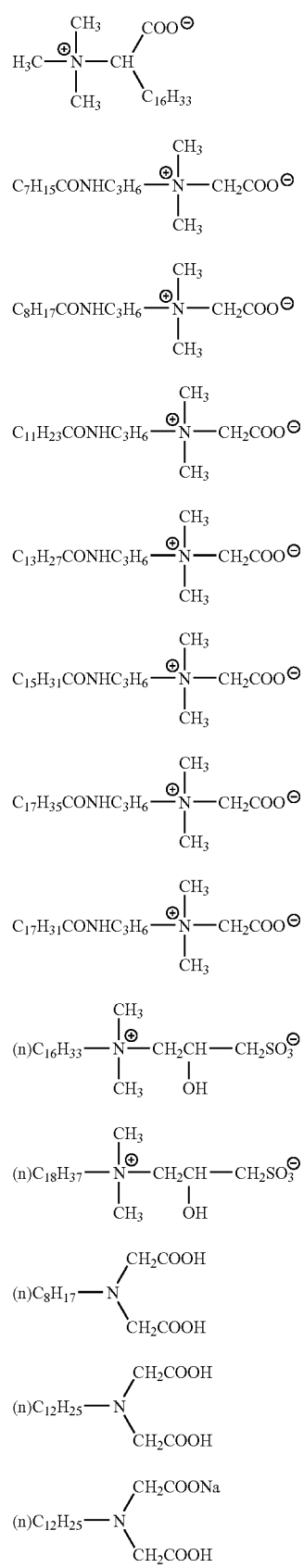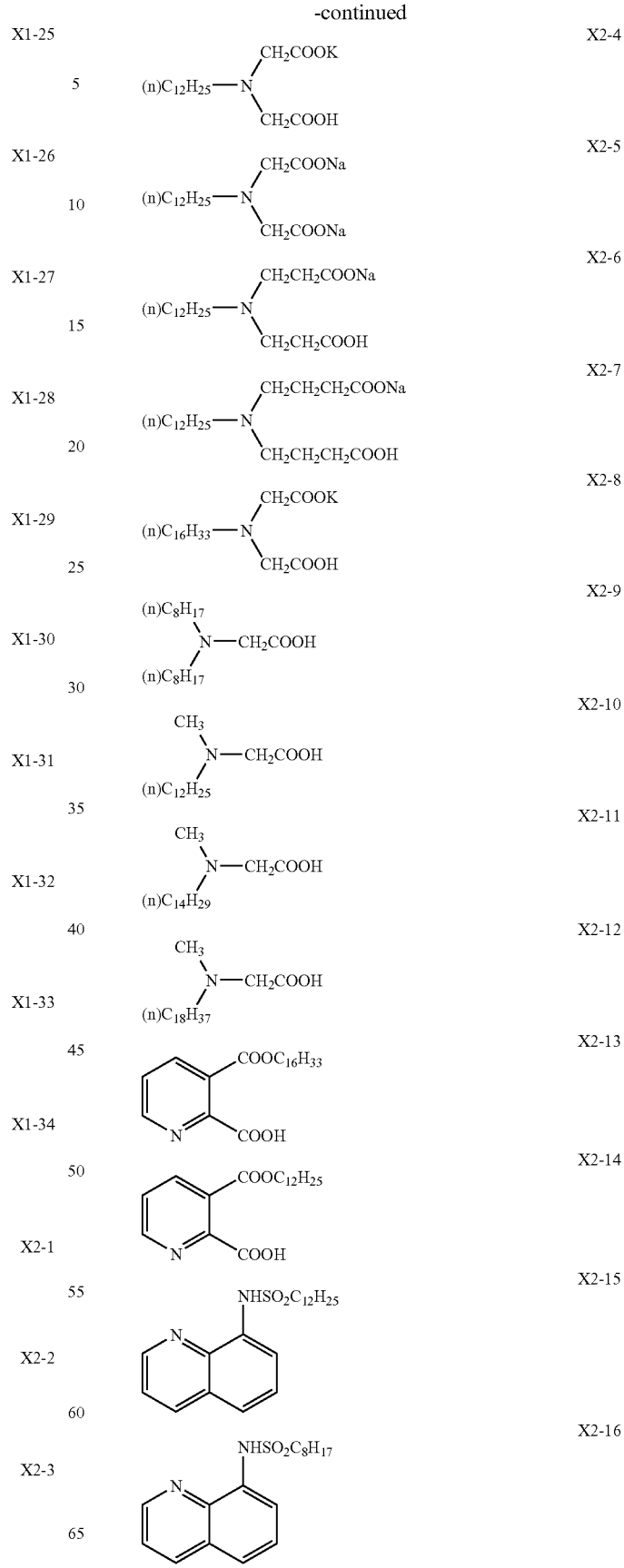

-continued

X2-17: 4-(di-C8H17-amino)phthalic acid (benzene with COOH, COOH and N(C8H17)2)

X2-18: 4-(di-C8H17-amino)phthalic acid isomer (benzene with COOH, COOH and N(C8H17)2)

X2-19: 4-(di-C8H17-amino)-2-hydroxybenzoic acid derivative (benzene with OH, COOH and N(C8H17)2)

X2-20: (HOOCH$_2$C)$_2$N—C$_8$H$_{16}$—N(CH$_2$COOH)$_2$

X2-21: (NaOOCH$_2$C)(HOOCH$_2$C)N—C$_8$H$_{16}$—N(CH$_2$COOH)(CH$_2$COONa)

X2-22: (NaOOCH$_2$C)(HOOCH$_2$C)N—C$_{12}$H$_{24}$—N(CH$_2$COOH)(CH$_2$COONa)

X2-23: (NaOOCH$_2$C)(HOOCH$_2$C)N—C$_{16}$H$_{32}$—N(CH$_2$COOH)(CH$_2$COONa)

X2-24: (KOOCH$_2$C)(HOOCH$_2$C)N—C$_{16}$H$_{32}$—N(CH$_2$COOH)(CH$_2$COOK)

X2-25: C$_{16}$H$_{33}$OOCH$_2$C—N(CH$_2$COOK)(CH$_2$COOH)

X2-26: C$_{12}$H$_{25}$OOCH$_2$C—N(CH$_2$COOK)(CH$_2$COOH)

X2-27: C$_{12}$H$_{25}$OOCH$_2$C—N(CH$_2$COONa)(CH$_2$COOH)

The preferable amount of the betaine compound to be added may be within any range so long as the effect of the invention can be achieved thereby. Preferable content thereof ranges from 0.001 to 50% by mass, still preferably from 0.01 to 20% by mass based on the ink composition.

Next, the nonionic surfactant will be illustrated.

A nonionic surfactant means a surfactant which contains no ionic group as a polar group. As a water-solubilizing group to be contained in such a surfactant, a polyether group is generally employed. It is a common practice to use a surfactant having a polyoxyethylene group and its alkyl or aryl ether derivative is generally employed.

Among all, compounds represented by the above formulae (2) to (4) are preferably used therefor.

Next, compounds represented by the following formula (2) and (3) will be described in greater detail.

$$R_{21}O-(CH_2CH_2O)_{m^1}-H \quad \text{Formula (2)}$$

In the formula (2), $R_{21}$ represents an alkyl group having from 5 to 40 carbon atoms, preferably from 8 to 18 carbon atoms, which may be either linear or branched and which may be substituted.

As examples of groups available as a substituent of the alkyl group represented by $R_{21}$, citation may be made of aryl groups (for example, phenyl, o-tolyl, p-tolyl and p-t-butylphenyl), alkoxy groups (for example, methoxy, ethoxy and n-butoxy), halogen atoms (for example, chlorine atom and bromine atom) and so on.

As specific examples of the alkyl group represented by $R_{21}$, citation may be made of n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylheptyl, 1-n-heptyloctyl, 1-n-octylnonyl, 6-methoxyhexyl, 2-phenylethyl and so on.

$m^1$, which represents an average number of ethylene oxide moles added, ranges from 2 to 40, preferably from 3 to 30 and particularly preferably from 3 to 20.

Among the compounds represented by the formula (2) in the invention, a compound represented by the following formula (2-1) is particularly preferable.

$$\begin{array}{c} R_{23} \\ \phantom{R}\diagdown \\ CHO-(CH_2CH_2O)_{m^{11}}-H \\ \phantom{R}\diagup \\ R_{24} \end{array} \quad \text{Formula (2-1)}$$

In the formula (2-1), $R_{23}$ and $R_{24}$ represent each a saturated hydrocarbon having from 4 to 10 carbon atoms, provided that the sum of the carbon atoms in $R_{23}$ and $R_{24}$ is from 8 to 18. $m^{11}$ is from 3 to 20. As examples of the saturated hydrocarbons having from 4 to 10 carbon atoms represented by $R_{23}$ and $R_{24}$, citation may be made of n-butyl, i-butyl, n-pentyl, n-hexyl, n-heptyl, n-octyl, 2-ethylhexyl, n-nonyl, n-decyl and so on. The sum of the carbon atoms in $R_{11}$ and $R_{12}$ is from 8 to 18, still preferably from 8 to 16. $m^{11}$ is from 3 to 20, preferably from 5 to 20 and still preferably from 6 to 18.

Next, specific examples of the compound represented by the formula (2) will be given, though the invention is not restricted thereto.

Specific example of the formula (2)

$$(n)C_8H_{17}O-(CH_2CH_2O)_{m^1}-H \quad \text{W1-1, 2}$$

W1-1: $m^1 = 5$
W1-2: $m^1 = 10$

-continued

 W1-3, 4

W1-3: $m^1 = 10$
W1-4: $m^1 = 15$

 W1-5~7

W1-5: $m^1 = 10$
W1-6: $m^1 = 15$
W1-7: $m^1 = 20$

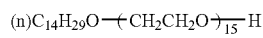 W1-8

 W1-9

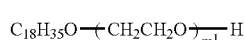 W1-10, 11

W1-10: $m^1 = 12$
W1-11: $m^1 = 25$

 W1-12

Next, specific examples of the compound represented by the formula (2-1) will be given, though the invention is not restricted thereto.

TABLE 1

Specific example of compound represented by the formula (2-1)

| No. | $R^{23}$ | $R^{24}$ | $m^{11}$ |
|---|---|---|---|
| W1-13 | (n)C$_4$H$_9$ | (n)C$_4$H$_9$ | 3 |
| W1-14 | (i)C$_4$H$_9$ | (i)C$_4$H$_9$ | 5 |
| W1-15 | (i)C$_4$H$_9$ | (i)C$_4$H$_9$ | 9.5 |
| W1-16 | (i)C$_4$H$_9$ | (i)C$_4$H$_9$ | 11.4 |
| W1-17 | (n)C$_5$H$_{11}$ | (n)C$_5$H$_{11}$ | 8 |
| W1-18 | (n)C$_5$H$_{11}$ | (n)C$_5$H$_{11}$ | 10 |
| W1-19 | (n)C$_5$H$_{11}$ | (n)C$_5$H$_{11}$ | 11.4 |
| W1-20 | (n)C$_5$H$_{11}$ | (n)C$_5$H$_{11}$ | 13.5 |
| W1-21 | (n)C$_5$H$_{11}$ | (n)C$_6$H$_{13}$ | 15 |
| W1-22 | (n)C$_6$H$_{13}$ | (n)C$_6$H$_{13}$ | 10 |
| W1-23 | (n)C$_6$H$_{13}$ | (n)C$_6$H$_{13}$ | 13.6 |
| W1-24 | (n)C$_6$H$_{13}$ | (n)C$_6$H$_{13}$ | 15.8 |
| W1-25 | (n)C$_6$H$_{13}$ | (n)C$_7$H$_{15}$ | 16 |
| W1-26 | (n)C$_7$H$_{15}$ | (n)C$_7$H$_{15}$ | 15 |
| W1-27 | (n)C$_7$H$_{15}$ | (n)C$_7$H$_{15}$ | 16.5 |
| W1-28 | (n)C$_8$H$_{17}$ | (n)C$_8$H$_{17}$ | 14 |
| W1-29 | (n)C$_8$H$_{17}$ | (n)C$_8$H$_{17}$ | 17.6 |
| W1-30 | (n)C$_8$H$_{17}$ | (n)C$_{10}$H$_{21}$ | 20 |

Next, a compound represented by the formula (3) will be illustrated.

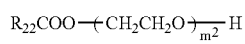 Formula (3)

In the formula (3), $R_{22}$ represents an alkyl group having from 5 to 40 carbon atoms, preferably from 5 to 30 carbon atoms, which may be either linear or branched and which may be substituted.

As examples of groups available as a substituent of the alkyl group represented by $R_{22}$, citation may be made of aryl groups (for example, phenyl, o-tolyl, p-tolyl and p-t-butylphenyl), alkoxy groups (for example, methoxy, ethoxy and n-butoxy), halogen atoms (for example, chlorine atom and bromine atom) and so on. As specific examples of the alkyl group represented by $R_{22}$, citation may be made of n-pentyl, n-hexyl, n-octyl, n-decyl, n-dodecyl, n-pentadecyl, n-octadecyl, 2-ethylhexyl, 1-ethylpentyl, 1-n-heptylpentyl, 1-n-hexylnonyl, 1-n-heptyldecyl, 1-n-octyldodecyl, 1-n-decyltetradecyl, 6-methoxyhexyl, 2-phenylethyl and so on.

$m^2$, which represents an average number of ethylene oxide moles added, ranges from 2 to 40, preferably from 3 to 30 and particularly preferably from 4 to 20.

Among the compounds represented by the formula (3) in the invention, a compound represented by the following formula (3-1) is particularly preferable.

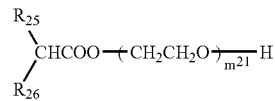 Formula (3-1)

In the formula (3-1), $R_{25}$ and $R_{26}$ represent each a saturated hydrocarbon group having from 2 to 20 carbon atoms, preferably from 4 to 13 carbon atoms. As examples of the saturated hydrocarbon groups having from 2 to 20 carbon atoms represented by $R_{25}$ and $R_{26}$, citation may be made of n-butyl, i-butyl, n-pentyl, n-hexyl, n-heptyl, n-octyl, 2-ethylhexyl, n-nonyl, n-decyl, n-dodecyl, n-hexadecyl, n-octadecyl and so on. $m^{21}$, which represents an average number of ethylene oxide moles added, is from 2 to 40, preferably from 3 to 30.

Next, specific examples of the compound represented by the formula (3) will be given, though the invention is not restricted thereto.

Specific example of the formula (32)

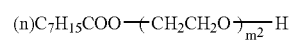 W2-1, 2

W2-1: $m^2 = 10$
W2-2: $m^2 = 15$

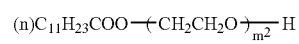 W2-3~5

W2-3: $m^2 = 10$
W2-4: $m^2 = 15$
W2-5: $m^2 = 20$

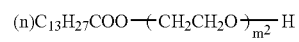 W2-6~7

W2-6: $m^2 = 10$
W2-7: $m^2 = 15$

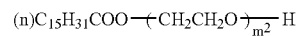 W2-8, 9

W2-8: $m^2 = 10$
W2-9: $m^2 = 15$

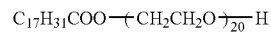 W2-10

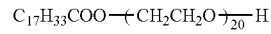 W2-11

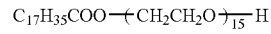 W2-12

Next, specific examples of the compound represented by the formula (3-1) will be given, though the invention is not restricted thereto.

TABLE 2

Specific example of compound represented by the formula (3-1)

| No. | $R^{25}$ | $R^{36}$ | $m^{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

The compounds represented by the formulae (2) and (3) in the invention can be synthesized by using publicly known methods. For example, they can be obtained by the methods described in Takehiko Fujimoto, *Shin-Kaimen Kasseizai Nyumon*, revised edition, (1992) pp. 94–107. As the compounds represented by the formulae (2) and (3) in the invention, use may be made of either one compound or a mixture of two or more different compounds.

Next, the surfactant represented by the formula (4) will be illustrated.

A surfactant controls physical liquid properties of an ink and thus improves the jetting stability of the ink, thereby making it possible to give an excellent ink composition by which images with improved waterproofness can be obtained and the printed ink can be prevented from bleeding. By adding the surfactant represented by the formula (4) of the invention, it becomes possible to obtain an ink composition which shows lessened foaming and by which printer head and members can be protected from corrosion by an organic solvent.

Formula (4)

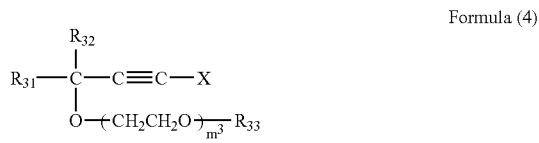

In the above formula, $R_{31}$ and $R_{32}$ independently represent each an alkyl group having from 1 to 18 carbon atoms.

More specifically speaking, $R_{31}$ and $R_{32}$ independently represent each an alkyl group having from 1 to 18 carbon atoms (for example, methyl, ethyl, n-propyl, butyl, hexyl, octyl, decyl, and dodecyl) which may be substituted. As examples of the substituent, citation may be made of alkyl groups (for example, methyl, ethyl and isopropyl), alkoxy groups (for example, methoxy and ethoxy), halogen atoms (for example, chlorine atom and bromine atom) and so on. Among all, unsubstituted linear alkyl groups or unsubstituted branched alkyl groups having from 1 to 12 carbon atoms are preferable as $R_{31}$ and $R_{32}$ and specifically preferable examples thereof include methyl, ethyl, n-butyl, 2-methylbutyl, 2,4-dimethylpentyl and so on.

$R_{33}$ represents a hydrogen atom, an alkyl group having from 1 to 6 carbon atoms or a phenyl group and the alkyl group or the phenyl group may be substituted.

As examples of the substituent of the alkyl group represented by $R_{33}$, citation may be made of alkyl groups (for example, methyl, ethyl and isopropyl), alkoxy groups (for example, methoxy and ethoxy) and a phenyl group. As examples of the substituent of the phenyl group represented by $R_{33}$, citation may be made of alkyl groups (for example, methyl, ethyl and isopropyl), alkoxy groups (for example, methoxy and ethoxy), halogen atoms (for example, fluorine atom, chlorine atom and bromine atom) and so on. Among all, it is preferable that $R_{33}$ is a hydrogen atom or an alkyl group having from 1 to 4 carbon atoms, and a hydrogen atom is still preferable.

X represents a hydrogen atom or

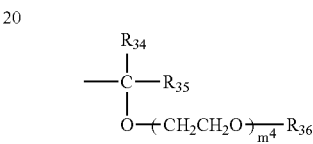

wherein $R_{34}$ and $R_{35}$ independently represent each an alkyl group having from 1 to 18 carbon atoms. Preferable examples of the substituents of $R_{34}$ and $R_{35}$ and specific examples thereof are selected from those cited above as the substituents and specific examples of $R_{31}$ and $R_{32}$. $R_{36}$ represents a hydrogen atom, an alkyl group having from 1 to 6 carbon atoms or a phenyl group. Preferable examples thereof are selected from those cited above as the substituents and specific examples of $R_{33}$.

$m^3$ and $m^4$ represent each an average number of ethylene oxide moles added, provided that $m^3+m^4$ ranges from 0 to 100, preferably from 0 to 50 and particularly preferably from 0 to 40.

In the case where $m^3$ is 0, $R_{33}$ represents a hydrogen atom. In the case where $m^4$ is 0, $R_{36}$ represents a hydrogen atom. In the case where X represents a hydrogen atom, $m^3$ is from 1 to 100, preferably from 1 to 50 and particularly preferably form 1 to 40.

Next, specific examples of the compound represented by the formula (4) will be cited, though the invention is not restricted thereto.

Specific examples of compound of the formula (4)

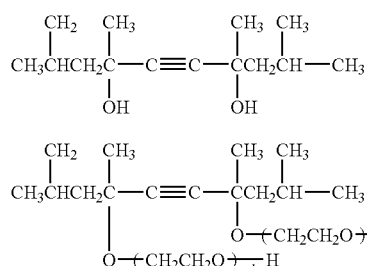

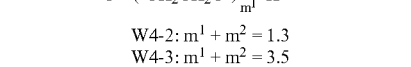

W4-2: $m^1 + m^2 = 1.3$
W4-3: $m^1 + m^2 = 3.5$
W4-4: $m^1 + m^2 = 10$
W4-5: $m^1 + m^2 = 20$
W4-6: $m^1 + m^2 = 30$

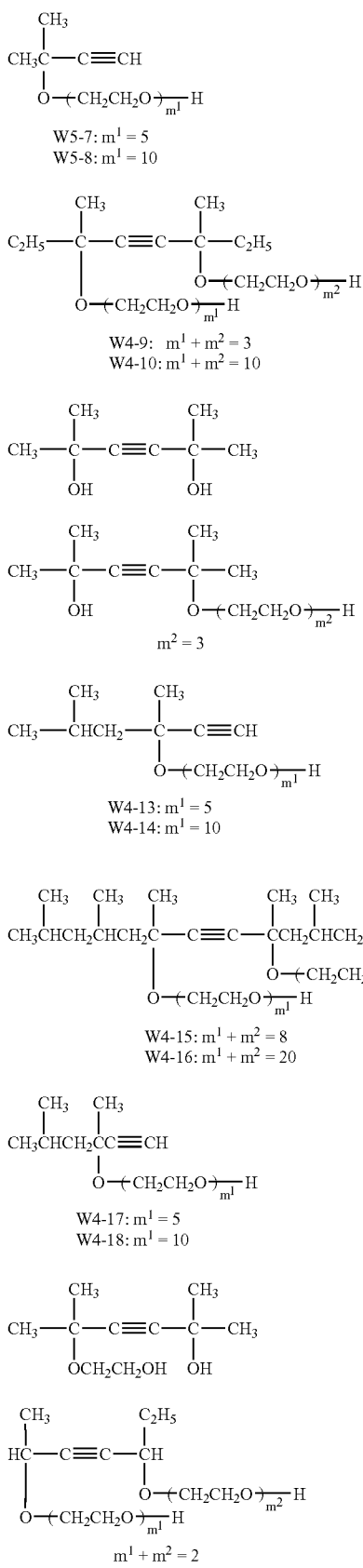

The compounds represented by the formula (4) of the invention can be easily obtained as marketed products. Specific trade names thereof include SURFYNOLS 61, 82, 104, 420, 440, 465, 485, 504, CT-111, CT-121, CT-131, CT-136, CT-141, CT-151, CT-171, CT-324, DF-37, DF-58, DF-75, DF-110D, DF-210, GA, OP-340, PSA-204, PSA-216, PSA-336, SE and SE-F and Dunol 604(manufactured by Nisshin Chemical Industries and Air Products), Olfines A, B, AK-02, CT-151W, E1004, E1010, P, SPC, STG, Y and 32W (manufactured by Nisshin Chemical Industries) and so on.

The compound represented by the formula (4) in the invention can be synthesized by using publicly known methods. For example, it can be obtained by the methods described in Takehiko Fujimoto, *Shin-Kaimen Kasseizai Nyumon*, revised edition, (1992) pp. 94–107. As the compound represented by the formula (4) in the invention, use may be made of either one compound or a mixture of two or more different compounds.

Although the preferable amount of the nonionic surfactant to be added varies over a wide range, preferable content thereof ranges from 0.001 to 50% by mass, still preferably from 0.01 to 20% by mass based on the ink composition.

An ink with the use of the betaine compound according to the invention sometimes suffers from the formation of air bubbles which would result in printing faults in inkjet recording. This problems can be overcome by adding a compound having an effect of removing the bubbles (i.e., a defoaming agent) to the ink.

As the defoaming agent, use can be made of various products such as a pluronic-based defoaming agent (a polyoxyethylene-polyoxypropylene defoaming agent) and a silicone-based defoaming agent.

The ink to be used in the ink set according to the invention is an ink comprising a dye dissolved or dispersed in water and a water-soluble organic solvent. Among all, an ink comprising an aqueous solution of a water-soluble dye is preferred. The ink having the betaine compound and the nonionic surfactant in the ink set may be in any color.

As the water-soluble dye, it is preferable to employ a magenta dye reported in JP-A-2002-371214, a phthalocyanine dye reported in JP-A-2002-309118, a water-soluble phthalocyanine dye reported in JP-A-2003-12952 and JP-A-2003-12956 or the like. Next, a still preferable cyan dye, magenta dye, yellow dye and black dye will be described in detail.

The present applicant has made intensive studies on inkjet recording inks and consequently found out that the requirements for dyes are as follows: 1) having a favorable color hue without any change in the color hue (solvate); 2) being excellent in tolerance (to light, ozone, $NO_x$, solvent, oil and water); 3) being highly safe (AMES, having no carcinogenicity, not irritating the skin, being easily degradable); 4) being available at a low cost; 5) having a high $\epsilon$; 6) being highly soluble; and 7) being capable of strongly sticking to media.

Next, physical properties required for inks and concentrated inks are as follows: 1) remaining homogeneous regardless of temperature or passage of time; 2) being stain-free; 3) well penetrating into media; 4) showing a uniform drop size; 5) being applicable to any paper; 6) being easily prepared; 7) showing little foaming and smooth defoaming without jetting miss; and 8) ensuring stable jetting.

Requirements for images are as follows: 1) being highly clear without any bleeding, color change or peeling; 2) having a good scratch resistance; 3) being highly glossy and homogeneous; 4) having good image preservation properties and well-balanced discoloration; 5) quickly drying; 6) withstanding high-speed printing; and 7) showing no image density-dependency in discoloration ratio.

Physical properties required for inkjet recording inks are as follows: being excellent both in light-resistance and ozone-resistance and showing little change in color hue and surface conditions(namely, showing little bronzing and scarcely any dye deposition). Concerning light-resistance (OD1.0), it is preferable that the ink has a light resistance expressed in the residual color ratio of 90% or more, when measured at Xe 1.1 W/m (intermittent) on an Epson PM photographic image-receiver paper provided with a TAC filter. A light resistance of residual pigment ratio of 85% or more for 14 days is also preferable. Concerning ozone-resistance, it is preferable that the ink has an ozone resistance (OD1.0) expressed in the residual dye ratio of 60% or more, when measured at an ozone concentration of 5 ppm or less for 1 day. It is still preferable that the ozone-resistance expressed in residual dye ratio is 70% or more, particularly preferably 80% or more. It is also preferable that a residual dye ratio for 5 days is 25% or more, still preferably 40% or more and particularly preferably 50% or more. Samples with various dye coating dose are prepared by GTC and the content of Cu element therein is measured with fluorescent X-rays.

As a phthalocyanine dye is degraded, Cu ion occurs as a phthalic acid salt. It is preferable that the Cu content (in terms of ion) in a print in practice is regulated to 10 mg/m$^2$ or less. The amount of Cu flowing from a print is determined by forming over a solid cyan image with Cu ion-coating dose of 20 mg/m$^2$ or less and, after discoloring the image with ozone, quantifying the ion flowing into water. Before the discoloration, all of the Cu compound is trapped within the image receiver material. It is preferable to regulate the amount of the ion flowing into the water to 20% or less based on the whole dye.

According to the invention, it is found out that a phthalocyanine dye having the above-described properties can be obtained by: 1) elevating oxidation potential; 2) improving association properties; 3) introducing an association-promoting group and strengthening hydrogen bond upon $\pi$—$\pi$ stacking; 4) introducing no substituent into the $\alpha$-position, and so on.

The dye to be used in the inkjet recording ink according to the invention is characterized by using a phthalocyanine dye wherein the number and positions of substituents can be specified, compared with phthalocyanine dyes employed in the conventional inkjet inks which are derived from sulfonated phthalocyanine and thus in the form of mixtures wherein the number and positions of substituents cannot be specified. From the viewpoint of structure, its first characteristic resides in being a water-soluble phthalocyanine dye obtained without sulfonating unsubstituted phthalocyanine. The second structural characteristic thereof resides in having an electron-withdrawing group at the $\beta$-position of a benzene ring of phthalocyanine. Particularly preferably, it has electron-withdrawing groups at the $\beta$-positions of all benzene rings. More specifically speaking, it is useful to employ phthalocyanine dyes having sulfonyl substituent (Japanese Patent Application 2001-47013 and Japanese Patent Application 2001-190214), those having sulfamoyl substituents entirely (Japanese Patent Application 2001-24352 and Japanese Patent Application 2001-189982), those having heterocyclic sulfamoyl substituent (Japanese Patent Application 2001-96610 and Japanese Patent Application 2001-190216), those having heterocyclic sulfonyl substituent (Japanese Patent Application 2001-76689 and Japanese Patent Application 2001-190215), those having specific sulfamoyl substituent (Japanese Patent Application 2001-57063), those having carbonyl substituent (Japanese Patent Application 2002-012869), those having a specific substituent for improving solubility and ink stability and preventing bronzing, more specifically, those having an asymmetric carbon (Japanese Patent Application 2002-012868) and those in the form of a Li salt (Japanese Patent Application 2002-012864).

From the physical properties, the first characteristic of the dye to be used in the inkjet recording according to the invention resides in having a high oxidation potential. It is preferable that the oxidation potential is nobler than 1.00V, still preferably nobler than 1.1 V and most desirably nobler than 1.15 V. The second characteristic in the physical properties resides in having strong association properties. As specific examples, fat-soluble dyes with specific association (Japanese Patent Application 2001-64413) and water-soluble dyes with specific association (Japanese Patent Application 2001-117350) can be cited.

Concerning the relationship between the number of associatable groups and the performance (absorbance of ink), introduction of the associatable groups would frequently cause a decrease in absorbance or shorten $\lambda$max wavelength. Concerning the relationship between the number of associatable groups and the performance (reflection OD on EPSON PM90 image receiver paper sheet), the reflection OD at a certain ionic strength would be lowered with an increase in the number of the associatable groups. Accordingly, it seems that association proceeds on the image receiver paper. Concerning the relationship between the number of associatable groups and the performance (ozone-resistance and light-resistance), the ozone-resistance is improved with an increase in the number of the associatable groups. Similarly, a dye having a larger number of associatable groups shows the better light-resistance. To impart a favorable ozone-resistance, it is required to add the above-described substituents X ($X_1$ to $X_4$ or the like). Since there is a trade-off relationship between reflection OD and fastness, it is necessary to improve light-resistance without weakening the association.

Next, a preferred embodiment of the ink according to the invention will be shown.

1) A cyan ink having a light-resistance expressed in the residual color ratio of 90% or more, when measured at Xe 1.1 W/m (intermittent) on an Epson PM photographic image-receiver paper provided with a TAC filter.

2) A cyan ink having a residual dye ratio (density after discoloration/initial density×100) of 60% or more, preferably 80% or more, in a monochromic part printed by using the monochromic (cyan) ink to give a cyan reflection density of 0.9 to 1.1 with the use of a status A filter and storing in an environment having 5 ppm of ozone for 24 hours.

3) A cyan ink showing a Cu ion amount flowing into water of 20% or less, based on the whole dye, after discoloring under the conditions as defined in the above 2).

4) A cyan ink capable of penetrating into a specific image receiver paper to show an ink penetration level of 30% or more of the image receiver layer.

The dye contained in the inkjet recording ink according to the invention is a phthalocyanine dye. A water-soluble dye having an oxidation potential nobler than 1.0 is preferable and a dye having a fastness to ozone fulfilling the above requirements are still preferable. Among all, a phthalocyanine dye represented by the following formula (CI) is still preferable.

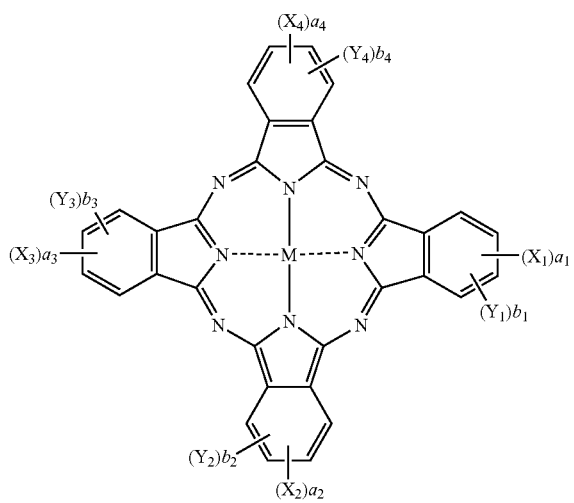

In the formula (CI), $X_1$, $X_2$, $X_3$ and $X_4$ independently represent each —S—O-Z, —$SO_2$-Z, —$SO_2$NR1R2, a sulfo group, —CONR1R2 or —$CO_2$R1. Among these substituents, —S—O-Z, —$SO_2$-Z, —$SO_2$NR1R2 and —CONR1R2 are preferable. —$SO_2$-Z and —$SO_2$NR1R2 are still preferable and —$SO_2$-Z is most desirable. In the case where one of a1 to 14 each showing the number of the substituents is 2 or more, the plural $X_1$'s to $X_4$'s may be either the same or different and each independently represents any of the above-described groups. $X_1$, $X_2$, $X_3$ and $X_4$ may be all the same substituents. It is also possible that they are all substituents of the same type but have different parts, for example, $X_1$, $X_2$, $X_3$ and $X_4$ are all —$SO_2$-Z's but contain various Z's. Alternatively, they may contain substituents different from each other such as —$SO_2$-Z and —$SO_2$NR1R2.

Although phthalocyanine dyes have been known as fast dyes, it is also known that when such a dye is used as an inkjet recording dye, it has a poor fastness to ozone gas.

In order to lower the reactivity with ozone which is an electrophile, it is desirable in the invention to introduce an electron-withdrawing group into the phthalocyanine skeleton so as to achieve an oxidation potential nobler than 1.0 V (vs. SCE). A nobler oxidation potential is preferred. That is, an oxidation potential nobler than 1.1 V (vs. SCE) is till preferable and one nobler than 1.15 V (vs. SCE) is most desirable.

The oxidation potential level (Eox) can be easily measured by a person skilled in the art. Methods for measuring it are described in, for example, P. Delahay, *New Instrumental Methods in Electrochemistry* (1954, Interscience Publishers), A. J. Bard et al., *Electrochemical Methods* (1980, John Wiley & Sons), Akiya Fujishima et al., *Denki Kagaku Sokutei-ho* (1984, Gihodo Shuppan), etc.

More specifically speaking, the oxidation potential is determined by dissolving a test sample at a concentration of from $1 \times 10^{-4}$ to $1 \times 10^{-6}$ mol/l in a solvent such as dimethylformamide or acetonitrile containing a supporting electrolyte such as sodium perchlorate or tetrapropylammonium perchlorate and measuring as a value to SCE (saturated Calomel electrode) with the use of a cyclic voltammetry or the like. Although this value sometimes deviates about several 10 mV due to a potential difference between solutions or the solution resistance of the sample solution, the reproducibility of the potential can be assured by adding a standard (for example, hydroquinone).

To unambiguously define the potential, the oxidation potential of a dye is defined in the invention as a value (vs. SCE) measured in dimethylformamide containing 0.1 $moldm^{-3}$ of tetrapropylammonium perchlorate as a supporting electrolyte (dye concentration: 0.001 $moldm^{-3}$).

The Eox (oxidation potential) value stands for easiness of electron transfer from a sample to an electrode. A sample having a larger Eox (i.e., a nobler oxidation potential) has the less easiness of electron transfer toward an electrode, in other words, it is less oxidized. Concerning the structure of a compound, the nobility of oxidation potential is elevated by introducing an electron-withdrawing group but lowered by introducing an electron-donating group. In the invention, it is desirable to achieve a nobler oxidation potential by introducing an electron-withdrawing group into the phthalocyanine skeleton to thereby lower the reactivity with ozone which is an electrophile. Using Hammett's substituent constant σp indicating the electron-withdrawing properties or electron-donating properties of substituents, therefore, it can be said that a nobler oxidation potential can be achieved by introducing a substituent having a large σp such as a sulfinyl group, a sulfonyl group or a sulfamoyl group.

From the viewpoint of controlling the potential as discussed above, it is also preferable to employ a phthalocyanine represented by the above-described formula (CI).

It is obvious that a phthalocyanine dye having the above-described oxidation potential is a cyan dye which is excellent both in light resistance and ozone resistance, since it fulfills the requirements for light resistance and ozone resistance as described above.

Next, a phthalocyanine dye (preferably a phthalocyanine dye represented by the formula (CI)) to be used in the invention will be illustrated in detail.

In the formula (CI), $X_1$, $X_2$, $X_3$ and $X_4$ independently represent each —S—O-Z, —$SO_2$-Z, —$SO_2$NR1R2, a sulfo group, —CONR1R2 or —$CO_2$R1. Among these substituents, —S—O-Z, —$SO_2$-Z, —$SO_2$NR1R2 and —CONR1R2 are preferable. —$SO_2$-Z and —$SO_2$NR1R2 are still preferable and —$SO_2$-Z is most desirable. In the case where one of a1 to 14 each showing the number of the substituents is 2 or more, the plural $X_1$'s to $X_4$'s may be either the same or different and each independently represents any of the above-described groups. $X_1$, $X_2$, $X_3$ and $X_4$ may be all the same substituents. It is also possible that they are all substituents of the same type but have different parts, for example, $X_1$, $X_2$, $X_3$ and $X_4$ are all —$SO_2$-Z's but contain various Z's. Alternatively, they may contain substituents different from each other such as —$SO_2$-Z and —$SO_2$NR1R2.

The above Z's independently represent each a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. A substituted or unsubstituted alkyl group, a substituted or unsubstituted aryl group and a substituted or unsubstituted heterocyclic group are preferable. Among all, a substituted alkyl group, a substituted aryl group and a substituted heterocyclic group are most desirable.

The above R1 and R2 independently represent each a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. A hydrogen atom, a substituted or unsubstituted alkyl group, a substituted or unsubstituted aryl group and a substituted or unsubstituted heterocyclic group are preferable. Among all, a hydrogen atom a substituted alkyl group, a substituted aryl group and a substituted heterocyclic group are most desirable, provided that it is not preferable that R1 and R2 are both hydrogen atoms.

As the substituted or unsubstituted alkyl groups represented by R1, R2 and Z, alkyl groups having from 1 to 30 carbon atoms are preferable. In order to improve the solubility of the dye and the ink stability, branched alkyl groups are still preferable and those having an asymmetric carbon atom (employed as a racemate) are particularly preferable. As examples of the substituents, citation may be made of those which will be cited hereinafter as substituents with regard to Z, R1, R2, $Y_1$, $Y_2$, $Y_3$ and $Y_4$ in the case of having substituents. Among all, a hydroxyl group, ether groups, ester groups, cyano group, amido group and sulfonamido group are particularly preferable, since these groups elevate association properties of the dye and thus improve the fastness. Moreover, these substituents may have halogen atoms or ionic hydrophilic groups. Carbon atoms in a substituent are excluded from the carbon atom number of an alkyl group, which applies to other groups.

As the substituted or unsubstituted cycloalkyl groups represented by R1, R2 and Z, cycloalkyl groups having from 5 to 30 carbon atoms are preferable. In order to improve the solubility of the dye and the ink stability, cycloalkyl groups having an asymmetric carbon atom (employed as a racemate) are particularly preferable. As examples of the substituents, citation may be made of those which will be cited hereinafter as substituents with regard to Z, R1, R2, $Y_1$, $Y_2$, $Y_3$ and $Y_4$ in the case of having substituents. Among all, a hydroxyl group, ether groups, ester groups, cyano group, amido group and sulfonamido group are particularly preferable, since these groups elevate association properties of the dye and thus improve the fastness. Moreover, these substituents may have halogen atoms or ionic hydrophilic groups.

As the substituted or unsubstituted alkenyl groups represented by R1, R2 and Z, alkenyl groups having from 2 to 30 carbon atoms are preferable. In order to improve the solubility of the dye and the ink stability, branched alkenyl groups are preferable and those having an asymmetric carbon atom (employed as a racemate) are particularly preferable. As examples of the substituents, citation may be made of those which will be cited hereinafter as substituents with regard to Z, R1, R2, $Y_1$, $Y_2$, $Y_3$ and $Y_4$ in the case of having substituents. Among all, a hydroxyl group, ether groups, ester groups, cyano group, amido group and sulfonamido group are particularly preferable, since these groups elevate association properties of the dye and thus improve the fastness. Moreover, these substituents may have halogen atoms or ionic hydrophilic groups.

As the substituted or unsubstituted aralkyl groups represented by R1, R2 and Z, aralkyl groups having from 7 to 30 carbon atoms are preferable. In order to improve the solubility of the dye and the ink stability, branched aralkyl groups are preferable and those having an asymmetric carbon atom (employed as a racemate) are particularly preferable. As examples of the substituents, citation may be made of those which will be cited hereinafter as substituents with regard to Z, R1, R2, $Y_1$, $Y_2$, $Y_3$ and $Y_4$ in the case of having substituents. Among all, a hydroxyl group, ether groups, ester groups, cyano group, amido group and sulfonamido group are particularly preferable, since these groups elevate association properties of the dye and thus improve the fastness. Moreover, these substituents may have halogen atoms or ionic hydrophilic groups.

As the substituted or unsubstituted aryl groups represented by R1, R2 and Z, aryl groups having from 6 to 30 carbon atoms are preferable. As examples of the substituents, citation may be made of those which will be cited hereinafter as substituents with regard to Z, R1, R2, $Y_1$, $Y_2$, $Y_3$ and $Y_4$ in the case of having substituents. Among all, electron-withdrawing groups are particularly preferable since the oxidation potential of the dye can be made nobler and the fastness can be improved thereby. As the electron-withdrawing groups, those having a positive Hammett's constant up may be cited. Among all, halogen atoms, heterocyclic groups, cyano group, carboxyl group, acylamino groups, sulfonamido group, sulfamoyl group, carbamoyl group, sulfonyl group, imido group, acyl groups, sulfo group and quaternary ammonium groups are preferable. In particular, cyano group, carboxyl group, sulfamoyl group, carbamoyl group, sulfonyl group, imido group, acyl groups, sulfo group and quaternary ammonium groups are preferable therefor.

As the heterocyclic groups represented by R1, R2 and Z, 5- or 6-membered heterocyclic groups are preferable and they may be further fused together. Either aromatic heterocyclic groups or non-aromatic heterocyclic groups are usable. Next, examples of the heterocyclic groups represented by R1, R2 and Z will be presented in as heterocycles while showing no substitution site, the substitution site is not specifically restricted. In the case of pyridine, for example, it may be substituted at the 2-, 3- or 4-position. Examples thereof include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperazine, imidazolidine, thiazoline and so on. Among all, aromatic heterocyclic groups are preferable and preferable example will be cited as in the above case: pyridine, pyrazine, pyrimidine, pyridazine, triazine, pyrazole, imidazole, benzimidazole, triazole, thiazole, benzothiazole, isothiazole, benzisothiazole and thiadiazole. These heterocyclic groups may have substituents. As examples of the substituents, citation may be made of those which will be cited hereinafter as substituents with regard to Z, R1, R2, $Y_1$, $Y_2$, $Y_3$ and $Y_4$ in the case of having substituents. Preferable substituents are the same as those cited above as preferable examples of the substituents of aryl groups, while still preferable substituents are also the same as those cited above as still preferable examples of the substituents of aryl groups.

$Y_1$, $Y_2$, $Y_3$ and $Y_4$ independently represent each a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. Each group may further have a substituent.

Among all, hydrogen atom, halogen atoms, alkyl groups, aryl groups, cyano group, alkoxy groups, amido group, ureido group, sulfonamido group, carbamoyl group, sulfamoyl group, alkoxycarbonyl groups, carboxyl group and sulfo group are preferable. In particular, hydrogen atom, halogen atoms, cyano group, carboxyl group and sulfo group are preferable and hydrogen atom is most desirable.

In the case where Z, R1, R2, $Y_1$, $Y_2$, $Y_3$ and $Y_4$ are groups which may further have a substituent, examples of the substituent are as follows.

Linear or branched alkyl groups having from 1 to 12 carbon atoms, linear or branched aralkyl groups having from 7 to 18 carbon atoms, linear or branched alkynyl groups having from 2 to 12 carbon atoms, linear or branched cycloalkyl groups having from 3 to 12 carbon atoms and linear or branched cycloalkenyl groups having from 3 to 12 carbon atoms (to improve the solubility of the dye and the ink stability, such groups as described above having a branched chain being preferred and those having an asymmetric carbon atom being still preferred; specific examples of these groups including methyl, ethyl, propyl, isopropyl, sec-butyl, t-butyl, 2-ethylhexyl, 2-methylsulfonylethyl, 3-phenoxypropyl, trifluoromethyl and cyclopentyl), halogen atoms (for example, chlorine atom and bromine atom), aryl groups (for example, phenyl, 4-t-butylphenyl and 2,4-di-t-amylphenyl), heterocyclic groups (for example, imidazolyl, pyrazolyl, triazolyl, 2-furyl, 2-thienyl, 2-pyrimidinyl and 2-benzothiazolyl), cyano group, hydroxyl group, nitro group, carboxy group, amino group, alkyloxy groups (for example, methoxy, ethoxy, 2-methoxyethoxy and 2-methansulfonylethoxy), aryloxy groups (for example, phenoxy, 2-methylphenoxy, 4-t-butylphenoxy, 3-nitrophenoxy, 3-t-butyloxycarbamoylphenoxy and 3-methoxycarbamoyl), acylamino groups (for example, acetamido, benzamido and 4-(3-t-butyl-4-hydroxyphenoxy)butanamido), alkylamino groups (for example, methylamino, butylamino, diethylamino and methylbutylamino), anilino groups (for example, phenylamino and 2-chloroanilino), ureido groups (for example, phenylureido, methylureido and N,N-dibutylureido), sulfamoylamino groups (for example, N,N-dipropylsulfamoylamino), alkylthio groups (for example, methylthio, octylthio and 2-phenoxyethylthio), arylthio groups (for example, phenylthio, 2-butoxy-5-t-octylphenylthio and 2-carboxyphenylthio), alkyloxycarbonylamino groups (for example, methoxycarbonylamino), sulfonamido groups (for example, methanesulfonamido, benzenesulfonamido and p-toluenesulfonamido), carbamoyl groups (for example, N-ethylcarbamoyl and N,N-dibutylcarbamoyl), sulfamoyl groups (for example, N-ethylsulfamoyl, N,N-dipropylsulfamoyl and N-phenylsulfamoyl), sulfonyl groups (for example, methanesulfonyl, octanesulfonyl, benzenesulfonyl and toluenesulfonyl), alkyloxycarbonyl groups (for example, methoxycarbonyl and butyloxycarbonyl), heterocyclic oxy groups (for example, 1-phenyltetrazol-5-oxy and 2-tetrahydropyranyloxy), azo groups (for example, phenylazo, 4-methoxyphenylazo, 4-pivaloylaminophenylazo and 2-hydroxy-4-propanoylphenylazo), acyloxy groups (for example, acetoxy), carbamoyloxy groups (for example, N-methylcarbamoyloxy and N-phenylcarbamoyloxy), silyloxy groups (for example, trimethylsilyloxy and dibutylmethylsilyloxy), aryloxycarbonylamino groups (for example, phenoxycarbonylamino), imido groups (for example, N-succinimido and N-phthalimido), heterocyclic thio groups (for example, 2-benzothiazolylthio, 2,4-di-phenoxy-1,3,5-triazole-6-thio and 2-pyridylthio), sulfinyl groups (for example, 3-phenoxypropylsulfinyl), phosphonyl groups (for example, phenoxyphosphonyl, octyloxyphosphonyl and phenylphosphonyl), aryloxycarbonyl groups (for example, phenoxycarbonyl), acyl groups (for example, acetyl, 3-phenylpropanoyl and benzoyl) and ionic hydrophilic groups (for example, carboxyl group, sulfo group, phosphono group and quaternary ammonium group).

In the case where the phthalocyanine dye represented by the above formula (CI) is soluble in water, it is preferable that this dye has an ionic hydrophilic group. Examples of the ionic hydrophilic group include sulfo group, carboxyl group, phosphono group, quaternary ammonium groups, etc. As the ionic hydrophilic group as described above, carboxyl group, phosphono group and sulfo group are preferable and carboxyl group and sulfo group are still preferable. These carboxyl group, phosphono group and sulfo group may be in the form of a salt. Examples of the counter ion forming the salt include ammonium ion, alkali metal ions (for example, lithium ion, sodium ion and potassium ion) and organic cations (for example, tetramethylammonium ion, tetramethylguanidium ion and tetramethylphosphonium). Among these counter ions, alkali metal salts are preferable. In particular, lithium salts are still preferable since they can elevate the solubility of a dye and improve ink stability.

Concerning the number of the ionic hydrophilic groups, it is preferable that a phthalocyanine dye has at least 2 ionic hydrophilic groups, still preferably at least 2 sulfo groups and/or carboxyl groups, per molecule.

a1 to a4 and b1 to b4 stand for respectively the numbers of the substituents $X_1$ to $X_4$ and $Y_1$ to $Y_4$. a1 to a4 independently represent each an integer of from 0 to 4, provided that all of them do not represent 0 at the same time. b1 to b4 independently represent each an integer of from 0 to 4. In the case where any of a1 to a4 and b1 to b4 is an integer of 2 or more, the corresponding one of $X_1$ to $X_4$ and $Y_1$ to $Y_4$ occurs in a plural number and these substituents may be either the same or different.

a1 and b1 fulfill the relationship a1+b1=4. It is still preferable that a1 is 1 or 2 while b1 is 3 or 2. In the most desirable combination among all, a1 is 1 and b1 is 3.

The same relationship as a1 with b1 applies to each of the combinations of a2 with b2, a3 with b3 and a4 with b4. Preferable combinations are also the same.

M represents a hydrogen atom or a metal element or its oxide, hydroxide or halide.

Preferable examples of M include a hydrogen atom and metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, etc. Preferable examples of the oxide include VO, GeO, etc. Preferable examples of the hydroxide include $Si(OH)_2$, $Cr(OH)_2$, $Sn(OH)_2$, etc. Preferable examples of the halide include $AlCl$, $SiCl_2$, $VCl$, $VCl_2$, $VOCl$, $FeCl$, $CaCl$, $ZrCl$, etc. Among all, Cu, Ni, Zn and Al are preferable and Cu is most desirable.

Furthermore, Pc (phthalocyanine) rings may form a dimer (for example, Pc—M—L-M—Pc) or a timer via L (a divalent linking group) and M's in such a case may be either the same or different.

As the divalent linking group represented by L, an oxy group —O—, a thio group —S—, a carbonyl group —CO—, a sulfonyl group —$SO_2$—, an imino group —NH—, a methylene group —$CH_2$— and a group formed by combining them are preferable.

Concerning the combination of preferable substituents in the compound represented by the above-described formula (CI), it is favorable that at least one of the substituents is selected from the above-described preferable groups. A compound having a larger number of substituents selected from the above-described preferable groups is still preferable and a compound all of the substituents of which are selected from the above-described preferable ones is most desirable.

Among phthalocyanine dyes represented by the above-described formula (CI), a phthalocyanine dye having a structure represented by the following formula (CII) is still preferable.

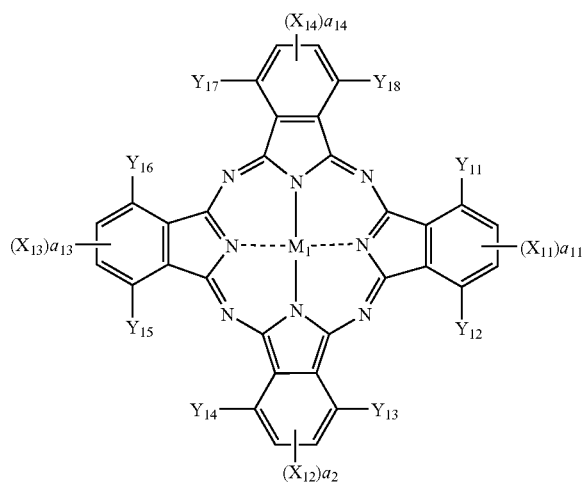

Next, the phthalocyanine represented by the formula (CII) according to the invention will be described in detail.

In the above-described formula (CII), $X_{11}$ to $X_{14}$ and $Y_{11}$ to $Y_{14}$ respectively have the same meanings as $X_1$ to $X_4$ and $Y_1$ to $Y_4$ in the formula (CI). $M_1$ has the same meaning as M in the formula (CI) and preferable examples thereof are also the same.

In the formula (CII), a11 to a14 independently represent each an integer of 1 or 2. It is preferable that the following relationship $4 \leq a11+a12+a13+a14 \leq$ is satisfied. In a still preferable case, a11=a12=a13=a14=1.

$X_{11}$, $X_{12}$, $X_{13}$ and $X_{14}$ may be all the same substituents. It is also possible that $X_{11}$, $X_{12}$, $X_{13}$ and $X_{14}$ are all substituents of the same type but have different parts, for example, $X_{11}$, $X_{12}$, $X_{13}$ and $X_{14}$ are all —$SO_2$-Z's but contain various Z's. Alternatively, they may contain substituents different from each other such as —$SO_2$-Z and —$SO_2NR1R2$.

Among phthalocyanine dyes represented by the formula (CII), particularly preferable combinations of substituents are as follows.

It is preferable that $X_{11}$ to $X_{14}$ independently represent each —SO-Z, —$SO_2$-Z, —$SO_2NR1R2$ or —CONR1R2, still preferably —$SO_2$-Z or —$SO_2NR1NR2$ and —$SO_2NR1NR2$ is most desirable.

Z's independently represent each a substituted or unsubstituted alkyl group, a substituted or unsubstituted aryl group or a substituted or unsubstituted heterocyclic group. In particular, a substituted alkyl group, a substituted aryl group and a substituted heterocycle group are preferable. In order to improve the solubility of the dye and the ink stability, substituents having an asymmetric carbon atom (employed as a racemate) are particularly preferable. In order to enhance association properties and improve fastness, it is preferable to employ substituents having hydroxyl group, ether groups, ester groups, cyano group, amido group or sulfonamido group.

It is preferable that R1 and R2 independently represent each a hydrogen atom, a substituted or unsubstituted alkyl group, a substituted or unsubstituted aryl group or a substituted or unsubstituted heterocyclic group. Among all, a hydrogen atom, a substituted alkyl group, a substituted aryl group and a substituted heterocyclic group are still preferable, provided that it is not preferable that R1 and R2 are both hydrogen atoms. In order to improve the solubility of the dye and the ink stability, substituents having an asymmetric carbon atom (employed as a racemate) are particularly preferable. In order to enhance association properties and improve fastness, it is preferable to employ substituents having hydroxyl group, ether groups, ester groups, cyano group, amido group or sulfonamido group.

$Y_{11}$ to $Y_{18}$ independently represent preferably each a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group or a sulfo group. A hydrogen atom, a halogen atom, a cyano group, a carboxyl group or a sulfo group is still preferable and a hydrogen atom is most desirable.

a11 to a14 independently represent preferably each 1 or 2 and it is still preferable that they all represent 1.

$M_1$ represents a hydrogen atom, a metal element or its oxide, hydroxide or halide. In particular, Cu, Ni, Zn and Al are preferable. Among all, Cu is most desirable therefor.

In the case where the phthalocyanine dye represented by the above-described formula (CII) is soluble in water, it is preferable that this dye has an ionic hydrophilic group. Examples of the ionic hydrophilic group include sulfo group, carboxyl group, phosphono group, quaternary ammonium groups, etc. As the ionic hydrophilic group asdescribed above, carboxyl group, phosphono group and sulfo group are preferable and carboxyl group and sulfo group are still preferable. These carboxyl group, phosphono group and sulfo group may be in the form of a salt. Examples of the counter ion forming the salt include ammonium ion, alkali metal ions (for example, lithium ion, sodium ion and potassium ion) and organic cations (for example, tetramethylammonium ion, tetramethylguanidium ion and tetramethylphosphonium). Among these counter ions, alkali metal salts are preferable. In particular, lithium salts are still preferable since they can elevate the solubility of a dye and improve ink stability.

Concerning the number of the ionic hydrophilic groups, it is preferable that a phthalocyanine dye has at least 2 ionic hydrophilic groups, still preferably at least 2 sulfo groups and/or carboxyl groups, per molecule.

Concerning the combination of preferable substituents in the compound represented by the above-described formula (CII), it is favorable that at least one of the substituents is selected from the above-described preferable groups. A compound having a larger number of substituents selected from the above-described preferable groups is still preferable and a compound all of the substituents of which are selected from the above-described preferable ones is most desirable.

Concerning the chemical structure of the phthalocyanine dye according to the invention, it is preferable to introduce at least one electron-withdrawing group such as sulfinyl group, sulfonyl group or sulfamoyl group into each of the 4 benzene rings of phthalocyanine so as to give a sum of σp's of the substituents in the whole phthalocyanine skeleton of 1.6 or more.

Next, Hammett's substituent constant σp will be illustrated. Hammett's rule, which is an empirical rule proposed in 1935 by L. P. Hammett for quantitatively discussing the effect of a substituent on a reaction or equilibrium of a benzene derivative, has been widely accepted as reasonable today. Substituent's constants determined by Hammett's rule include σp and σm. These parameters are generally reported in detail in a large number of publications, for example, J. A. Dean, *Lange's Handbook of Chemistry*, 12th ed., 1979 (Mc Graw-Hill) and *Kagaku no Ryoiki*, extra issue No.122, pp.96–103, 1979 (Nankodo).

It is generally unavoidable that the phthalocyanine derivative represented by the above-described formula (CI) occurs as a mixture of analogs differing in the introduction sites and number of the substituents Xn (n=1 to 4) and Ym (m=1 to 4) depending on the synthesis method. In the formula, therefore, such an analog mixture is frequently represented in the statistically averaged state. In the invention, these analog mixtures are classified into the following 3 types and thus it is found out that specific mixtures are particularly preferable. That is to say, phthalocyanine dye analog mixtures represented by the above-described formulae (CI) and (CII) are classified and defined in the following 3 types depending on the positions of substituents. The positions of $Y_{11}$, $Y_{12}$, $Y_{13}$, $Y_{14}$, $Y_{15}$, $Y_{16}$, $Y_{17}$ and $Y_{18}$ in the formula (CII) are referred to respectively as the 1-, 4-, 5-, 8-, 9-, 12-, 13- and 16-positions.

(1) β-position substitution type: phthalocyanine dyes having specific substituents at the 2- and/or 3-positions, the 6- and/or 7-positions, the 10- and/or 11-positions, the 14- and/or 15-positions.

(2) α-position substitution type: phthalocyanine dyes having specific substituents at the 1- and/or 4-positions, the 5- and/or 8-positions, 9- and/or 12-positions, the 13- and/or 16-positions.

(3) α,β-mixed position substitution type: phthalocyanine dyes having specific substituents at the 1- to 16-positions without any recognizable pattern.

In illustrating phthalocyanine dye derivatives having different structures (in particular, different substitution positions) herein, use is made of the above classification into the β-position substitution type, the α-position substitution type and the α,β-mixed position substitution type as defined above.

The phthalocyanine derivatives to be used in the invention can be synthesized by combining methods described or cited in, for example, Shirai and Kobayashi, *Futaroshianin Kagaku to Kino*, pp. 1–62 (IPC), C. C. Lezonff and A. B. P. Lever, *Phthalocyanines-Properties and Applications*, pp. 1–54 (VCH) and so on, or methods similar thereto.

The phthalocyanine compound represented by the formula (CI) according to the invention can be synthesized via sulfonation, sulfonyl chloridation or amidation of an unsubstituted phthalocyanine compound, as reported in International Publication 00/17275, International Publication 00/08103, International Publication 00/08101, International Publication 98/41853, JP-A-10-36471, etc. In such a case, sulfonation may occur at any position of the phthalocyanine nucleus and the number of groups to be sulfonated can be hardly controlled. In the case of introducing sulfo group under such reaction conditions, therefore, the positions and number of the sulfo groups introduced cannot be specified and thus a mixture of analogs differing from each other in the number and positions of substituents are obtained. To synthesize the compound according to the invention starting from this mixture, it is therefore impossible to specify the number or substitution positions of sulfamoyl substituents on the heterocycle. As a result, the compound according to the invention is obtained as a mixture of the α,β-mixed position substitution type containing several compounds differing from each other in the number and positions of substituents.

As discussed above, nobler oxidation potential is achieved and ozone resistance is improved by introducing a large number of electron-withdrawing groups such as sulfamoyl group into the phthalocyanine nucleus. According to the synthesis method as described above, contamination with a phthalocyanine dye having a smaller number of electron-withdrawing groups introduced (i.e., having a less noble oxidation potential) is unavoidable. To improve the ozone resistance, it is therefore favorable to employ a synthesis method whereby the formation of a compound having a less noble oxidation potential can be inhibited.

The phthalocyanine compound according to the invention represented by the formula (CII) can be derived from a tetrasulfophthalocyanine compound which is obtained by reacting a phthalonitrile compound (compound P) represented by the following formula and/or a diiminoisoindoline derivative (compound Q) with a metal derivative represented by the formula (CIII) or reacting a 4-sulfophthalocyanine derivative (compound R) with a metal derivative represented by the formula (CIII).

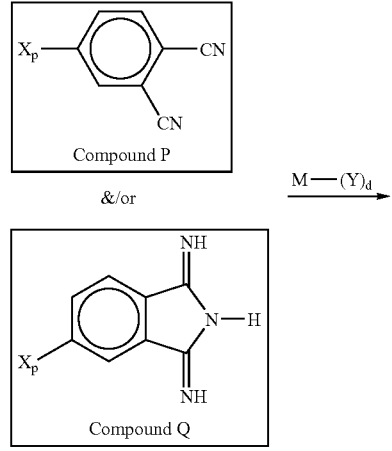

-continued

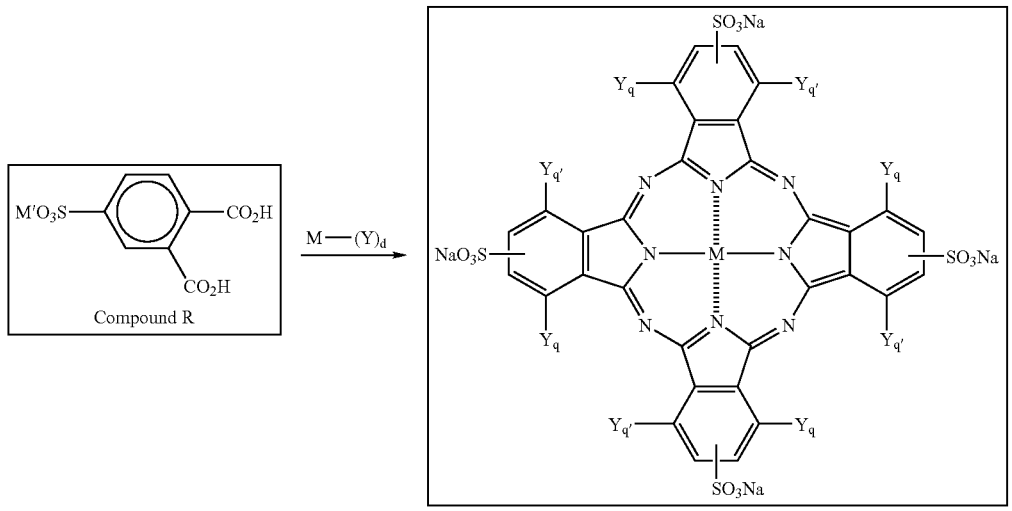

In the above formulae, Xp corresponds to $X_{11}$, $X_{12}$, $X_{13}$ or $X_{14}$ in the above-described formula (CII). Yq and Yq' correspond respectively to $Y_{11}$, $Y_{12}$, $Y_{13}$, $Y_{14}$, $Y_{15}$, $Y_{16}$, $Y_{17}$ or $Y_{18}$ in the formula (CII). In compound R, M' represents a cation.

As examples of the cation represented by M', citation may be made of alkali metal ions such as Li, Na and K and organic cations such as triethylammonium ion and pyridinium ion.

M-(Y)d          Formula (CIII)

In the formula (CIII), M has the same meaning as M in the above formulae (CI) and (CII); Y represents a monovalent or divalent ligand such as a halogen atom, acetate anion, acetylacetonate or oxygen; and d is an integer of from 1 to 4.

According to the above-described synthesis method, therefore, a definite number of desired substituents can be exclusively introduced. In the case where it is intended to introduce a large number of electron-withdrawing groups to make oxidation potential nobler as in the invention, the above-described synthesis method is superior to the method as described above for synthesizing a phthalocyanine compound of the formula (CI).

The phthalocyanine compound represented by the above-described formula (CII) usually occurs as a mixture of compounds represented by the following formulae (a)-1 to (a)-4 which are isomers differing in the Xp substitution position, i.e., the β-position substitution type.

(a)-1

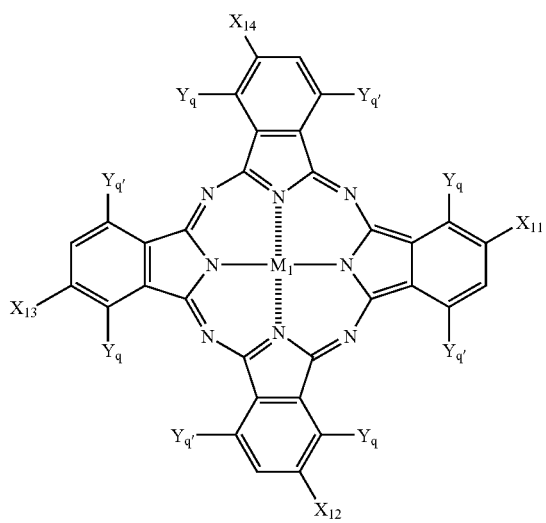

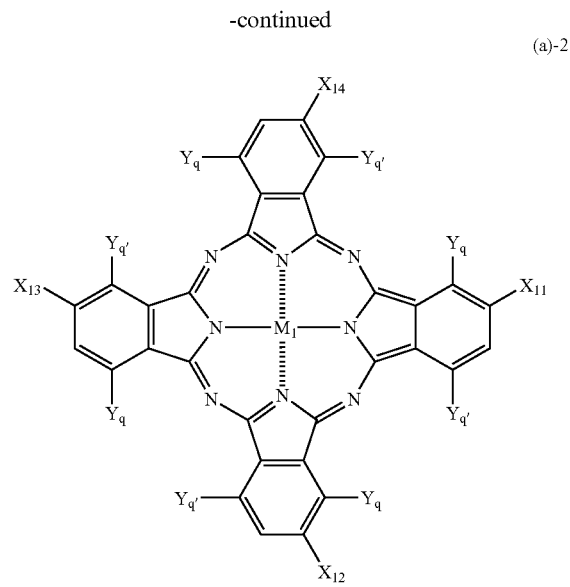

(a)-2

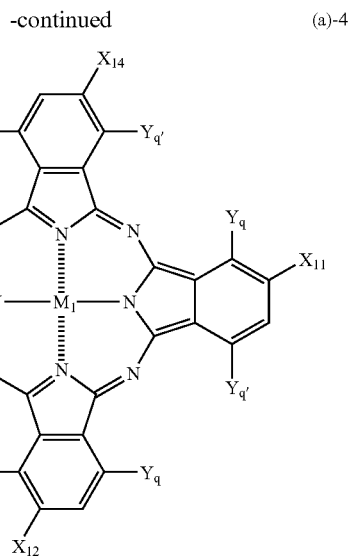

(a)-4

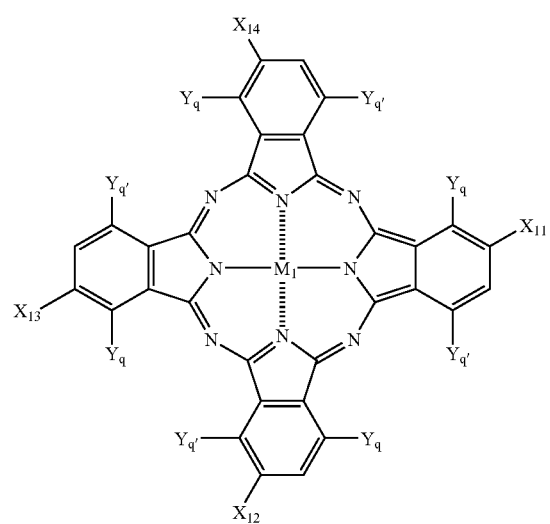

(a)-3

When Xp's which are all the same are used in the above synthesis method, a β-position substitution type phthalocyanine dye wherein $X_{11}$, $X_{12}$, $X_{13}$ and $X_{14}$ are all the same can be obtained. When different Xp's are used combinedly, a dye having substituents of the same type but differing in parts or a dye having substituents different from each other can be obtained. Among the dyes of the formula (CII), these dyes having electron-withdrawing groups different from each other are particularly preferable, since the solubility and association properties of the dyes and ink stability with the passage of time, etc. can be controlled.

In the invention, it is found out that an oxidation potential nobler than 1.0 V (vs. SCE) is highly important in improving fastness regardless of substitution types and an unexpectedly high effect, compared with the related art, can be established thereby. Although the detailed reason therefor is still unknown, the β-position substitution type is superior in color hue, light-fastness, ozone gas resistance, etc. to the α,β-mixed position substitution type.

Next, example compounds I-1 to I-12 and compounds 101 to 190 will be cited as specific examples of the phthalocyanine dyes represented by the above-described formulae (CI) and (CII), though the phthalocyanines usable in the invention are not restricted thereto.

(I-1)

-continued
(I-2)
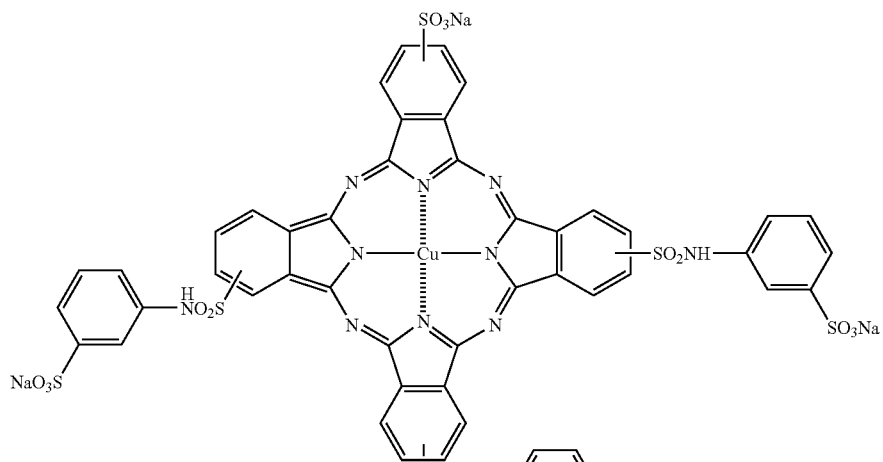
(I-3)
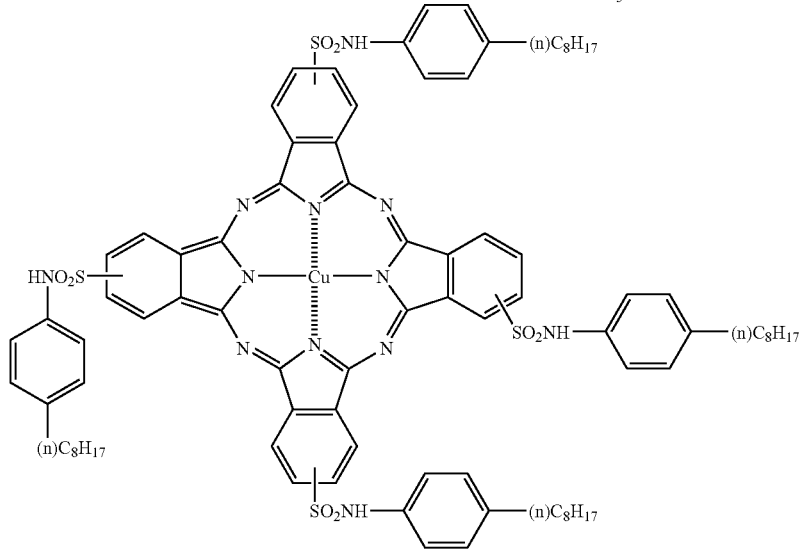
(I-4)
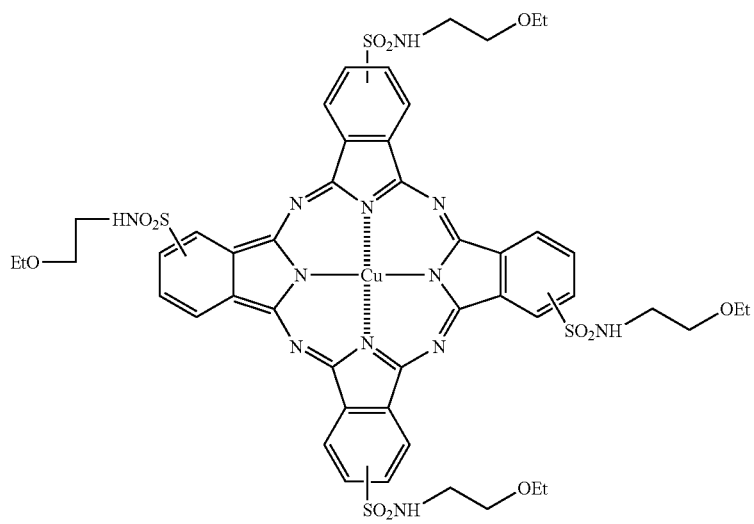

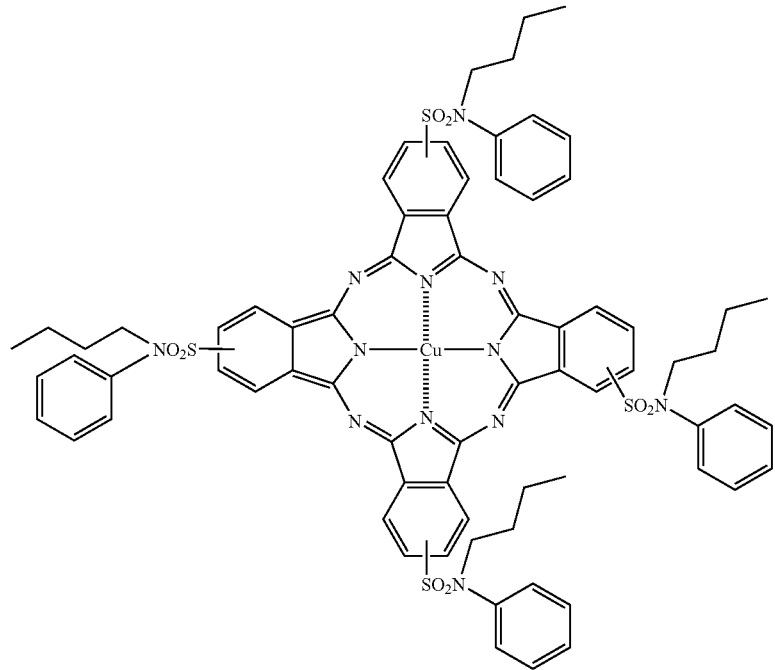
(I-5)
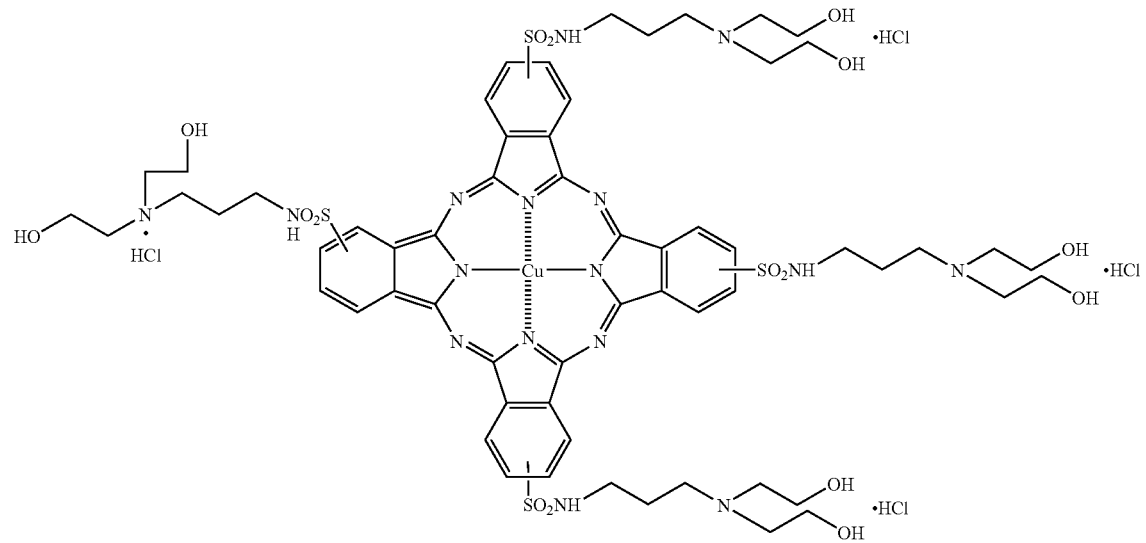
(I-6)

(I-7)
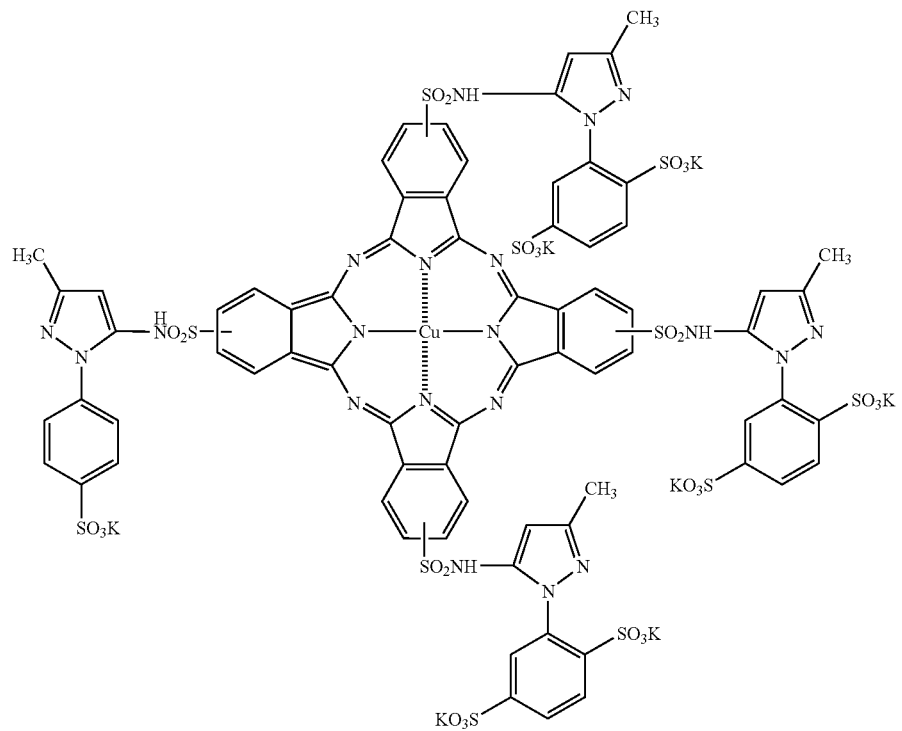
(I-8)
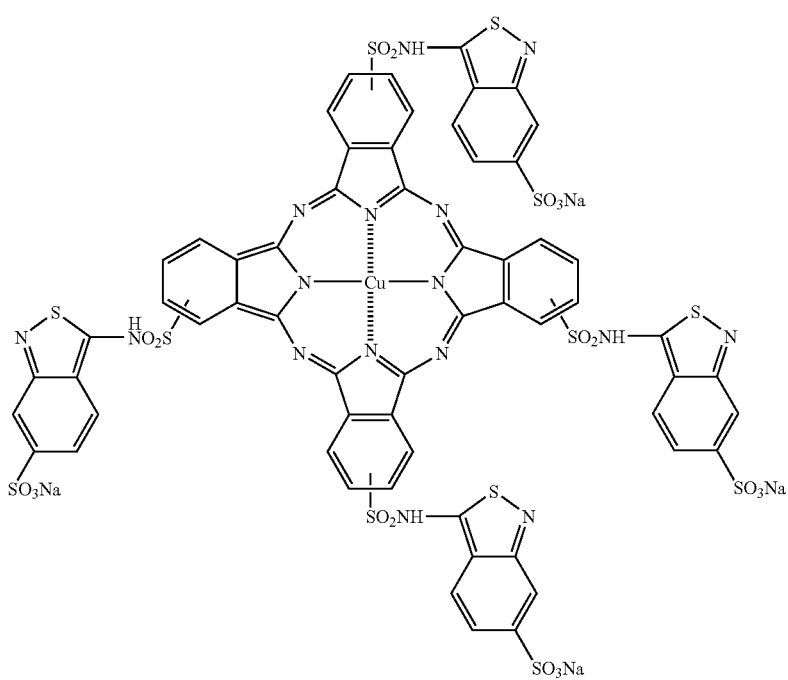

-continued
(I-9)
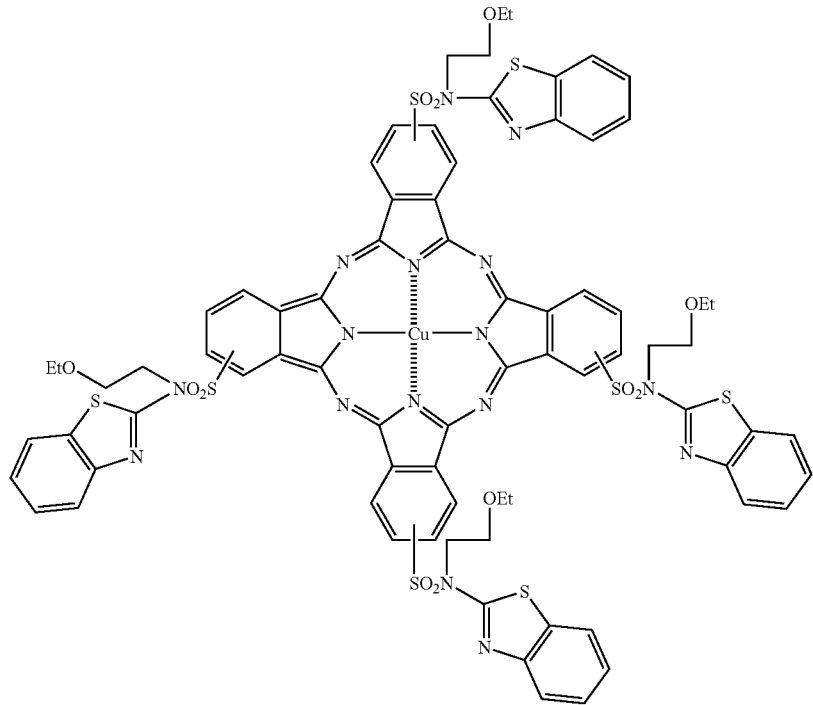
(I-10)
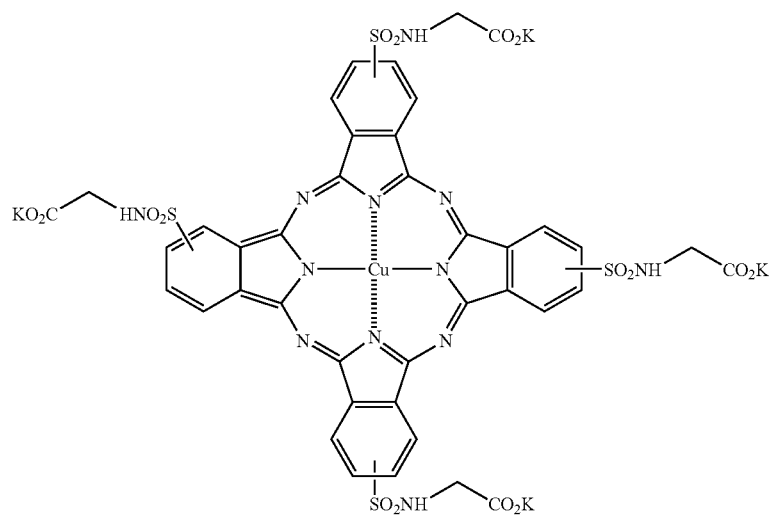

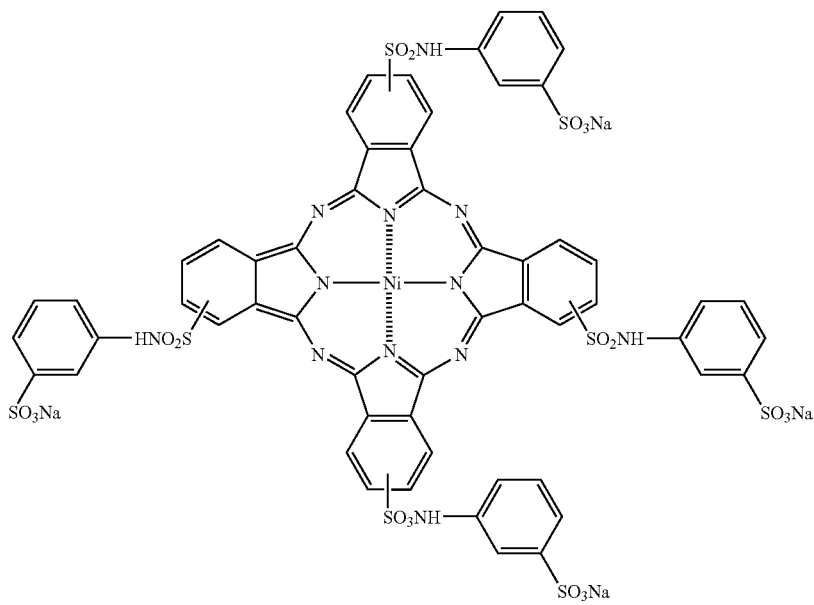
(I-11)
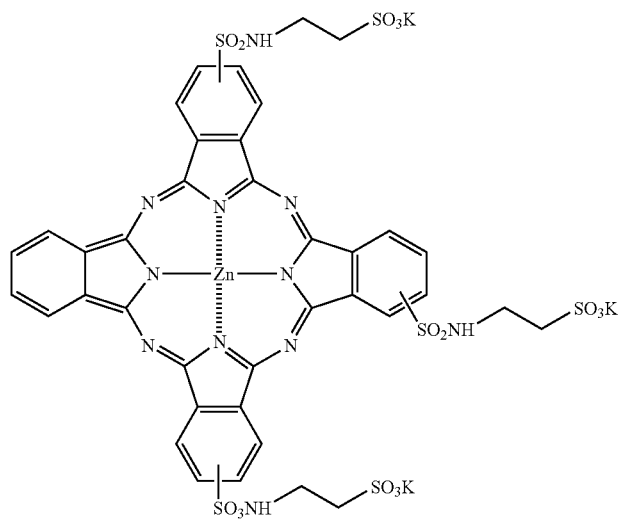
(I-12)
In the following Tables 3 to 9, specific examples in each of the combinations (X1, X2), (Y11, Y12), (Y13, Y14), (Y15, Y16) and (Y17, Y18) are independent from each other and listed in random order.

TABLE 3

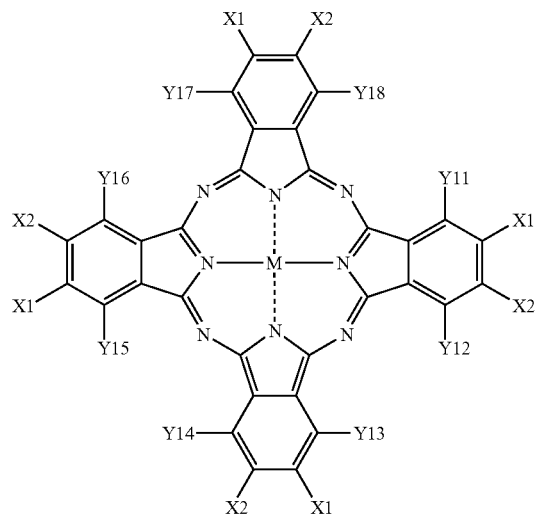

| Compound No. | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |

TABLE 4

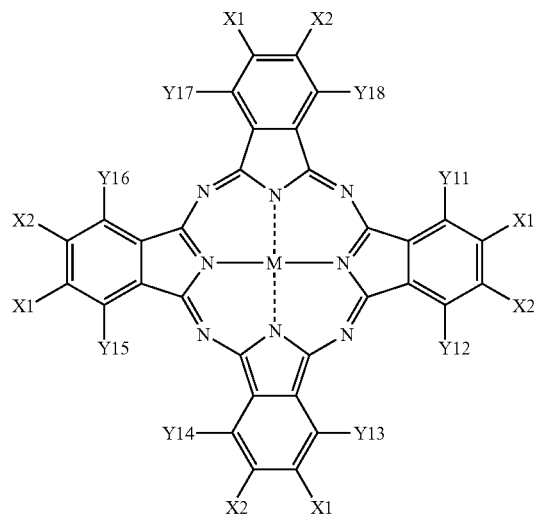

| Compound No. | M | X1 | X2 | Y11, Y12 | Y13, Y14 | Y15, Y16 | Y17, Y18 |
|---|---|---|---|---|---|---|---|
| 111 | Cu | —SO$_2$—NH—CH$_2$—CH$_2$—CH$_2$—SO$_2$—NH—CH$_2$—CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| 113 | Cu | —SO$_2$—CH$_2$—CH(OH)—CH$_2$SO$_3$K | —H | —H, —H | —H, —H | —H, —H | —H, —H |
| 114 | Cu | —SO$_2$—CH$_2$—CH(OH)—CH$_3$ | —SO$_3$Li | —H, —H | —H, —H | —H, —H | —H, —H |
| 115 | Cu | —SO$_2$NH(CH$_2$)$_3$N$^{\oplus}$(CH$_2$CH$_2$OH)$_2$·CH$_3$—C$_6$H$_4$—SO$_3^{\ominus}$ | —H | —H, —H | —H, —H | —H, —H | —H, —H |
| 116 | Cu | —CO—NH—CH$_2$—CH(OH)—CH$_2$SO$_3$K | —H | —H, —H | —H, —H | —H, —H | —H, —H |
| 117 | Cu | —CO—NH—CH(COOLi)—CH$_2$CH$_2$SO$_3$Li | —H | —H, —H | —H, —H | —H, —H | —H, —H |

TABLE 5
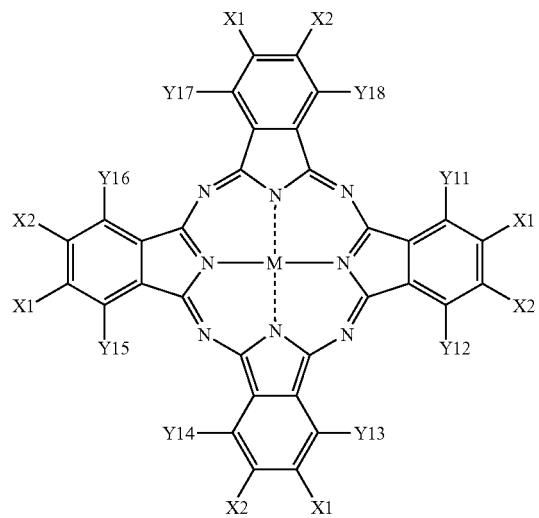
| Compound No. | M | X1 | X2 | Y11, Y12 | Y13, Y14 | Y15, Y16 | Y17, Y18 |
|---|---|---|---|---|---|---|---|
| 118 | Cu | —SO$_2$CH$_2$CH$_2$CH(CH$_3$)SO$_2$Li | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_2$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |
| 124 | Cu | —SO$_2$—NH—CH$_2$—CH(CH$_2$CH$_3$)—CH$_2$CHCH$_2$—CH$_3$ | —H | —H, —H | —H, —H | —H, —H | —H, —H |

TABLE 6

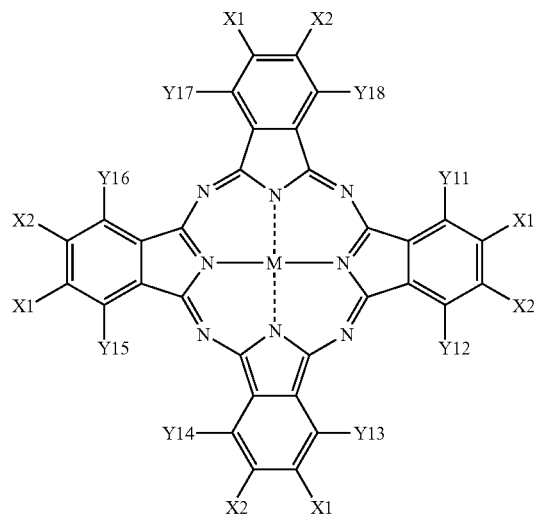

| Compound No. | M | X1 | X2 | Y11, Y12 | Y13, Y14 | Y15, Y16 | Y17, Y18 |
|---|---|---|---|---|---|---|---|
| 125 | Cu | —SO$_2$CH$_2$CH$_2$CH$_2$SO$_2$—NH—CH$_2$—CH(CH$_3$)—CH$_2$—CH$_3$ | —H | —H, —H | —H, —H | —H, —H | —H, —H |
| 126 | Cu | —SO$_2$—CH$_2$—CH$_2$—CH$_2$—CO$_2$—CH(CH$_3$)—CH$_2$—O—CH$_3$ | —H | —H, —H | —H, —H | —H, —H | —H, —H |
| 127 | Cu | —SO$_2$CH$_2$CH$_2$CH$_2$SO$_2$NHCH$_2$CH$_2$CH$_2$O—CH(CH$_3$)$_2$ | —H | —H, —H | —H, —H | —H, —H | —H, —H |
| 128 | Zn | —SO$_2$—CH$_2$—CH(OCH$_3$)—CH$_2$—O—CH$_2$ | —CN | —H, —H | —H, —H | —H, —H | —H, —H |
| 129 | Cu | —CO—NH—CH$_2$—CH(CH$_2$CH$_3$)—CH$_2$—CH$_2$—CH$_2$CH$_3$ | —H | —Cl, —H | —Cl, —H | —Cl, —H | —Cl, —H |
| 130 | Cu | —CO$_2$—CH(CH$_3$)—CH$_2$—O—C$_4$H$_9$(t) | —H | —H, —H | —H, —H | —H, —H | —H, —H |
| 131 | Cu | —SO$_2$—CH$_2$—CH$_2$—CH(CH$_3$)—SO$_2$—NH—C$_6$H$_3$(SO$_3$Li)$_2$ | —H | —H, —H | —H, —H | —H, —H | —H, —H |

TABLE 7
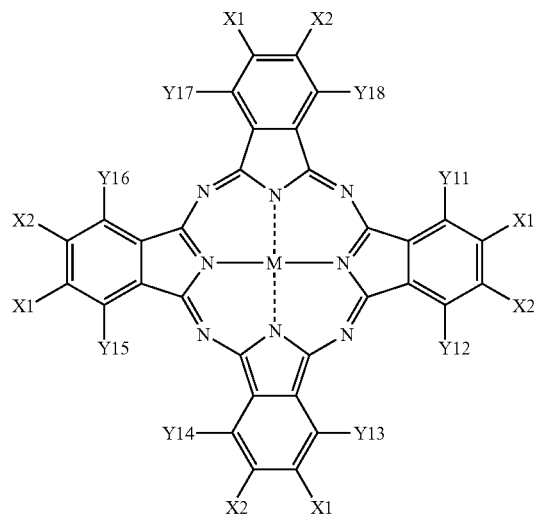
| Compound No. | M | X1 | X2 | Y11, Y12 | Y13, Y14 | Y15, Y16 | Y17, Y18 |
|---|---|---|---|---|---|---|---|
| 132 | Cu | —SO₂NH—C₆H₃(CO₂C₆H₁₃(n))₂ | —H | —H, —H | —H, —H | —H, —H | —H, —H |
| 133 | Cu | —SO₂NH—C₆H₃(OCH₂CH₂OCH₃)(SO₂NHCH₂CH(C₂H₅)C₄H₉) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |
| 135 | Cu | —SO₂—C₆H₄—CO₂Na | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |

TABLE 8
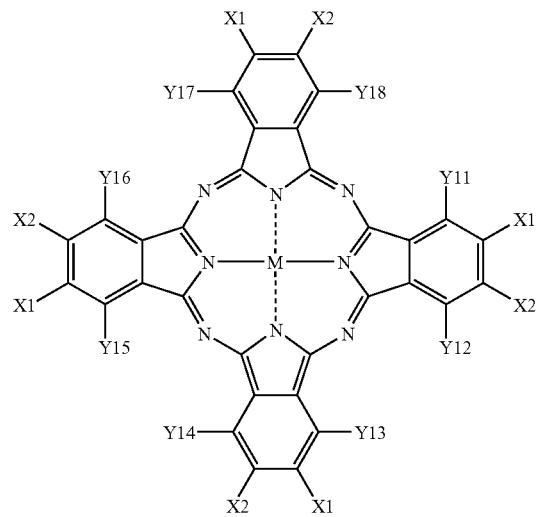
| Compound No. | M | X1 | X2 | Y11, Y12 | Y13, Y14 | Y15, Y16 | Y17, Y18 |
|---|---|---|---|---|---|---|---|
| 137 | Cu | —SO₂—(benzothiazole-2-yl)-6-SO₃Li | —H | —H, —H | —H, —H | —H, —H | —H, —H |
| 138 | Cu | —SO₂NH-(3-methyl-pyrazol-5-yl)-1-(2,5-disulfo-Li phenyl) | —H | —H, —H | —H, —H | —H, —H | —H, —H |
| 139 | Cu | —SO₂(CH₂)₃—NH—C(O)—(3,4-di-CO₂Li phenyl) | —Cl | —H, —H | —H, —H | —H, —H | —H, —H |
| 140 | Cu | —CO₂—CH₂CH₂CH₂—NH—(triazine with two NH—CH₂—CH₂—CH(CH₃)—SO₃Li) | —H | —H, —H | —H, —H | —H, —H | —H, —H |

TABLE 9

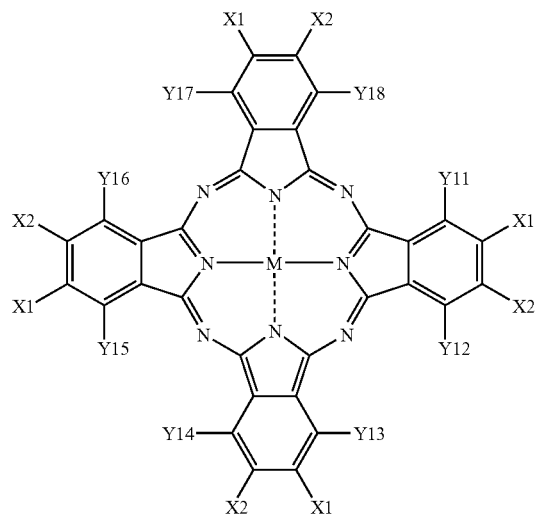

| Compound No. | M | X1 | X2 | Y11, Y12 | Y13, Y14 |
|---|---|---|---|---|---|
| 141 | Cu | —SO$_2$NH—CH(COONa)—CH$_2$—CO—N—(CH$_2$CH$_2$OH)$_2$ | —H | —H, —H | —H, —H |
| 142 | Cu | —SO$_2$NH—C$_6$H$_4$—NHC(O)—C$_6$H$_4$—SO$_3$Li | —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H |
| 144 | Cu | —SO$_2$—CH$_2$CH$_2$CH$_2$—NH—CO—C$_6$H$_4$—CO—NH—CH(COOLi)—CH$_2$—COOLi | —H | —H, —H | —H, —H |
| 145 | Cu | —SO$_2$CH$_2$CH$_2$OCH$_2$CH$_2$OCH$_2$CH$_2$SO$_3$Li | —H | —H, —H | —H, —H |

| Compound No. | Y15, Y16 | Y17, Y18 |
|---|---|---|
| 141 | —H, —H | —H, —H |
| 142 | —H, —H | —H, —H |
| 143 | —H, —H | —H, —H |
| 144 | —H, —H | —H, —H |
| 145 | —H, —H | —H, —H |

In the following Tables 10 to 13, the introduction positions of each substituents (Xp$_1$) and (Xp$_2$) in the β-position substitution type are listed in random order.

TABLE 10

M—Pc(Xp$_1$)$_m$(Xp$_2$)$_n$

| Compound No. | M | Xp$_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |

TABLE 10-continued

| | | | |
|---|---|---|---|
| 148 | Cu | —SO$_2$—NH—CH$_2$—CH(CH$_3$)—SO$_3$Li | 3 |
| 149 | Cu | —SO$_2$—NH—CH$_2$—CH(CH$_3$)—SO$_3$Li | 2 |
| 150 | Cu | —SO$_2$—NH—CH$_2$—CH$_2$—SO$_2$—NH—CH$_2$CH$_2$—COONa | 3 |
| 151 | Cu | —SO$_2$—NH—C$_6$H$_4$—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |

| Compound No. | Xp$_2$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N(CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N(CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |

TABLE 11

$$M-Pc(Xp_1)_m(Xp_2)_n$$

| Compound No. | M | Xp$_1$ | m |
|---|---|---|---|
| 158 | Cu | $-SO_2-CH_2-\underset{\underset{OH}{\mid}}{CH}-CH_2SO_3Li$ | 3 |
| 159 | Cu | $-SO_2NHCH_2CH_2-SO_3Li$ | 3 |
| 160 | Cu | $-SO_2-CH_2-CH_2-O-CH_2-CH_2-O-CH_2-CH_2-SO_3Na$ | 3 |
| 161 | Cu | $-SO_2CH_2CH_2CH_2SO_3Li$ | 3 |
| 162 | Cu | $-SO_2CH_2CH_2CH_2SO_3Li$ | 2 |
| 163 | Cu | $-SO_2CH_2CH_2CH_2SO_3K$ | 3 |
| 164 | Cu | $-SO_2CH_2CH_2CH_2SO_3Li$ | 2 |
| 165 | Cu | $-CO-NH-CH_2-CH_2-SO_3K$ | 3 |
| 166 | Cu | $-CO-NH-CH_2-CH_2-SO_2-NH-CH_2-CH_2-COONa$ | 3 |
| 167 | Cu | $-SO_2(CH_2)_3SO_2NHCH_2-\underset{\underset{OH}{\mid}}{CH}-CH_2CO_2Li$ | 2.5 |
| 168 | Cu | $-CO_2-CH_2-CH_2-\underset{\underset{CH_3}{\mid}}{CH}-SO_3Na$ | 2 |
| 169 | Cu | $-CO_2-CH_2-CH_2-CH_2-SO_3Li$ | 3 |
| 170 | Cu | $-CO_2-CH_2-CH_2-CH_2COOK$ | 2 |

| Compound No. | Xp$_2$ | n |
|---|---|---|
| 158 | $-SO_2-CH_2-\underset{}{\text{C}_6\text{H}_4}-SO_2NH-CH_2-\underset{\underset{OH}{\mid}}{CH}-CH_2-OH$ | 1 |
| 159 | $-SO_2-CH_2-CH_2-CH_2-SO_2-NH-CH_2-\underset{\underset{OH}{\mid}}{CH}-CH_3$ | 1 |
| 160 | $-SO_2-CH_2-CH_2-CH_2-CO-N(\underset{CH_2-COONa}{\overset{CH_2-CH_2-COONa}{|}})-CH_2-COONa$ | 1 |
| 161 | $-SO_2CH_2CH_2CH_2SO_2NHCH_2-\underset{\underset{OH}{\mid}}{CH}-CH_2SO_3Li$ | 1 |
| 162 | $-SO_2CH_2CH_2OCH_2CH_2OCH_2CH_2OH$ | 2 |
| 163 | $-SO_2CH_2CH_2CH_2SO_2NH-\underset{\underset{CH_3}{\mid}}{CH}-CH_2-OH$ | 1 |
| 164 | $-SO_2CH_2CH_2CH_2SO_2N(CH_2CH_2OH)_2$ | 2 |
| 165 | $-CO-NH-CH_2-CH_2-O-CH_2-CH_2-OH$ | 1 |
| 166 | $-CO-NH-CH_2-\underset{\underset{OH}{\mid}}{CH}-CH_3$ | 1 |
| 167 | $-CO-NH-CH_2-CH_2-CH_2-CO-N(CH_2-CH_2-OH)_2$ | 1.5 |
| 168 | $-CO-CH_2-CH_2-CH_2-CO-N(CH_2-CH_2-OH)_2$ | 2 |
| 169 | $-CO_2-CH_2-CH_2-CH_2-SO_2-NH-CH_2-\underset{\underset{OH}{\mid}}{CH}-CH_3$ | 1 |
| 170 | $-CO_2-CH_2-CH_2-CH_2-SO_2-NH-CH_2-\underset{\underset{OH}{\mid}}{CH}-CH_2-COOK$ | 2 |

TABLE 12

$$M\text{—}Pc(Xp_1)_m(Xp_2)_n$$

| Compound No. | M | $Xp_1$ | m |
|---|---|---|---|
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CHCH$_2$OH<br>                                                               OH | 2 |
| 174 | Cu | —SO$_2$(CH$_2$)$_3$SO$_2$NHCH$_2$—CH—CH$_2$SO$_3$K<br>                                                      OH | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(O—CH$_3$)—CH$_3$ | 3 |
| 181 | Cu | —SO$_2$—CH$_2$—CH$_2$—CH$_2$—CH$_2$—CO$_2$—NH—CH(CH$_3$)—CH$_2$—CH$_3$ | 3 |
| 182 | Cu | —SO$_2$—CH$_2$—CH$_2$—CH$_2$—SO$_2$NH—CH$_2$—CH(OH)—CH$_3$ | 2.5 |

| Compound No. | $Xp_2$ | n |
|---|---|---|
| 171 | —SO$_2$—CH$_2$—C$_6$H$_4$—SO$_2$NH—CH$_2$—CH(OH)—CH$_2$—OH | 1 |
| 172 | —CO$_2$—CH$_2$—CH$_2$—CH$_2$—CO$_2$—CH$_2$—CH$_2$—CH(OH)—CH$_2$—COOK | 2 |
| 173 | —CO$_2$—CH$_2$—CH(OH)—CH$_2$—SO$_3$Li | 2 |
| 174 | —CO$_2$—CH$_2$—CH$_2$—CH$_2$—CH$_2$—SO$_2$—NH—CH$_2$—CH(OH)—CH$_3$ | 1 |
| 175 | —CO$_2$—CH$_2$—CH$_2$—CH$_2$—CH$_2$—CO—N(CH$_2$—CH$_2$—COOLi)—CH$_2$—COOLi | 2 |
| 176 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | —SO$_2$—CH$_2$—CH$_2$—CH$_2$—SO$_2$—NH—CH$_2$—CH(OH)—CH$_3$ | 1 |
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |

TABLE 12-continued

| 179 | —SO$_2$—CH$_2$—CH$_2$—CH$_2$—SO$_2$—NH—CH$_2$—CH(O—CH$_3$)—CH$_3$ | 2 |
| 180 | —SO$_2$NH—CH$_2$—CH$_2$—SO$_2$NH—CH$_2$—CH$_2$—O—CH$_2$—CH$_2$—OH | 1 |
| 181 | —SO$_2$—CH$_2$—CH$_2$—CH$_2$—SO$_2$—NH—CH—(CH$_3$)$_2$ | 1 |
| 182 | —SO$_2$—CH$_2$—CH$_2$—CH$_2$—CO$_2$—NH—CH(CH$_3$)—CH$_2$—CH$_3$ | 1.5 |

TABLE 13

M—Pc(Xp$_1$)$_m$(Xp$_2$)$_n$

| Compound No. | M | Xp$_1$ | m |
|---|---|---|---|
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(OH)—CH$_3$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH—(CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH—(CH$_3$)$_2$ | 3 |
| 190 | Cu | —CO—NH—CH$_2$—CH(CH$_2$CH$_3$)—CH$_2$—CH$_2$—CH$_2$CH$_3$ | 3 |

| Compound No. | Xp$_2$ | n |
|---|---|---|
| 183 | —SO$_2$—CH$_2$—CH$_2$—CH$_2$—SO$_2$—NH—(CH$_2$)$_3$—CH$_2$—O—CH$_2$CH$_2$—OH | 2 |
| 184 | —SO$_2$—CH$_2$—CH$_2$—O—CH$_2$—CH$_2$—O—CH$_3$ | 1 |
| 185 | —SO$_2$—CH$_2$—CH$_2$—O—CH$_2$—CH$_2$—O—CH$_2$—CH$_2$—O—CH$_3$ | 1 |
| 186 | —SO$_2$—CH$_2$—CH$_2$—O—CH$_2$—CH$_2$—O—CH$_2$—CH$_2$—OH | 1 |
| 187 | —CO$_2$—CH$_2$—CH(CH$_2$CH$_3$)—CH$_2$—CH$_2$—CH$_2$CH$_3$ | 1 |
| 188 | —CO$_2$—CH$_2$—CH$_2$—O—CH$_2$—CH$_2$—O—CH$_3$ | 1 |
| 189 | —SO$_2$—NH—CH$_2$—CH(CH$_2$CH$_3$)—CH$_2$—CH$_2$—CH$_2$—CH$_3$ | 1 |
| 190 | —CO—NH—CH$_2$—CH$_2$—O—CH$_2$—CH$_2$—O—CH$_3$ | 1 |

The structure of the compound Nos. 146 to 190 represented by M-Pc(Xp1)m(Xp2)n is as follows.

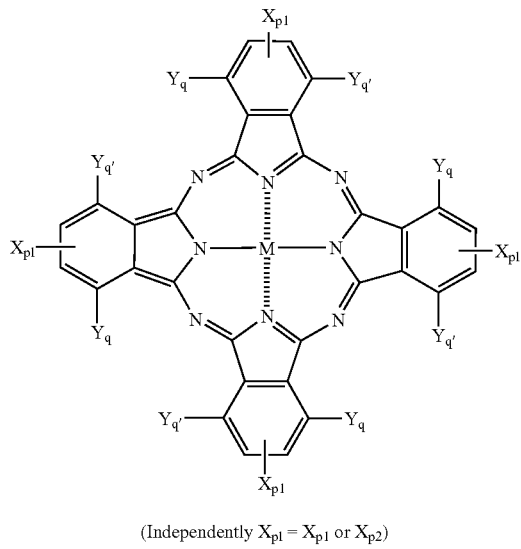

(Independently $X_{p1} = X_{p1}$ or $X_{p2}$)

The phthalocyanine dyes represented by the above-described formula (CI) can be synthesized in accordance with the patents as cited above. Also, the phthalocyanine dyes represented by the formula (CII) can be synthesized by methods reported by JP-A-2001-226275, JP-A-2001-96610, JP-A-2001-47013 and JP-A-2001-193638, in addition to the above-described synthesis methods. However, starting materials, dye intermediates and synthesis routes are not restricted thereto.

The inkjet recording ink according to the invention contains the above-described phthalocyanine dye preferably in an amount of from 0.2 to 20% by mass, still preferably from 0.5 to 15% by mass.

The inkjet recording ink according to the invention can be produced by dissolving and/or dispersing the phthalocyanine dye in an aqueous medium. The term "aqueous medium" as used herein means water or a mixture of water with a small amount of water-miscible organic solvent which optionally contains additives such as a moistening agent (preferably a surfactant as a dissolution aid or a dispersion aid), a stabilizer and a preservative.

A magenta ink to be used in the inkjet recording ink according to the invention comprises a magenta dye selected from azo dyes which is dissolved or dispersed in an aqueous medium. It is fundamentally characterized by being a dye which has an absorption maximum within a spectroscopic range of from 500 to 580 nm in the aqueous medium and has an oxidation potential nobler than 1.0 V (vs. SCE).

The first structural characteristic of the azo dye employed as a preferable dye resides in that it is a dye having a chromophore represented by the formula: (heterocycle A) —N═N— (heterocycle B). In this case, the heterocycle A and the heterocycle B may have the same structure. Specifically speaking, the heterocycle A and the heterocycle B are 5- or 6-membered heterocycles selected from among pyrazole, imidazole, triazole, oxazole, thiazole, selenazole, pyridone, pyrazine, pyrimidine and pyridine. More specifically, such heterocycles are reported by Japanese Patent Application 2000-15853, Japanese Patent Application 2001-15614, JP-A-2002-309116, Japanese Patent Application 2001-195014, etc.

The second preferable structural characteristic of the above-described azo dye resides in that it is an azo dye in which the azo group has an aromatic nitrogen-containing 6-membered heterocycle attached as a coupling component directly in at least one side thereof. A specific example thereof is described in 2001-110457.

The third preferable structural characteristic resides in that an auxochrome has an aromatic cyclic amino group structure or a heterocyclic amino group structure. Specific examples thereof include anilino group and heteryl amino group.

The fourth preferable structural characteristic resides in having a stereostructure. A specific example thereof is described in Japanese patent Application 2002-12015.

Among the preferable structural characteristics of the azo dye as discussed above, a dye represented by the following formula (1) is the most desirable one in achieving the objects of the invention.

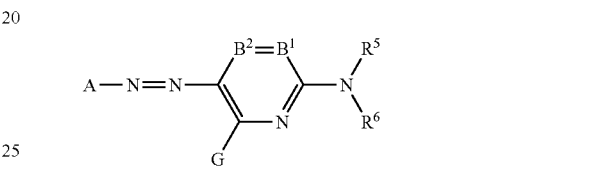

In the formula (MI), A represents a 5-membered heterocycle.

$B^1$ and $B^2$ each represents ═$CR^1$— or —$CR^2$═, or one of them represents a nitrogen atom while the other represents ═$CR^1$— or —$CR^2$═. $R^5$ and $R^6$ independently represent each a hydrogen atom or a substituent. The substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group and hydrogen atoms in each substituent may be further substituted.

G, $R^1$ and $R^2$ independently represent each a hydrogen atom or a substituent. The substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group and hydrogen atoms in each substituent may be further substituted.

Also, $R^1$ and $R^5$ or $R^5$ and $R^6$ may be bonded to each other to form a 5- or 6-membered ring.

Next the dye of the above-described formula (MI) will be described in greater detail.

In the formula (MI), A represents a 5-membered heterocyclic group. Examples of the hetero atom in the heterocycle include N, O and S. A nitrogen-containing 5-membered heterocycle is preferable. Further, an aliphatic ring, an aromatic ring or another heterocycle may be fused to the heterocycle. Preferable examples of the heterocycle include a pyrazole ring, an imidazole ring, a thiazole ring, an isothiazole ring, a thiadiazole ring, a benzothiazole ring, a benzooxazole ring and a benzoisothiazole ring. Each heterocyclic group may be further substituted. Among all, a pyrazole ring, an imidazole ring, an isothiazole ring, a thiadiazole ring and a benzothiazole ring represented by the following formulae (a) to (f) are preferable.

(a)
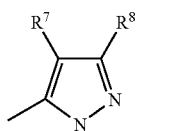

(b)
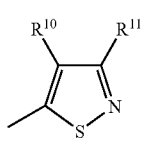

(c)
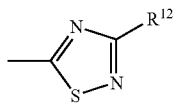

(d)
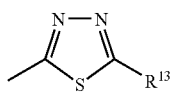

(e)
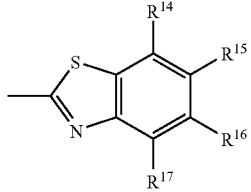

(f)
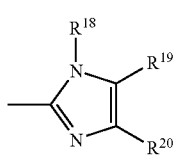

In the above formulae (a) to (f), $R^7$ to $R^{20}$ represent the same substituents as G, $R^1$ and $R^2$ in the formula (MI).

Among the formulae (a) to (e), a pyrazole ring and an isothiazole ring represented by the formulae (a) and (b) are preferable and a pyrazole ring represented by the formula (a) is most desirable.

In the formula (MI), $B^1$ and $B^2$ each represents =$CR^1$— or —$CR^2$=, or one of them represents a nitrogen atom while the other represents =$CR^1$— or —$CR^2$=, though it is preferable that $B^1$ and $B^2$ each represents =$CR^1$— or —$CR^2$=.

$R^5$ and $R^6$ independently represent each a hydrogen atom or a substituent. The substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group and hydrogen atoms in each substituent may be further substituted.

As preferable examples of $R^5$ and $R^6$, hydrogen atom, aliphatic groups, aromatic groups, heterocyclic groups, acyl groups, alkylsulfonyl groups and arylsulfonyl groups may be cited. Hydrogen atom, aromatic groups, heterocyclic groups, acyl groups, alkylsulfonyl groups and arylsulfonyl groups are still preferable and hydrogen atom, aryl groups and heterocyclic groups are most desirable. Hydrogen atoms in each substituent may be further substituted. However, $R^5$ and $R^6$ do not represent hydrogen atoms at the same time.

G, $R^1$ and $R^2$ independently represent each a hydrogen atom or a substituent. The substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group and hydrogen atoms in each substituent may be further substituted.

Preferable examples of G include a hydrogen atom, a halogen atom, an aliphatic group, an aromatic group, a hydroxy group, an alkoxy group, an aryloxy group, an acyloxy group, a heterocyclic oxy group, an amino group (including an alkylamino group, an arylamino group and a heterocyclic amino group), an acylamino group, an ureido group, a sulfamoylamino group, an alkoxycarbonylamino group, an aryloxycarbonylamino group, alkyl- and arylthio groups and a heterocyclic thio groups. Still preferable examples thereof include a hydrogen atom, a halogen atom, an alkyl group, a hydroxy group, an alkoxy group, an aryloxy group, an acyloxy group, an amino group and an acylamino group. Among all, a hydrogen atom, an amino group (preferably an anilino group) and an acylamino group are most desirable. Hydrogen atoms in each substituent may be further substituted.

As preferable examples of $R^1$ and $R^2$, citation can be made of hydrogen atom, alkyl groups, halogen atoms, alkoxycarbonyl groups, carboxyl group, carbamoyl group, hydroxy group, alkoxy groups and cyano group. Hydrogen atoms in each substituent may be further substituted.

Also, $R^1$ and $R^5$ or $R^5$ and $R^6$ may be bonded to each other to form a 5- or 6-membered ring.

In the case where A has a substituent or a substituent $R^1$, $R^2$, $R^5$, $R^6$ or G further has a substituent, examples of such substituents are the same as those cited above with regard to G, $R^1$ and $R^2$.

In the case where the dye represented by the above formula (MI) is a water-soluble dye, it preferably has an ionic hydrophilic group as a substituent on any of A, $R^1$, $R^2$, $R^5$, $R^6$ and G. Examples of the ionic hydrophilic group include sulfo group, carboxyl group, phosphono group, quaternary ammonium groups, etc. As the ionic hydrophilic group as described above, carboxyl group, phosphono group and sulfo group are preferable and carboxyl group and sulfo group are still preferable. These carboxyl group, phosphono group and sulfo group may be in the form of a salt. Examples of the counter ion forming the salt include ammonium ion, alkali metal ions (for example, lithium ion, sodium ion and potassium ion) and organic cations (for example, tetramethylammonium ion, tetramethylguanidium ion and tetramethylphosphonium).

Next, terms (substituents) employed herein will be illustrated. These terms are employed in common even in different symbols in the formula (MI) and the formula (MIa) which will be presented hereinafter.

Halogen atoms mean a fluorine atom, a chlorine atom and a bromine atom.

Aliphatic groups means alkyl groups, substituted alkyl groups, alkenyl groups, substituted alkenyl groups, alkynyl groups, substituted alkynyl groups, aralkyl groups and substituted aralkyl groups. The term "substituted" as used herein such as "substituted alkyl groups" means that a hydrogen atom in an "alkyl group" or the like is substituted by such a substituent as cited above with regard to G, $R^1$ and $R^2$, etc.

An aliphatic group may be branched or it may form a ring. It is preferable that an aliphatic group has from 1 to 20 carbon atoms, still preferably from 1 to 16 carbon atoms. It is preferable that the aryl moiety in an aralkyl group or a substituted aralkyl group is a phenyl group or a naphthyl group and a phenyl group is particularly preferable. Examples of the aliphatic group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

Aromatic groups means aryl groups and substituted aryl groups. As the aryl group, a phenyl group or a naphthyl group is preferable and a phenyl group is particularly preferable. It is preferable that an aromatic group has from 6 to 20 carbon atoms, still preferably from 6 to 16 carbon atoms.

Examples of the aromatic group include a phenyl group, a p-tolyl group, a p-methoxyphenyl group, an o-chlorophenyl group and an m-(3-sufopropylamino)phenyl group.

Heterocyclic groups include substituted heterocyclic groups. In a heterocyclic group, an aliphatic ring, an aromatic ring or another heterocycle may be fused to the heterocycle. As the heterocyclic group, a 5-membered or 6-membered heterocyclic group is preferable. Examples of the substituent in the substituted heterocyclic group include aliphatic groups, halogen atoms, alkylsulfonyl groups, arylsulfonyl groups, acyl groups, acylamino groups, sulfamoyl group, carbamoyl group, ionic hydrophilic groups and so on. Examples of the heterocyclic group include a 2-pyridyl group, a 2-thienyl group, a 2-thiazolyl group, a 2-benzothiazolyl group, a 2-benzoxazolyl group and a 2-furyl group.

Carbamoyl group includes substituted carbamoyl groups. Examples of the substituent include alkyl groups. Examples of the above-described carbamoyl group include a methylcarbamoyl group and a dimethylcarbamoyl group.

Alkoxycarbonyl groups include substituted alkoxycarbonyl groups. As the above-described alkoxycarbonyl group, an alkoxycarbonyl group having from 2 to 20 carbon atoms is preferable. Examples of the substituent include ionic hydrophilic groups. Examples of the above-described alkoxycarbonyl groups include a methoxycarbonyl group and an ethoxycarbonyl group.

Aryloxycarbonyl groups include substituted aryloxycarbonyl groups. As the above-described aryloxycarbonyl group, an aryloxycarbonyl group having from 7 to 20 carbon atoms is preferable. Examples of the substituent include ionic hydrophilic groups. Examples of the above-described aryloxycarbonyl groups include a phenoxycarbonyl group.

Heterocyclic oxycarbonyl groups include substituted heterocyclic oxycarbonyl groups. Examples of the heterocycle include the heterocycles cited above with regard to the heterocyclic groups. As the above-described heterocyclic oxycarbonyl group, a heterocyclic oxycarbonyl group having from 2 to 20 carbon atoms is preferable. Examples of the substituent include ionic hydrophilic groups. Examples of the above-described heterocyclic oxycarbonyl groups include a 2-pyridyloxycarbonyl group.

Acyl groups include substituted acyl groups. As the above-described acyl group, an acyl group having from 1 to 20 carbon atoms is preferable. Examples of the substituent include ionic hydrophilic groups. Examples of the above-described acyl groups include an acetyl group and a benzoyl group.

Alkoxy groups include substituted alkoxy groups. As the above-described alkoxy group, an alkoxy-group having from 1 to 20 carbon atoms is preferable. Examples of the substituent include alkoxy groups, a hydroxyl group and ionic hydrophilic groups. Examples of the above-described alkoxy groups include a methoxy group, an ethoxy group, an isopropoxy group, a methoxyethoxy group, a hydroxyethoxy group and a 3-carbopropoxy group.

Aryloxy groups include substituted aryloxy groups. As the above-described aryloxy group, an aryloxy group having from 6 to 20 carbon atoms is preferable. Examples of the substituent include alkoxy groups and ionic hydrophilic groups. Examples of the above-described aryloxy groups include a phenoxy group, a p-methoxyphenoxy group and an o-methoxyphenoxy group.

Heterocyclic oxy groups include substituted heterocyclic oxy groups. As examples of the heterocycle, the heterocycles presented above with regard to the heterocyclic groups may be cited. As the heterocyclic oxy group, a heterocyclic oxy group having from 2 to 20 carbon atoms is preferable. Examples of the substituent include alkyl groups, alkoxy groups and ionic hydrophilic groups. Examples of the above-described heterocyclic oxy groups include a 3-pyridyloxygroup and a 3-thienyloxy group.

As a silyloxy group, a silyloxy group substituted by an aliphatic group or an aromatic group having from 1 to 20 carbon atoms is preferable. Examples of the above-described silyloxy group include trimethylsilyloxy and diphenylmethylsilyloxy.

Acyloxy groups include substituted acyloxy groups. As the above-described acyloxy group, an acyloxy group having from 1 to 20 carbon atoms is preferable. Examples of the substituent include ionic hydrophilic groups. Examples of the above-described acyloxy groups include an aceotxy group and a benzoyloxy group.

Carbamoyloxy group includes substituted carbamoyloxy groups. Examples of the substituent include alkyl groups. Examples of the above-described carbamoyloxy groups include an N-methylcarbamoyloxy group.

Alkoxycarbonyloxy groups include substituted alkoxycarbonyloxy groups. As the above-described alkoxycarbonyloxy group, an alkoxycarbonyloxy group having from 2 to 20 carbon atoms is preferable. Examples of the above-described alkoxycarbonyloxy groups include a methoxycarbonyloxy group and an isopropoxycarbonyloxy group.

Aryloxycarbonyloxy groups include substituted aryloxycarbonyloxy groups. As the above-described aryloxycarbonyloxy group, an aryloxycarbonyloxy group having from 7 to 20 carbon atoms is preferable. Examples of the above-described aryloxycarbonyloxy groups include a phenoxycarbonyloxy group.

Amino group includes substituted amino groups. Examples of the substituent include alkyl groups, aryl groups and heterocyclic groups and these alkyl groups, aryl groups and heterocyclic groups may be further substituted. Alkylamino groups include substituted alkylamino groups. As the above-described alkylamino group, an alkylamino group having from 1 to 20 carbon atoms is preferable. Examples of the substituent include ionic hydrophilic groups. Examples of the above-described alkylamino groups include a methylamino group and a diethylamino group.

Arylamino groups include substituted arylamino groups. As the above-described arylamino group, an arylamino group having from 6 to 20 carbon atoms is preferable. Examples of the substituent include halogen atoms and ionic hydrophilic groups. Examples of the above-described arylamino groups include a phenylamino group and a 2-chlorophenylamino group.

Heterocyclic amino groups include substituted heterocyclic amino groups. As examples of the heterocycle, the heterocycles presented above with regard to the heterocyclic groups may be cited. As the above-described heterocyclic amino group, an heterocyclic amino group having from 2 to 20 carbon atoms is preferable. Examples of the substituent include alkyl groups, halogen atoms and ionic hydrophilic groups.

Acylamino groups include substituted acylamino groups. As the above-described acylamino group, an acylamino group having from 2 to 20 carbon atoms is preferable. Examples of the substituent include ionic hydrophilic groups. Examples of the above-described acylamino groups include an acetylamino group, a propionylamino group, a benzoylamino group, an N-phenylacetylamino group and a 3,5-disulfobenzoylamino group.

Ureido group includes substituted ureido groups. As the above-described ureido group, an ureido group having from 2 to 20 carbon atoms is preferable. Examples of the substituent include alkyl groups and aryl groups. Examples of the above-described ureido groups include a 3-methylureido group, a 3,3-dimethylureido group and a 3-phenylureido group.

Sulfamoylamino group includes substituted sulfamoylamino groups. Examples of the substituent include alkyl groups. Examples of the above-described sulfamoylamino groups include an N,N-dipropylsulfamoylamino group.

Alkoxycarbonylamino groups include substituted alkoxycarbonylamino groups. As the above-described alkoxycarbonylamino group, an alkoxycarbonylamino group having from 2 to 20 carbon atoms is preferable. Examples of the substituent include ionic hydrophilic groups. Examples of the above-described alkoxycarbonylamino groups include an ethoxycarbonylamino group.

Aryloxycarbonylamino groups include substituted aryloxycarbonylamino groups. As the above-described aryloxycarbonylamino group, an aryloxycarbonylamino group having from 7 to 20 carbon atoms is preferable. Examples of the substituent include ionic hydrophilic groups. Examples of the above-described aryloxycarbonylamino groups include a phenoxycarbonylamino group.

Alkylsulfonylamino groups and arylsulfonylamino groups include respectively substituted alkylsulfonylamino groups and substituted arylsulfonylamino groups. As the above-described alkylsulfonylamino group and arylsulfonylamino group, an alkylsulfonylamino group having from 1 to 20 carbon atoms and an arylsulfonylamino group having from 7 to 20 carbon atoms are preferable. Examples of the substituent include ionic hydrophilic groups. Examples of the above-described alkylsulfonylamino groups and arylsulfonylamino groups include a methylsulfonylamino group, an N-phenyl-methylsulfonylamino group, a phenylsulfonylamino group and a 3-carboxyphenylsulfonylamino group.

Heterocyclic sulfonylamino groups include substituted heterocyclic sulfonylamino groups. As examples of the heterocycle, the heterocycles presented above with regard to the heterocyclic groups may be cited. As the above-described heterocyclic sulfonylamino group an heterocyclic sulfonylamino group having from 1 to 12 carbon atoms is preferable. Examples of the substituent include ionic hydrophilic groups. Examples of the above-described heterocyclic sulfonylamino groups include a 2-thienylsulfonylamino group and a 3-pyridylsulfonylamino group.

Alkylthio groups, arylthio groups and heterocyclic thio groups include respectively substituted alkylthio groups, substituted arylthio groups and substituted heterocyclic thio groups. As examples of the heterocycle, the heterocycles presented above with regard to the heterocyclic groups may be cited. As the above-described alkylthio group, arylthio group and heterocyclic thio group, those having from 1 to 20 carbon atoms are preferable. Examples of the substituent include ionic hydrophilic groups. Examples of the above-described alkylthio groups, arylthio groups and heterocyclic thio groups include a methylthio group, phenylthio group and a 2-pyridylthio group.

Alkylsulfonyl groups and arylsulfonyl groups include respectively substituted alkylsulfonyl groups and substituted arylsulfonyl groups. Examples of the above-described alkylsulfonyl groups and arylsulfonyl groups include a methylsulfonyl group and a phenylsulfonyl group.

Heterocyclic sulfonyl groups include substituted heterocyclic sulfonyl groups. As examples of the heterocycle, the heterocycles presented above with regard to the heterocyclic groups may be cited. As the above-described heterocyclic sulfonyl group, a heterocyclic sulfonyl group having from 1 to 20 carbon atoms are preferable. Examples of the substituent include ionic hydrophilic groups. Examples of the above-described heterocyclic sulfonyl groups include a 2-thienylsulfonyl group and a 3-pyridylsulfonyl group.

Alkylsulfinyl groups and arylsulfinyl groups include respectively substituted alkylsulfinyl groups and substituted arylsulfinyl groups. Examples of the above-described alkylsulfinyl groups and arylsulfinyl groups include a methylsulfinyl group and a phenylsulfinyl group respectively.

Heterocyclic sulfinyl groups include substituted heterocyclic sulfinyl groups. As examples of the heterocycle, the heterocycles presented above with regard to the heterocyclic groups may be cited. As the above-described heterocyclic sulfinyl group, a heterocyclic sulfinyl group having from 1 to 20 carbon atoms are preferable. Examples of the substituent include ionic hydrophilic groups. Examples of the above-described heterocyclic sulfinyl groups include a 4-pyridylsulfinyl group.

Sulfamoyl group include substituted sulfamoyl groups. Examples of the substituent include alkyl groups. Examples of the above-described sulfamoyl groups include a dimethylsulfamoyl group and a di(2-hydroxyethyl)sulfamoyl group.

A particularly preferable structure in the invention is the one represented by the following formula (Mia).

Formula (MIa)

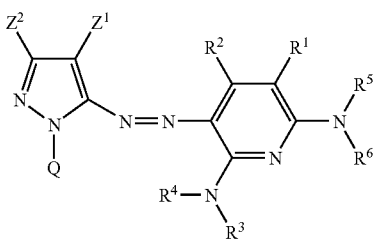

In the above formula, $R^1$, $R^2$, $R^5$ and $R^6$ have the same meaning each as defined in the formula (MI).

$R^3$ and $R^4$ independently represent each a hydrogen atom or a substituent. The substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Among all, a hydrogen atom, an aromatic group, a heterocyclic group, an acyl group, an alkylsulfonyl group and an arylsulfonyl group are preferable and a hydrogen atom, an aromatic group and a heterocyclic group are still preferable.

$Z^1$ represents an electron-withdrawing group having a Hammett's substituent constant σp of 0.20 or more. It is preferable that $Z^1$ is an electron-withdrawing group having a σp of 0.30 or more, still preferably an electron-withdrawing group having a σp of 0.60 or more, though it is desirable that the σp does not exceed 1.0. As preferable examples of the substituent, citat9ion may be made of electron-withdrawing groups as will be described hereinafter. Among all, acyl groups having from 2 to 20 carbon atoms, alkyloxycarbonyl groups having from 2 to 20 carbon atoms, a nitro group, a cyano group, alkylsulfonyl groups having from 2 to 20 carbon atoms, arylsulfonyl groups having from 2 to 20 carbon atoms, carbamoyl groups having from 2 to 20 carbon atoms and halogenated alkyl groups having from 2 to 20 carbon atoms are preferable. Particularly preferable examples thereof include cyano groups, alkylsulfonyl groups having from 2 to 20 carbon atoms and arylsulfonyl groups having from 2 to 20 carbon atoms, and a cyano group is most desirable therefor.

$Z^2$ represents a hydrogen atom or a substituent. The substituent is an aliphatic group, an aromatic group or a heterocyclic group. It is preferable that $Z^2$ is an aliphatic group, still preferably an alkyl group having from 1 to 6 carbon atoms.

Q represents a hydrogen atom or a substituent. The substituent is an aliphatic group, an aromatic group or a heterocyclic group. Among all, it is preferable that Q is group comprising nonmetal atoms required in forming a 5- to 8-membered ring. The 5- to 8-membered ring may be substituted and it may be a saturated ring or has an unsaturated bond. Among all, an aromatic group and a heterocyclic group are preferable. Preferable examples of the nonmetal atoms include a nitrogen atom, an oxygen atom, a sulfur atom and a carbon atom. Specific examples of such a cyclic structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzoimidazole ring, an oxazole ring, a benzoxazole ring, a thiazole ring, a benzothiazole ring, an oxane ring, a sulfolane ring and a thiane ring.

A hydrogen atom in each substituent illustrated in the formula (Mia) may be substituted. As examples of the substituent, the substituents described with regard to the formula (MI), the groups cited as examples of G, $R^1$ and $R^2$ and ionic hydrophilic groups.

Next, the Hammett's substituent constant σp used herein will be illustrated. Hammett's rule, which is an empirical rule proposed in 1935 by L. P. Hammett for quantitatively discussing the effect of a substituent on a reaction or equilibrium of a benzene derivative, has been widely accepted as reasonable today. Substituent's constants determined by Hammett's rule include σp and σm. These parameters are generally reported in detail in a large number of publications, for example, J. A. Dean, *Lange's Handbook of Chemistry*, 12th ed., 1979 (McGraw-Hill) and *Kagaku no Ryoiki*, extra issue No. 122, pp. 96–103, 1979 (Nankodo). Although each substituent is restricted or illustrated based on the Hammett's substituent constant σp in the present invention, it is needless to say that such substituents are not restricted to substituents having known parameters as reported in the above publications but include substituents the parameters of which seemingly fall within the range when measured in accordance with Hammett's rule. Although the compounds of the formula (1a) according to the invention include those which are not benzene derivatives, σp is also employed as an indication of the electron effect of each substituent regardless of the substitution position. That is to say, σp is employed in this meaning in the invention.

Examples of electron-withdrawing groups having a Hammett's substituent constant σp of 0.50 or more include a cyano group, a nitro group, alkylsulfonyl groups (for example, a methylsulfonyl group) and arylsulfonyl groups (for example, a phenylsulfonyl group).

Examples of electron-withdrawing groups having a Hammett's substituent constant σp of 0.45 or more include, in addition to those cited above, acyl groups (for example, an acetyl group), alkoxycarbonyl groups (for example, a dodecyloxycarbonyl group), aryloxycarbonyl groups (for example, an m-chlorophenoxycarbonyl), alkylsulfinyl groups (for example, n-propylsulfinyl), arylsulfinyl groups (for example, phenylsulfinyl), sulfamoyl groups (for example, N-ethylsulfamoyl and N,N-dimethylsulfamoyl) and halogenated alkyl groups (for example trifluoromethyl).

Examples of electron-withdrawing groups having a Hammett's substituent constant σp of 0.30 or more include, in addition to those cited above, acyloxy groups (for example, acetoxy), carbamoyl groups (for example, N-ethylcarbamoyl and N,N-dibutylcarbamoyl), halogenated alkoxy groups (for example, trifluoromethyloxy), halogenated aryloxy groups (for example, pentafluorophenyloxy), sulfonyloxy groups (for example, methylsulfonyloxy), halogenated alkylthio groups (for example, difluoromethylthio), aryl groups having 2 or more electron-withdrawing substituents having a Hammett's substituent constant σp of 0.15 or more (for example, 2,4-dinitrophenyl and pentachlorophenyl) and heterocyclic groups (for example, 2-benzoxazolyl, 2-benzothiazolyl and 1-phenyl-2-benzoimidazolyl).

Specific examples of electron-withdrawing groups having a Hammett's substituent constant σp of 0.20 or more include, in addition to those cited above, halogen atoms and so on.

Concerning the combination of preferable substituents in the azo dye represented by the above-described formula (MI), it is favorable that $R^5$ and $R^6$ are each a hydrogen atom, an alkyl group, an aryl group, a heterocyclic group, a sulfonyl group or an acyl group, still preferably a hydrogen atom, an aryl group, a heterocyclic group or a sulfonyl group and a hydrogen atom, an aryl group or a heterocyclic group is most desirable, provided that $R^5$ and $R^6$ do not represent hydrogen atoms at the same time. It is preferable that G is a hydrogen atom, a halogen atom, an alkyl group, a hydroxyl group, an amino group or an acylamino group, still preferably a hydrogen atom, a halogen atom, an amino group or an acylamino group and a hydrogen atom, an amino group or an acylamino group is most desirable.

It is preferable that A is a pyrazole ring, an imidazole ring, an isothiazole ring, a thiadiazole ring or a benzothiazole ring, still preferably a pyrazole ring or an isothiazole ring and a pyrazole ring is most desirable.

It is preferable that $B^1$ and $B^2$ are respectively $=CR^1-$ and $-CR^2=$ wherein $R^1$ and $R^2$ preferably represent each a hydrogen atom, an alkyl group, a halogen atom, a cyano group, a carbamoyl group, a carboxyl group, a hydroxyl group, an alkoxy group or an alkoxycarbonyl group, still preferably a hydrogen atom, an alkyl group, a carboxyl group, a cyano group or a carbamoyl group.

Concerning the combination of preferable substituents in the compound represented by the above-described formula (MI), it is favorable that at least one of the substituents is selected from the above-described preferable groups. A compound having a larger number of substituents selected from the above-described preferable groups is still preferable and a compound all of the substituents of which are selected from the above-described preferable ones is most desirable.

Next, specific examples of the compound (azo dye) represented by the above-described formula (MI) will be presented, though the azo dye to be used in the invention is not restricted thereto.

TABLE 14

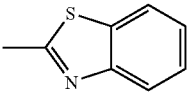

| Colorant | $R_1$ | $R_2$ | $R_3$ |
|---|---|---|---|
| a-1 | 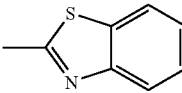 |  | 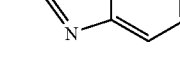 |
| a-2 | 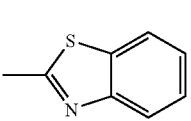 | 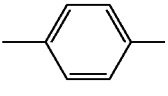 | 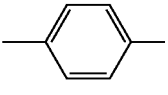 |
| a-3 |  | 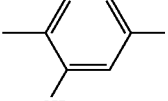 | 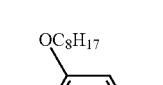 |
| a-4 |  | 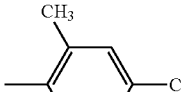 | 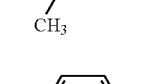 |
| a-5 | 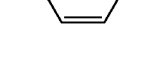 | 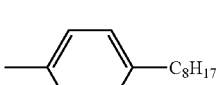 |  |

TABLE 15
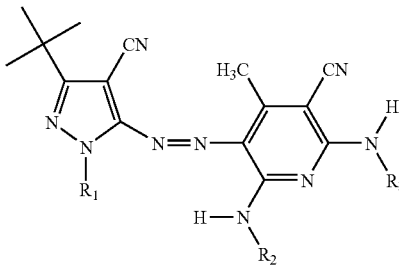
| Colorant | R₁ | R₂ | R₃ |
|---|---|---|---|
| a-6 | 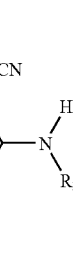 | 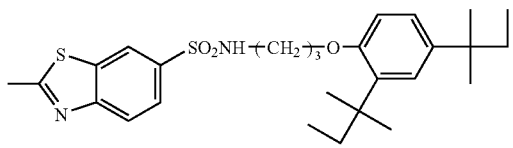 | 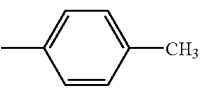 |
| a-7 | 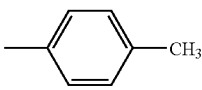 | 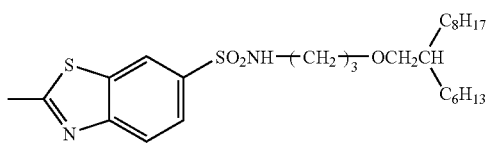 | 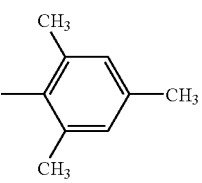 |
| a-8 | 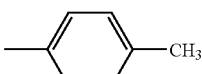 | 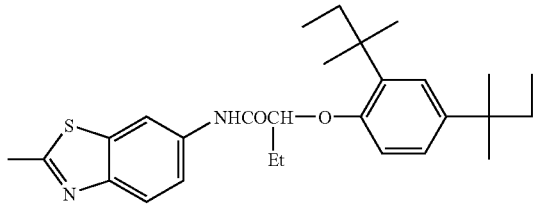 | 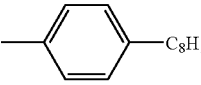 |
| a-9 | 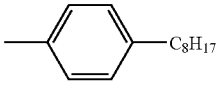 | 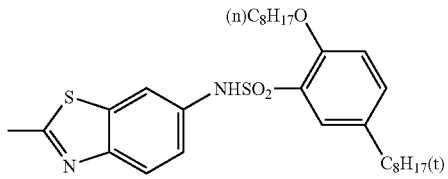 | $C_8H_{17}(t)$ |
| a-10 | 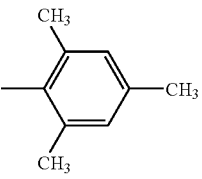 | 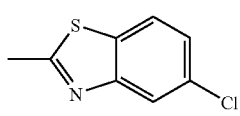 | 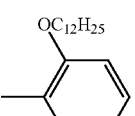 |

TABLE 16
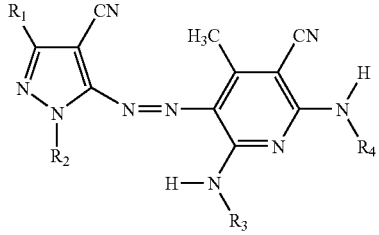
| Colorant | R₁ | R₂ | R₃ | R₄ |
|---|---|---|---|---|
| a-11 |  | 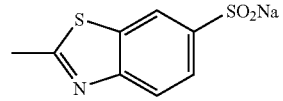 | 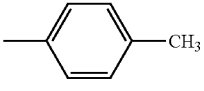 | 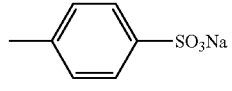 |
| a-12 | 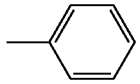 | 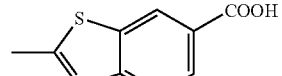 | 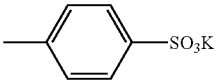 | 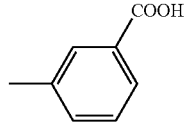 |
| a-13 | 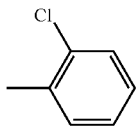 | <br>(4,5-mix) | 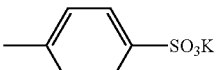 | 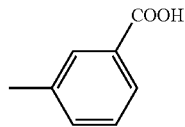 |
| a-14 |  | 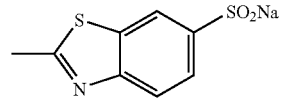 | 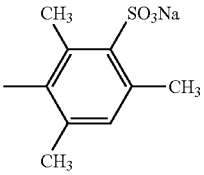 | 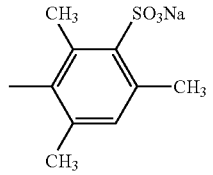 |
| a-15 |  | 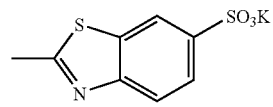 | 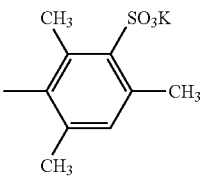 | 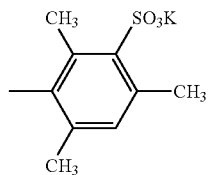 |
| a-16 |  | 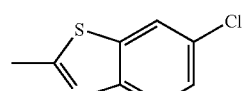 | 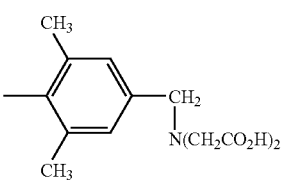 | 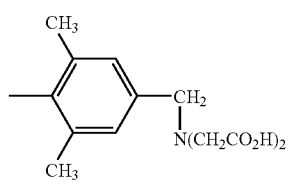 |
| a-17 |  | 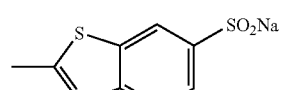 | 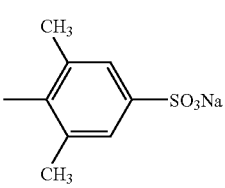 | 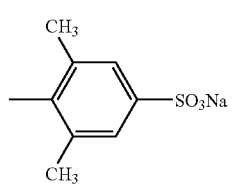 |

TABLE 17

| Colorant | R₁ | R₂ | R₃ | R₄ |
|---|---|---|---|---|
| a-18 | 2-benzothiazolyl | 2-benzothiazolyl | 2,4,6-trimethylphenyl | 2,4,6-trimethylphenyl |
| a-19 | 5-chloro-2-benzothiazolyl | —SO₂CH₃ | 2,4,6-trimethylphenyl | 4-methylphenyl |
| a-20 | 2-benzothiazolyl | —COCH₃ | $C_8H_{17}(t)$ | $C_8H_{17}(t)$ |
| a-21 | 6-chloro-2-benzothiazolyl | —SO₂CH₃ | 2,4-dimethylphenyl | $C_8H_{17}(t)$ |
| a-22 | 2-benzothiazolyl | H | 2,4,6-trimethylphenyl | 2,4,6-trimethylphenyl |
| a-23 | 2-benzothiazolyl | H | 2-methylphenyl | 2-methylphenyl |
| a-24 | 2-benzothiazolyl | H | 2,6-dimethylphenyl | 2,6-dimethylphenyl |

TABLE 17-continued

| Colorant | R₁ | R₂ | R₃ | R₄ |
|---|---|---|---|---|
| a-25 | 2-benzoxazolyl | 2-benzoxazolyl | 2,3,4,5-tetramethylphenyl | 2,3,4,5-tetramethylphenyl |

TABLE 18

| Colorant | R₁ | R₂ |
|---|---|---|
| a-26 | 2-benzothiazolyl | 2-benzothiazolyl-6-SO₂NH(CH₂)₃O-(2,4-di-tert-pentylphenyl) |
| a-27 | 2-benzothiazolyl-6-SO₂NH(CH₂)₃O-(2,4-di-tert-pentylphenyl) | 2-benzothiazolyl-6-SO₂NH(CH₂)₃O-(2,4-di-tert-pentylphenyl) |
| a-28 | 5-chloro-2-benzothiazolyl | 2-benzothiazolyl-6-NHC(O)CH(Et)O-(2,4-di-tert-pentylphenyl) |
| a-29 | 2-benzothiazolyl | 2-benzothiazolyl |

TABLE 18-continued
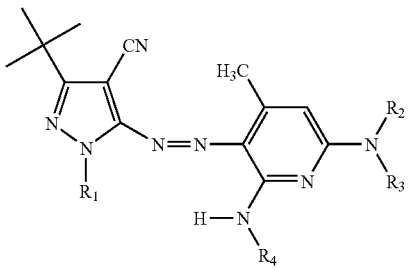
| | | | Colorant | R₃ | R₄ |
|---|---|---|---|---|---|
| a-30 | 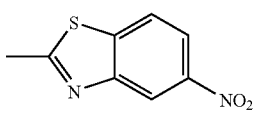 | 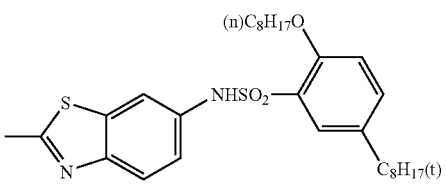 | | | |
| a-31 | 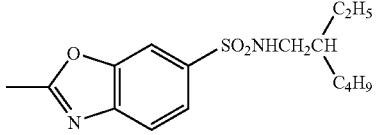 | 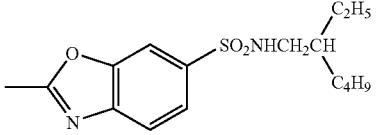 | | | |
| | | | a-26 | 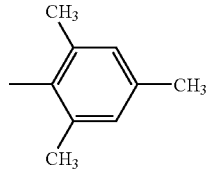 | 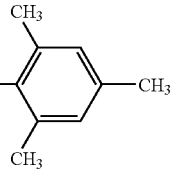 |
| | | | a-27 | 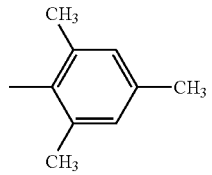 | 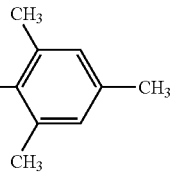 |
| | | | a-28 | 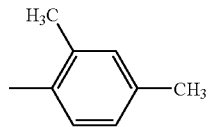 | 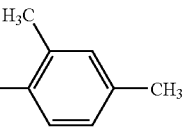 |
| | | | a-29 | 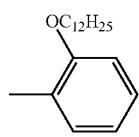 | 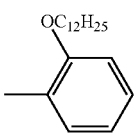 |
| | | | a-30 | 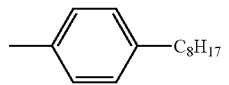 | C₈H₁₇(t) |
| | | | a-31 | 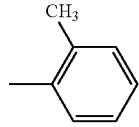 | 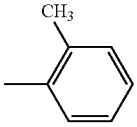 |

TABLE 19

| Colorant | R₁ | | |
|---|---|---|---|
| a-32 | 2-methylbenzothiazole-6-SO₃K | | 2-methylbenzothiazole-6-SO₃K |
| a-33 | 2-methylbenzothiazole-6-SO₂NH-(3,5-di-COOH-phenyl) | | 2-methylbenzothiazole-6-SO₂NH-(3,5-di-COOH-phenyl) |
| a-34 | 2-methylbenzothiazole-SO₂NH-(3,5-di-COOK-phenyl) (5,6-mix) | | 2-methylbenzothiazole-SO₂NH-(3,5-di-COOK-phenyl) (5,6-mix) |
| a-35 | 2-methylbenzothiazole-SO₃Na (5,6-mix) | | 2-methylbenzothiazole-SO₂NH-(3,5-di-COOH-phenyl) (5,6-mix) |

| Colorant | R₃ | R₄ |
|---|---|---|
| a-32 | 2,4,6-trimethylphenyl | 2,4,6-trimethylphenyl |
| a-33 | 2,4,6-trimethylphenyl | 2,4,6-trimethylphenyl |
| a-34 | 2,4,6-trimethylphenyl | 2,4,6-trimethylphenyl |

TABLE 19-continued

[Structure: pyrazole with t-butyl and CN groups, connected via N=N azo linkage to a pyridine bearing H₃C, NR₂R₃, and NHR₄ substituents; pyrazole N-R₁]

| | | |
|---|---|---|
| a-35 | —⟨C₆H₄⟩—CH₃ (p-tolyl) | 2,6-dimethylphenyl |

TABLE 20

[Same core structure as above: pyrazole (t-Bu, CN) —N=N— pyridine (CH₃, NR₂R₃, NHR₄); N-R₁]

| Colorant | R₁ | R₂ |
|---|---|---|
| a-36 | 2-methylbenzothiazol-6-yl-SO₂Na | 2-methylbenzothiazol-6-yl-SO₂Na |
| a-37 | 2-methylbenzothiazol-6-yl-SO₂NH—(5-substituted benzene-1,3-dicarboxylic acid dipotassium salt, COOK, COOK) | 2-methylbenzothiazol-6-yl |
| a-38 | 2-methylbenzothiazol-6-yl-SO₂Li | 2-methylbenzothiazol-6-yl-SO₂Li |
| a-39 | 2-methylbenzothiazol-6-yl-SO₂Na | 2-methylbenzothiazol-6-yl-SO₂Na |
| a-40 | 2-methylbenzothiazol-yl | 2-methylbenzothiazol-6-yl-SO₃K |

TABLE 20-continued
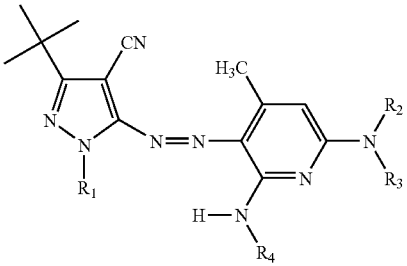
| Colorant | R₃ | R₄ |
|---|---|---|
| a-36 | 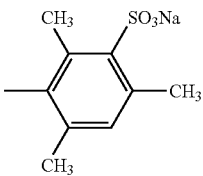 | 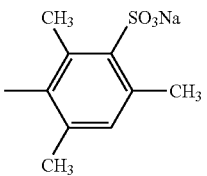 |
| a-37 | 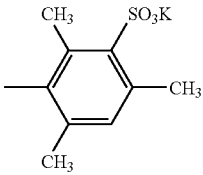 | 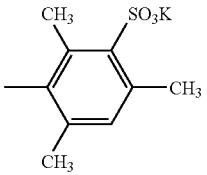 |
| a-38 | 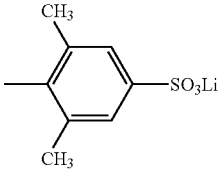 | 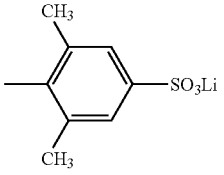 |
| a-39 | 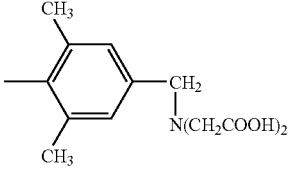 | 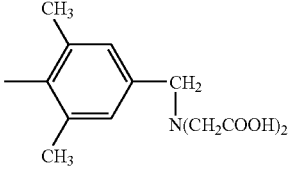 |
| a-40 | 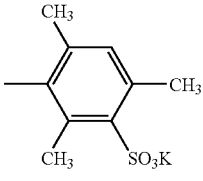 | 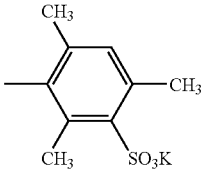 |

TABLE 21

| Colorant | R₁ | R₂ | R₃ | R₄ | R₅ |
|---|---|---|---|---|---|
| a-41 | 2,3-dimethylphenyl | CN | 2-pyridyl | H | $CONH_2$ |
| a-42 | t-Bu | Br | 2-pyrimidyl | COOEt | H |
| a-43 | 2-pyridyl | $SO_2CH_3$ | 4,6-bis(NHCH₃)-1,3,5-triazin-2-yl | $CONH_2$ | H |
| a-44 | t-Bu | CN | 2,4,5-tricyano-phenyl | H | H |
| a-45 | t-Bu | Br | 2,6-dichloro-4-nitrophenyl | H | $CONH_2$ |
| a-46 | t-Bu | CN | 2-benzothiazolyl | $CH_3$ | H |

| Colorant | R₆ | R₇ | R₈ |
|---|---|---|---|
| a-41 | $SO_2CH_3$ | 2-($OC_8H_{17}$)phenyl | 2-methylphenyl |
| a-42 | 2-benzothiazolyl | $C_8H_{17}(t)$ | $COCH_3$ |
| a-43 | 6-chloro-2-benzothiazolyl | 4-methylphenyl | CO-t-Bu |

TABLE 21-continued
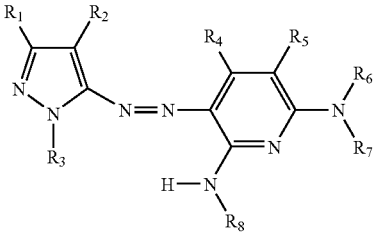
TABLE 22
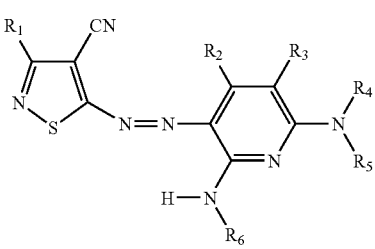

TABLE 22-continued
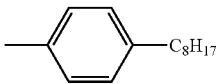
| Colorant | R₁ | R₂ | R₃ | R₄ | R₅ | R₆ |
|---|---|---|---|---|---|---|
| b-3 | CH₃ | CH₃ | CONH₂ | H | 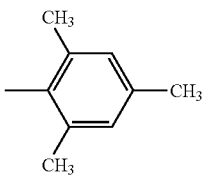 | 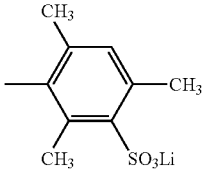 |
| b-4 | CH₃ | CH₃ | H | H | 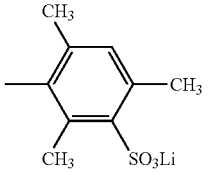 | 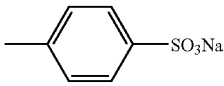 |
| b-5 | CH₃ | H | CN | H | 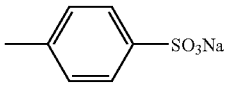 | 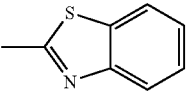 |
TABLE 23
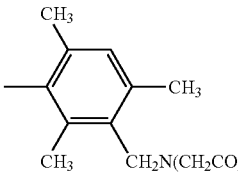
| Colorant | R₁ | R₂ | R₃ | R₄ | R₅ | R₆ |
|---|---|---|---|---|---|---|
| b-6 | CH₃ | CH₃ | H | 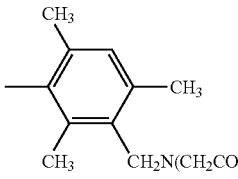 | 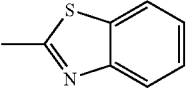 | 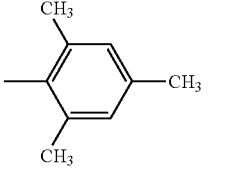 |
| b-7 | CH₃ | CH₃ | H | 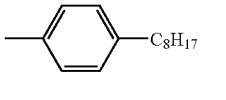 | | |

TABLE 23-continued

| Colorant | R₁ | R₂ | R₃ | R₄ | R₅ | R₆ |
|---|---|---|---|---|---|---|
| b-8 | CH₃ | H | H | SO₂CH₃ | 3,4-dimethylphenyl-SO₃Na | 3,4-dimethylphenyl-SO₃Na |

TABLE 24

| Colorant | R₁ | R₂ | R₃ | R₄ | R₅ | R₆ |
|---|---|---|---|---|---|---|
| c-1 | —SCH₃ | CH₃ | CN | H | C₈H₁₇(t) | 4-C₈H₁₇-phenyl |
| c-2 | phenyl | H | CONH₂ | H | 4-SO₃K-phenyl | 4-SO₃K-phenyl |
| c-3 | —S-CH₂CH₂-SO₃K | CH₃ | H | 2-methyl-6-SO₃K-benzothiazolyl | 4-SO₃K-phenyl | 4-SO₃K-phenyl |
| c-4 | —CH₃ | CH₃ | H | 2-methylbenzothiazol-6-yl-SO₂NH-(CH₂)₃-O-(2,4-di-tert-amylphenyl) | 2,4,6-trimethylphenyl | 4-C₈H₁₇-phenyl |
| c-5 | phenyl | H | H | 2-methylbenzothiazol-6-yl-NHSO₂-(2-OC₈H₁₇(n)-4-C₈H₁₇(t)-phenyl) | 2,4,6-trimethylphenyl | C₈H₁₇(t) |

TABLE 25

Structure: R¹-(1,3,4-thiadiazol-2-yl)-N=N-(pyridine with R², R³, NR⁴R⁵, NHR⁶ substituents)

| Colorant | R₁ | R₂ | R₃ | R₄ | R₅ | R₆ |
|---|---|---|---|---|---|---|
| d-1 | Me | CH₃ | CN | H | 4-(SO₃K)-phenyl | 4-(SO₃K)-phenyl |
| d-2 | Me | CH₃ | CN | H | 2,6-diethyl-4-methylphenyl | 2,6-diethyl-4-methylphenyl |
| d-3 | Me | H | H | 2-benzothiazolyl | 2,4,6-trimethyl-3-(SO₃K)-phenyl | 2,4,6-trimethyl-3-(SO₃K)-phenyl |
| d-4 | Ph | CH₃ | CONH₂ | H | 4-C₈H₁₇-phenyl | 4-C₈H₁₇-phenyl |
| d-5 | Ph | CH₃ | H | 2-methylbenzothiazol-6-yl-SO₂NH-(CH₂)₃-O-(2,4-di-tert-pentylphenyl) | 4-(OC₄H₉(n))-phenyl | 2,6-diethyl-4-methylphenyl |

TABLE 26

Structure: R₁-benzothiazol-2-yl-N=N-(pyridine with R², R³, NR⁴R⁵, NHR⁶ substituents); benzothiazole positions numbered 4,5,6,7

| Colorant | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazolyl | 4-C₈H₁₇-phenyl | 4-C₈H₁₇-phenyl |

TABLE 26-continued

| Colorant | R₁ | R₂ | R₃ | R₄ | R₅ | R₆ |
|---|---|---|---|---|---|---|
| e-3 | 5,6-diCl | CH₃ | H | (2-benzothiazolyl) | 2,3,5-trimethylphenyl | COCH₃ |
| e-4 | 5-CH₃ | H | CN | H | 4-SO₃K-phenyl | 4-SO₃K-phenyl |
| e-5 | 5-NO₂ | CH₃ | H | SO₂CH₃ | 2,3-dimethylphenyl | 2,3,5-trimethylphenyl | f-1, f-2 (structural formulas shown)

The inkjet recording ink composition according to the invention (also merely called "ink" herein) comprises at least one of the above-described azo dyes dissolved and/or dispersed in an aqueous medium. It preferably contains from 0.2 to 20% by mass, still preferably from 0.5 to 15% by mass, of the azo dye.

The azo dye to be used in the invention is substantially soluble in water. The expression "substantially soluble in water" means being soluble in water at 20° C. at a ratio of 2% by mass or more.

The inkjet ink composition according to the invention may contain the above-described azo dye (a magenta colorant) together with another magenta colorant.

Examples of the magenta colorant usable together include aryl or heteryl azo colorants (excluding those represented by the formula (MI) in the invention) containing, for example, phenols, naphthols or anilines as coupling component; azomethine colorants containing, for example, pyrazolones or pyrazolotriazoles as coupling component; methine colorants such as arylidene colorants, styryl colorants, merocyanine colorants and oxonol colorants; carbonium colorants such as diphenylmethane colorants, triphenylmethane colorants and xanthene colorants; quinone colorants such as naphthoquinone, anthraquinone and anthrapyridone; and fused polycyclic colorants such as dioxazine colorants. Such a colorant may be one which would not develop a magenta color until a part of its chromophore thereof is dissociated. In this case, the counter ion may be either an inorganic cation such as an alkali metal or ammonium or an organic cation such as pyridinium or a quaternary ammonium salt. Furthermore, use may be made of a polymer cation having such a cation as a partial structure thereof. An ink composition containing the compound of the formula (MI) according to the invention contains another colorant in such an amount as being acceptable in the ink deposition test.

Next, an yellow dye useful in the invention will be illustrated in detail.

From the viewpoints of fastness and ozone gas resistance, a yellow dye to be used in an ink (composition) usable in the inkjet recording method according to the invention should fulfill the following requirement. That is, the reflection density of an image printed on a reflective medium with the use of the ink is measured through a status A filter (for example, X-rite 310 TR densitometer) and a point showing a reflection density ($D_B$) in the yellow region of 0.90 to 1.10 is specified as the initial density of the ink. Next, this print is forcedly discolored using an ozone discoloration test machine capable of continuously generating 5 ppm of ozone and the time (t) until the reflection density amounts to 80% of the initial density is measured. Thus, forced discoloration kinetic constant (k) is determined as ($0.8 = e^{-kt}$). In this case, the kinetic constant is regulated to $5.0 \times 10^{-2}$ (hour$^{-1}$) or less, preferably $3.0 \times 10^{-2}$ (hour$^{-1}$) or less and still preferably $1.0 \times 10^{-2}$ (hour$^{-1}$) or less.

It is also preferable that the yellow dye is a dye having an oxidation potential nobler than 1.0 V (vs. SCE), still preferably nobler than 1.1 V (vs. SCE) and particularly preferably nobler than 1.15 V (vs. SCE). Regarding the dye type an azo dye fulfilling the above-described physical requirements is particularly preferred.

The oxidation potential level (Eox) can be easily measured by a person skilled in the art. Methods for measuring it are described in, for example, P. Delahay, *New Instrumental Methods in Electrochemistry* (1954, Interscience Publishers), A. J. Bard et al., *Electrochemical Methods* (1980, John Wiley & Sons), Akiya Fujishima et al., *Denki Kagaku Sokutei-ho* (1984, Gihodo Shuppan), etc.

More specifically speaking, the oxidation potential is determined by dissolving a test sample at a concentration of from $1 \times 10^{-4}$ to $1 \times 10^{-6}$ mol/l in a solvent such as dimethylformamide or acetonitrile containing a supporting electrolyte such as sodium perchlorate or tetrapropylammonium perchlorate and measuring as a value to SCE (saturated Calomel electrode) with the use of a cyclic voltammetry or the like. Although this value sometimes deviates about several 10 mV due to a potential difference between solutions or the solution resistance of the sample solution, the reproducibility of the potential can be assured by adding a standard (for example, hydroquinone).

To unambiguously define the potential, the oxidation potential of a dye is defined in the invention as a value (vs. SCE) measured in dimethylformamide containing 0.1 moldm$^{-3}$ of tetrapropylammonium perchlorate as a supporting electrolyte (dye concentration: 0.001 moldm$^{-3}$).

The Eox value stands for easiness of electron transfer from a sample to an electrode. A sample having a larger Eox (i.e., a nobler oxidation potential) has the less easiness of electron transfer toward an electrode, in other words, it is less oxidized. Concerning the structure of a compound, the nobility of oxidation potential is elevated by introducing an electron-withdrawing group but lowered by introducing an electron-donating group. In the invention, it is desirable to achieve a nobler oxidation potential by introducing an electron-withdrawing group into the yellow dye skeleton to thereby lower the reactivity with ozone which is an electrophile.

It is also preferable that the dye to be used in the invention has a favorable color hue as well as a favorable fastness. In particular, it is preferable that the dye shows a clear cut-off in the longer wavelength range in its absorption spectrum. Thus, a yellow dye having its λmax of from 390 nm to 470 nm and having a ratio I between the absorbance I at λmax and the absorbance I at λmax+70 nm, i.e., I(λmax+70 nm)/I(λmax) (hereinafter this ratio will be referred to as the ratio I) of 0.2 or less, still preferably 0.1 or less. The lower limit of this ratio is about 0.01. The values λmax and so on as described above are determined in an aqueous solution.

As a dye fulfilling these requirements in oxidation potential and absorption characteristics, one represented by the following formula (Y1) is preferable. However, a compound represented by the formula (Y1) does not necessarily fulfill the requirements in oxidation potential and I(λmax+70 nm)/I(λmax) as discussed above, so long as it has λmax of from 390 nm to 470 nm.

     Formula (Y1)

In the above formula, A and B independently represent each an optionally substituted heterocyclic group.

As the heterocyclic groups, 5-or 6-membered heterocyclic groups are preferable and they may have either a monocyclic structure or a polycyclic structure composed of 2 or more rings fused together. Either aromatic heterocyclic groups or non-aromatic heterocyclic groups are usable. As the hetero atom constituting the heterocyclic groups, N, O and S atoms are preferable.

Preferable examples of the heterocyclic group represented by A in the above formula (Y1) include 5-pyrazolone, pyrazole, triazole, oxazolone, isoxazolone, barbituric acid, pyridone, pyridine, rhodanine, pyrazolidindione, pyrazopyridone, meldrum acid and fused heterocyclic groups in which an aromatic hydrocarbon ring or another heterocycle is further fused to these heterocyclic groups. Among all, 5-pyrazolone, 5-aminopyrazole, pyridone, 2,6-diaminopyridine and pyrazales are preferable and, 5-aminopyrazole, 2-hydroxy-6-pyridone and pyrazolotriazole are particularly preferable.

Examples of the heterocyclic group represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine, thiazoline and so on. Among all, pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole and benzisoxazole are preferable. Quinoline, thiophene, pyrazole, thiazole, benzoxazole, benzisoxazole, isothiazole, imidazole, benzothiazole and thiadiazole are still preferable. Pyrazole, benzothiazole, imidazole, 1,2,4-thiadiazole and 1,3,4-thiadiazole are particularly preferable.

Examples of the substituents attached to A and B include halogen atoms, alkyl groups, cycloalkyl groups, aralkyl groups, alkenyl groups, alkynyl groups, aryl groups, heterocyclic groups, a cyano group, a hydroxyl group, a nitro group, alkoxy groups, aryloxy groups, a silyl group, an oxy group, heterocyclic oxy groups, acyloxy groups, a carbamoyloxy group, alkoxycarbonyloxy groups, aryloxycarbonyloxy groups, an amino group, acylamino groups, an aminocarbonylamino group, alkoxycarbonylamino groups, aryloxycarbonylamino groups, a sulfamoylamino group, alkyl and arylsulfonylamino groups, a mercapto group, alkylthio groups, arylthio groups, heterocyclic thio groups, a sulfamoyl group, alkyl- and arylsulfinyl groups, alkyl- and arylsulfonyl groups, acyl groups, aryloxycarbonyl groups, alkoxycarbonyl groups, a carbamoyl group, an imido group, a phosphino group, a phosphinyl group, a phosphinyloxy group, a phosphinylamino group, a silyl group and ionic hydrophilic groups.

In the case of using the dye of the formula (Y1) as a water-soluble dye, it preferably has at least one ionic hydrophilic group in its molecule. Examples of the ionic hydrophilic group include sulfo group, carboxyl group, phosphono group, quaternary ammonium groups, etc. As the ionic hydrophilic group as described above, carboxyl group, phosphono group and sulfo group are preferable and carboxyl group and sulfo group are still preferable. These carboxyl group, phosphono group and sulfo group may be in the form of a salt. Examples of the counter ion forming the salt include ammonium ion, alkali metal ions (for example, lithium ion, sodium ion and potassium ion) and organic cations (for example, tetramethylammonium ion, tetramethylguanidium ion and tetramethylphosphonium). Among these counter ions, alkali metal salts are preferable.

Among the dyes represented by the formula (Y1), the dyes represented by the formulae (Y2), (Y3) and (Y4) are preferred.

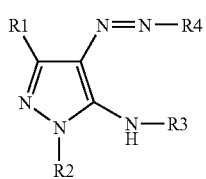

Formula (Y2)

In the formula (Y2), R1 and R3 represent each a hydrogen atom, a cyano group, an alkyl group, a cycloalkyl group, an aralkyl group, an alkoxy group, an alkylthio group, an arylthio group, an aryl group or an ionic hydrophilic group; R2 represents a hydrogen atom, an alkyl group, a cycloalkyl group, an aralkyl group, a carbamoyl group, an acyl group, an aryl group or a heterocyclic group; and R4 represents a heterocyclic group.

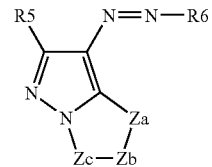

Formula (Y3)

In the formula (Y3), R5 represents a hydrogen atom, a cyano group, an alkyl group, a cycloalkyl group, an aralkyl group, an alkoxy group, an alkylthio group, an arylthio group, an aryl group or an ionic hydrophilic group; Za represents —N=, —NH— or —C(R11)=; Zb and Zc independently represent each —N= or —C(R11)=, wherein R11 represents a hydrogen atom or a nonmetal substituent; and R6 represents a heterocyclic group.

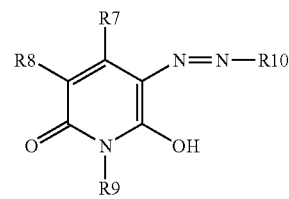

Formula (Y4)

In the formula (Y4), R7 and R9 independently represent each a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, an alkylsulfonyl group, an arylsulfonyl group, an acyl group, an amino group, a hydroxy group or an ionic hydrophilic group; and R10 represents a heterocyclic group.

Examples of the alkyl groups represented by R1, R2, R3, R5, R7, R8 and R9 in the above-described formulae (Y2), (Y3) and (Y4) include substituted alkyl groups and unsubstituted alkyl groups. As the alkyl groups, alkyl groups having from 1 to 20 carbon atoms are preferable. Examples of the substituent include a hydroxyl group, alkoxy groups, a cyano group, halogen atoms and ionic hydrophilic groups. Examples of the alkyl groups include methyl, ethyl, butyl, isopropyl, t-butyl, hydroxyethyl, methoxyethyl, cyanoethyl, trifluoromethyl, 3-sulfopropyl and 4-sulfobutyl groups.

The cycloalkyl groups represented by R1, R2, R3, R5, R7, R8 and R9 include substituted cycloalkyl groups and unsubstituted cycloalkyl groups. As the cycloalkyl groups, cycloalkyl groups having from 5 to 12 carbon atoms are preferable. Examples of the substituent include ionic hydrophilic groups. Examples of the above-described cycloalkyl groups include a cyclohexyl group.

The aralkyl groups represented by R1, R2, R3, R5, R7, R8 and R9 include substituted aralkyl groups and unsubstituted aralkyl groups. As the aralkyl groups, aralkyl groups having from 7 to 20 carbon atoms are preferable. Examples of the substituent include ionic hydrophilic groups. Examples of the above-described aralkyl groups include benzyl and 2-phenethyl groups.

The aryl groups represented by R1, R2, R3, R5, R7, R8 and R9 include substituted aryl groups and unsubstituted aryl groups. As the aryl groups, aryl groups having from 6 to 20 carbon atoms are preferable. Examples of the substituent include alkyl groups, alkoxy groups, halogen atoms, alkylamino groups and ionic hydrophilic groups. Examples of the above-described aryl groups include phenyl, p-tolyl, p-methoxyphenyl, o-chlorophenyl and m-(3-sulfopropylamino)phenyl groups.

The alkylthio groups represented by R1, R2, R3, R5, R7, R8 and R9 include substituted alkylthio groups and unsubstituted alkylthio groups. As the alkylthio groups, alkylthio groups having from 1 to 20 carbon atoms are preferable. Examples of the substituent include ionic hydrophilic groups. Examples of the above-described alkylthio groups include methylthio and ethylthio groups.

The arylthio groups represented by R1, R2, R3, R5, R7, R8 and R9 include substituted arylthio groups and unsubstituted arylthio groups. As the arylthio groups, arylthio groups having from 6 to 20 carbon atoms are preferable. Examples of the substituent include alkyl groups and ionic hydrophilic groups. Examples of the above-described arylthio groups include phenylthio and p-tolylthio groups.

As the heterocyclic groups represented by R2 and $R^{22}$ as will be described hereinafter, 5- or 6-membered heterocycles are preferable. These heterocycles may be further fused. Preferable examples of the hetero atom constituting the heterocycle include N, S and O. These heterocyclic groups may be either aromatic heterocycles or nonaromatic heterocycles. These heterocycles may be further substituted and examples of the substituent are the same as will be cited as substituents of aryl groups hereinafter. Preferable examples of the heterocycles include 6-membered nitrogen-containing aromatic heterocycles, in particular, triazine, pyrimidine and phthalazine.

The halogen atom represented by R8 include a fluorine atom, a chlorine atom and a bromine atom.

The alkoxy groups represented by R1, R3, R5 and R8 include substituted alkoxy groups and unsubstituted alkoxy groups. As the alkoxy groups, alkoxy groups having from 1 to 20 carbon atoms are preferable. Examples of the substituent include a hydroxyl group and ionic hydrophilic groups. Examples of the above-described alkoxy groups include methoxy, ethoxy, isopropoxy, methoxyethoxy, hydroxyethoxy and 3-carboxypropoxy groups.

The aryloxy group represented by R8 include substituted aryloxy groups and unsubstituted aryloxy groups. As the aryloxy groups, aryloxy groups having from 6 to 20 carbon atoms are preferable. Examples of the substituent include alkoxy groups and ionic hydrophilic groups. Examples of the above-described aryloxy group include phenoxy, p-methoxyphenoxy and o-methoxyphenoxy groups.

The acylamino group represented by R8 includes substituted acylamino groups and unsubstituted acylamino groups. As the acylamino groups, acylamino groups having from 2 to 20 carbon atoms are preferable. Examples of the substituent include ionic hydrophilic groups. Examples of the above-described acylamino group include acetamido, propionamido, benzamido and 3,5-disulfobenzamido groups.

The sulfonylamino group represented by R8 includes substituted sulfonylamino groups and unsubstituted sulfonylamino groups. As the sulfonylamino groups, sulfonylamino groups having from 1 to 20 carbon atoms are preferable. Examples of the above-described sulfonylamino group include methylsulfonylamino and ethylsulfonylamino groups.

The alkoxycarbonylamino group represented by R8 includes substituted alkoxycarbonylamino groups and unsubstituted alkoxycarbonylamino groups. As the alkoxycarbonylamino groups, alkoxycarbonylamino groups having from 2 to 20 carbon atoms are preferable. Examples of the substituent include ionic hydrophilic groups. Examples of the above-described alkoxycarbonylamino group include an ethoxycarbonylamino group.

The ureido group represented by R8 includes substituted ureido groups and unsubstituted ureido groups. As the ureido groups, ureido groups having from 1 to 20 carbon atoms are preferable. Examples of the substituent include alkyl groups and aryl groups. Examples of the above-described ureido group include 3-methylureido, 3,3-dimethylureido and 3-phenylureido groups.

The alkoxycarbonyl groups represented by R7, R8 and R9 include substituted alkoxycarbonyl groups and unsubstituted alkoxycarbonyl groups. As the alkoxycarbonyl groups, alkoxycarbonyl groups having from 2 to 20 carbon atoms are preferable. Examples of the substituent include ionic hydrophilic groups. Examples of the above-described alkoxycarbonyl group include methoxycarbonyl and ethoxycarbonyl groups.

The carbamoyl groups represented by R2, R7, R8 and R9 include substituted carbamoyl groups and unsubstituted carbamoyl groups. Examples of the substituent include alkyl groups. Examples of the above-described carbamoyl group include methylcarbamoyl and diemthylcarbamoyl groups.

The sulfamoyl groups represented by R8 include substituted sulfamoyl groups and unsubstituted sulfamoyl groups. Examples of the substituent include alkyl groups. Examples of the above-described sulfamoyl group include dimethylsulfamoyl and di-(2-hydroxyethyl)sulfamoyl groups.

Examples of the alkylsulfonyl and arylsulfonyl groups represented by R8 include methylsulfonyl and phenylsulfonyl groups.

The acyl groups represented by R2 and R8 include substituted acyl groups and unsubstituted acyl groups. As the acyl groups, acyl groups having from 1 to 20 carbon atoms are preferable. Examples of the substituent include ionic hydrophilic groups. Examples of the above-described acyl group include acetyl and benzoyl groups.

The amino group represented by R8 includes substituted amino groups and unsubstituted amino group. Examples of the substituent include alkyl groups, aryl groups and heterocyclic groups. Examples of the above-described amino groups include methylamino, diethylamino, anilino and 2-chloroanilino groups.

The heterocyclic groups represented by R4, R6 and R10 are the same as the optionally substituted heterocyclic groups represented by B in the formula (Y1). Also, preferable examples, still preferable examples and particularly preferable examples thereof are the same as those cited above respectively. Examples of the substituent include ionic hydrophilic groups, alkyl groups having from 1 to 12 carbon atoms, aryl groups, alkyl- or arylthio groups, halogen atoms, a cyano group, a sulfamoyl group, a sulfonamino group, a carbamoyl group, acylamino groups, etc. The above alkyl groups and aryl groups may be further substituted.

In the above-described formula (Y3), Za represents —N=, —NH— or —C(R11)=; and Zb and Zc independently represent each —N= or —C(R11)=, wherein R11 represents a hydrogen atom or a nonmetal substituent. As the nonmetal substituent represented by R11, a cyano group, a cycloalkyl group, an aralkyl group, an aryl group, an alkylthio group, an arylthio group or an ionic hydrophilic group is preferable. The above substituents are respectively the same as the substituents represented by R1 and preferable examples thereof are also the same. Examples of the heterocyclic skeleton having two 5-membered rings contained in the above-described formula (Y3) are as follows.

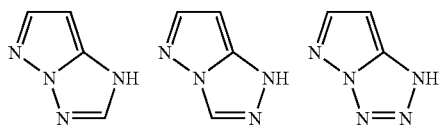

Examples of the substituents of the above-described substituents, which may be further substituted, are the same as the substituents of the heterocycles A and B in the above-described formula (Y1).

In the case of using the dyes of the formulae (Y2) to (Y4) as water-soluble dyes, these dyes preferably have at least one ionic hydrophilic group per molecule. Examples of such dyes include dyes represented by the above-described formulae (Y2) to (Y4) wherein at least one of R1, R2, R3, R5, R7, R8 and R9 is an ionic hydrophilic group, and dyes represented by the above-described formulae (Y2) to (Y4) wherein at least one of R1 to R11 has an ionic hydrophilic group as a substituent.

Among the above-described formulae (Y2), (Y3) and (Y4), the formula (Y2) is preferable. Among all, a dye represented by the following formula (Y2-1) is particularly preferable.

Formula (Y2-1)

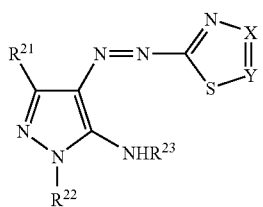

In the formula (Y2-1), $R^{21}$ and $R^{23}$ represent each a hydrogen atom, an alkyl group, a cycloalkyl group, an aralkyl group, an alkoxy group or an aryl group. $R^{22}$ represents an aryl group or a heterocyclic group. One of X and Y represents a nitrogen atom, while the other represents —$CR^{24}$. $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group. Each substituent may be further substituted.

A dye of the formula (Y2-1) having an ionic hydrophilic group is favorable.

Next, specific examples of dyes preferably employed in the invention will be presented, though the dyes to be used in the invention are not restricted thereto. These compounds can be synthesized by reference to JP-A-2-24191, JP-A-2001-279145 and Japanese Patent Application 2000-124832.

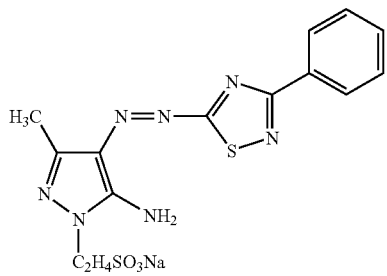

YI-1

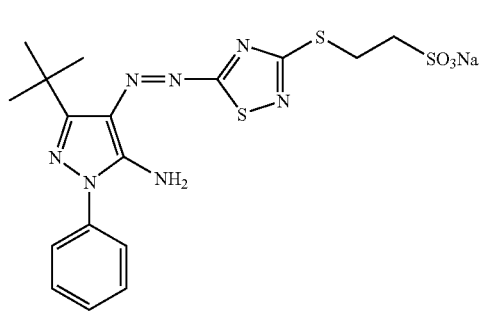

YI-2

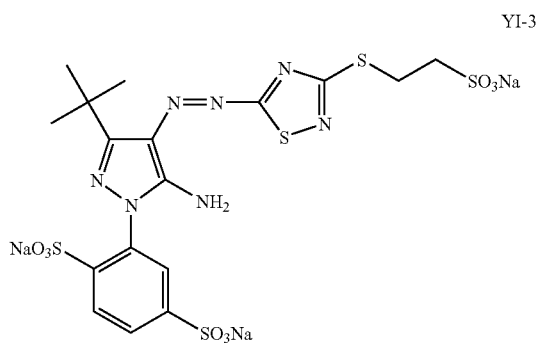

YI-3

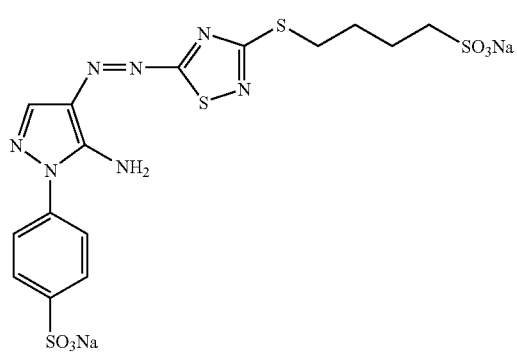

YI-4

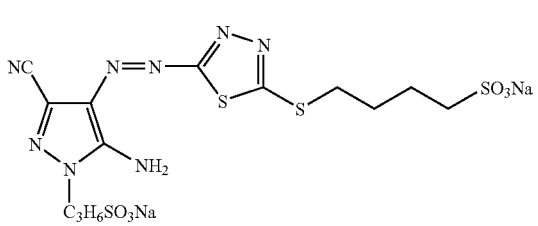

YI-5

-continued
YI-6
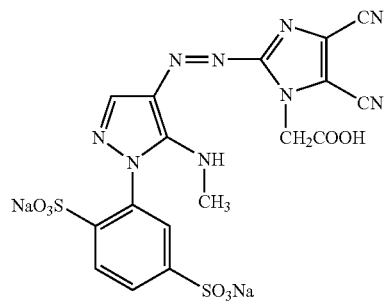
YI-7
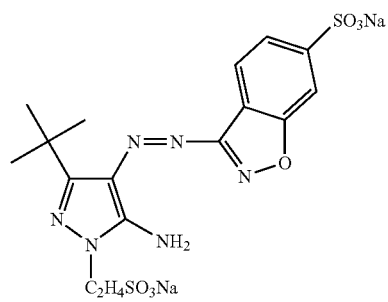
YI-8
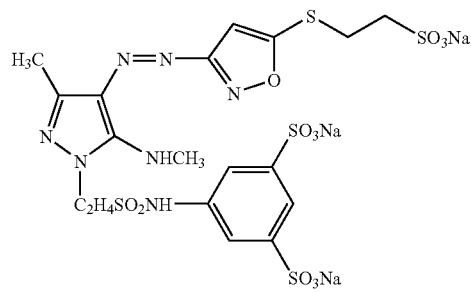
YI-9
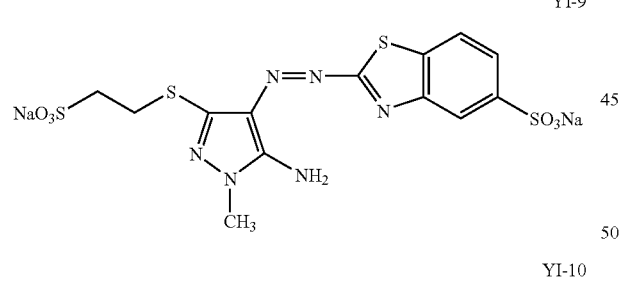
YI-10
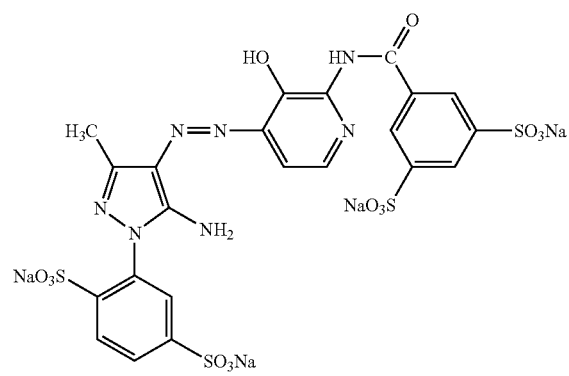
-continued
YI-11
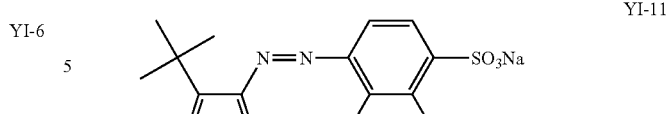
YI-12
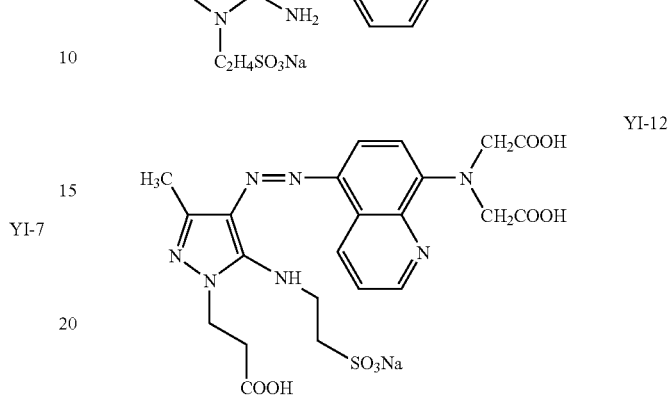
YI-13
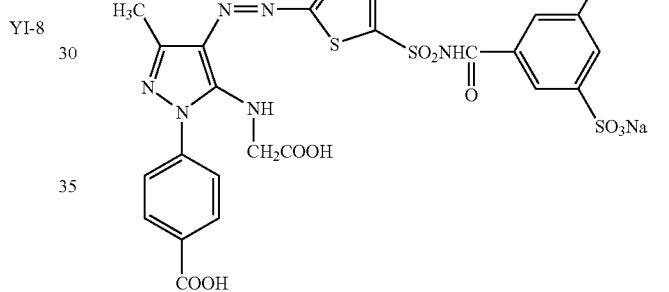
YI-14
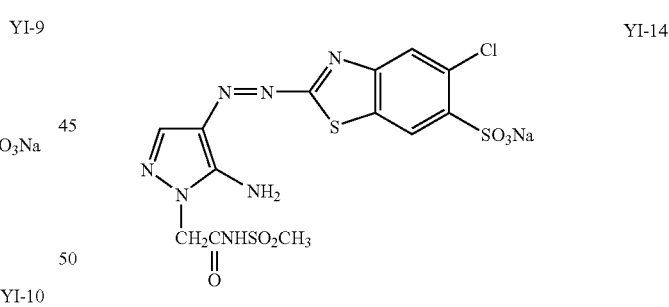
YI-15
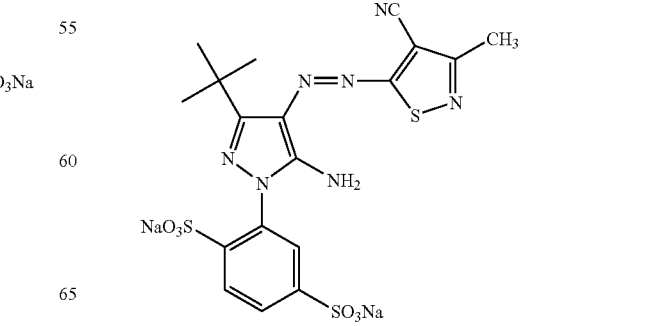

-continued
YI-16
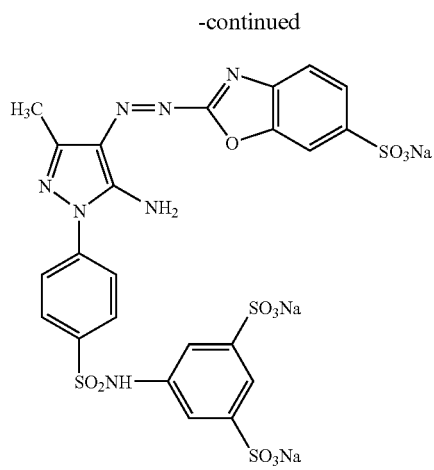
YI-17
| Colorant | R |
|---|---|
| YI-18 | CH$_3$ |
| YI-19 | C$_3$H$_5$SO$_3$Na |
| YI-20 | H |
| YI-21 | C$_2$H$_4$CN |
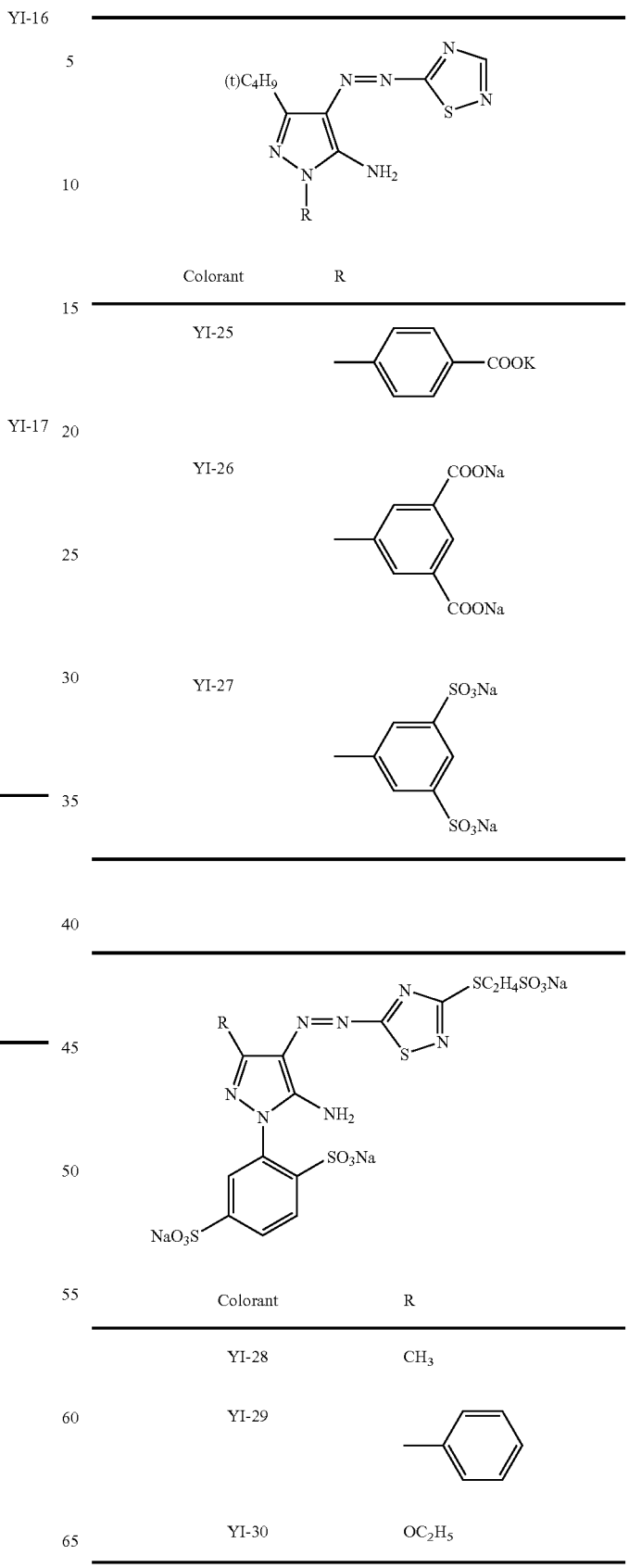
| Colorant | R |
|---|---|
| YI-28 | CH$_3$ |
| YI-29 | (phenyl) |
| YI-30 | OC$_2$H$_5$ |

121

Structure (pyrazole-azo-thiadiazole with 2,5-disulfonatophenyl):

| Colorant | R |
|---|---|
| YI-31 | —C₆H₅ (phenyl) |
| YI-32 | CH₃ |
| YI-33 | SC₂H₄SO₃Na |
| YI-34 | SO₂C₂H₄SO₃Na |

Structure (pyrazole-azo-1,3,4-thiadiazole with 2,5-disulfonatophenyl):

| Colorant | R |
|---|---|
| YI-35 | H |
| YI-36 | CH₃ |
| YI-37 | —C₆H₅ (phenyl) |

Structure (pyrazole-azo-1,3,4-thiadiazole with 4-R-phenyl):

| Colorant | R |
|---|---|
| YI-38 | COOC₄H₉ |
| YI-39 | CON(C₄H₉)₂ |
| YI-40 | SO₂NHC₁₂H₂₅ |
| YI-41 | OC₈H₁₇ |

122

Structure (pyrazole-azo-thiadiazole with 3,5-di-R-phenyl):

| Colorant | R | R' |
|---|---|---|
| YI-42 | CON(C₄H₉)₂ | H |
| YI-43 | COOC₈H₁₇ | H |
| YI-44 | CON(C₄H₉)₂ | —C₆H₅ |
| YI-45 | CON(C₄H₉)₂ | CH₃ |
| YI-46 | H | —C₆H₅ |
| YI-47 | H | SC₈H₁₇ |

Structure (pyrazole-azo-thiadiazole with triazinyl group bearing two R):

| Colorant | R |
|---|---|
| YI-48 | —NHC₂H₄COOK |
| YI-49 | —NHC₂H₄SO₃Na |
| YI-50 | —NH—C₆H₃(COOK)₂ (3,5-dicarboxylate anilino) |
| YI-51 | —NH—C₆H₃(SO₃K)₂ (3,5-disulfonate anilino) |

-continued
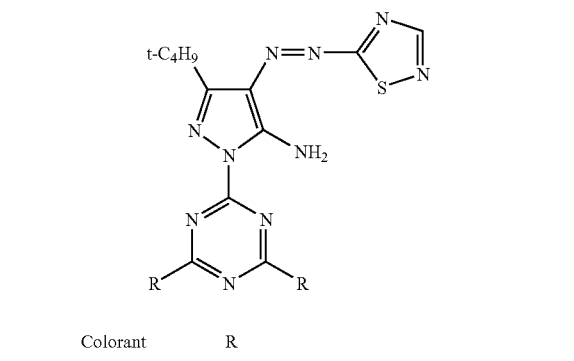
| Colorant | R |
|---|---|
| YI-52 |  |
| YI-53 | —N(CH₂COONa)₂ |
| YI-54 |  |
| YI-55 |  |
| YI-56 | —NHC₆H₁₃ |
| YI-57 | —N(C₄H₉)₂ |
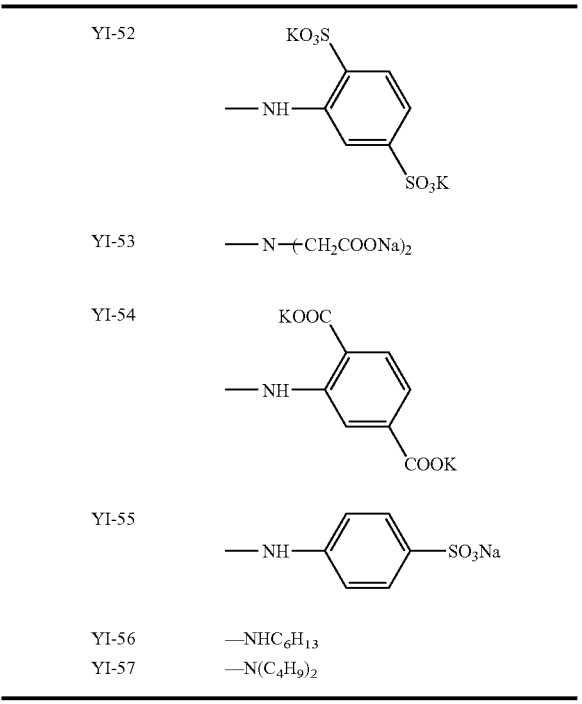
| Colorant | Ar |
|---|---|
| YI-58 | 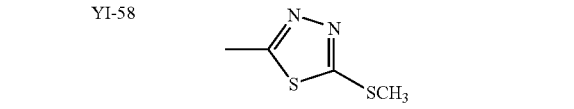 |
-continued
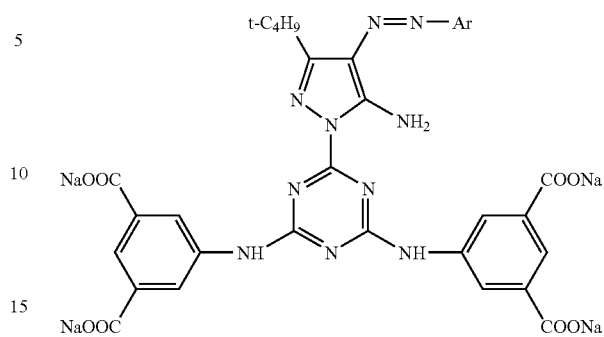
| Colorant | Ar |
|---|---|
| YI-59 | (5-methyl-1,2,4-thiadiazol-3-yl)-SC₂H₄SO₃Na |
| YI-60 | 5-methyl-3-phenyl-1,2,4-thiadiazole |
| YI-61 | 2-methylbenzoxazole-6-SO₃Na |
| YI-62 | 2-methyl-1-(CH₂COONa)-imidazole-4,5-dicarbonitrile |
| YI-63 | 4-SO₃Na-phenyl |
| YI-64 | 2,5-dichloro-4-methylphenyl-SO₃Na |
| YI-65 | 2-chloro-4-methyl-phenyl-CN |
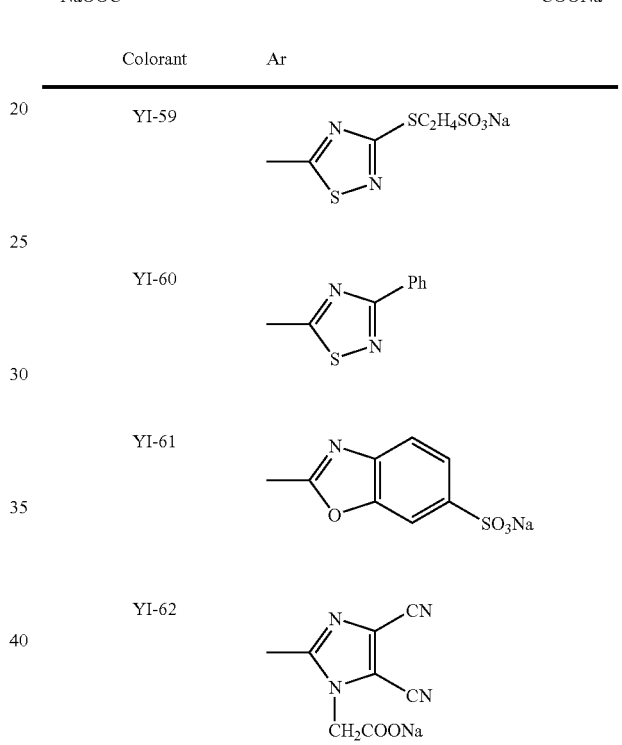

| Colorant | R | R' |
|---|---|---|
| YI-66 | Ph | H |
| YI-67 | OC$_2$H$_5$ | C$_2$H$_5$ |
| YI-68 | CH$_3$ | H |
| YI-69 | t-C$_4$H$_9$ | H |
| YI-70 | t-C$_4$H$_9$ | —C$_2$H$_4$COOH |

Colorant Y1-71

| Colorant | R |
|---|---|
| YI-72 | H |
| YI-73 | OCH$_3$ |
| YI-74 | OH |
| YI-75 | SO$_3$Na |
| YI-76 | F |
| YI-77 | (N-methylpyridinium-4-carboxylate) |

| Colorant | R$^1$ | R$^2$ | R$^3$ |
|---|---|---|---|
| YI-78 | Cl | Cl | Cl |
| YI-79 | Cl | Cl | F |
| YI-80 | Cl | —CONHPh | Cl |

| Colorant | R$^1$ | R$^2$ | R$^3$ |
|---|---|---|---|
| YI-81 | F | H | H |
| YI-82 | Cl | H | F |

| Colorant | R$^1$ | R$^2$ | R$^3$ |
|---|---|---|---|
| YI-83 | H | F | F |
| YI-84 | F | F | H |

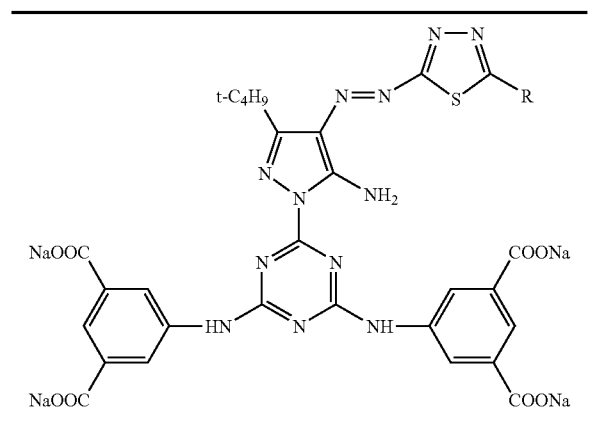

| Colorant | R |
|---|---|
| YI-85 | H |
| YI-86 | CH₃ |
| YI-87 | Ph |
| YI-88 | SCH$_2$COONa |
| YI-89 | SC$_2$H$_5$ |
| YI-90 | SC$_4$H$_9$-n |
| YI-91 | SCH$_2$CHMe$_2$ |
| YI-92 | SCHMeEt |
| YI-93 | SC$_4$H$_9$-t |
| YI-94 | SC$_7$H$_{15}$-n |
| YI-95 | SC$_2$H$_4$OC$_2$H$_5$ |
| YI-96 | SC$_2$H$_4$OC$_4$H$_9$-n |
| YI-97 | SCH$_2$CF$_3$ |

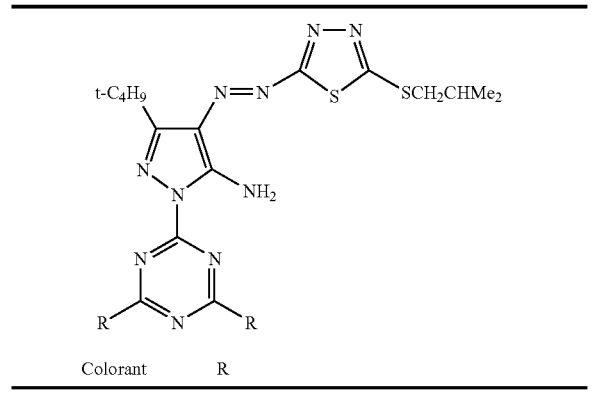

| Colorant | R |
|---|---|
| YI-98 | —NHC$_2$H$_4$COOK |
| YI-99 | —NHC$_2$H$_4$SO$_3$Na |

YI-100

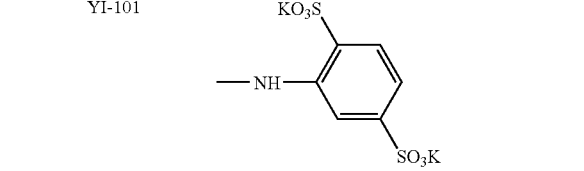

YI-101

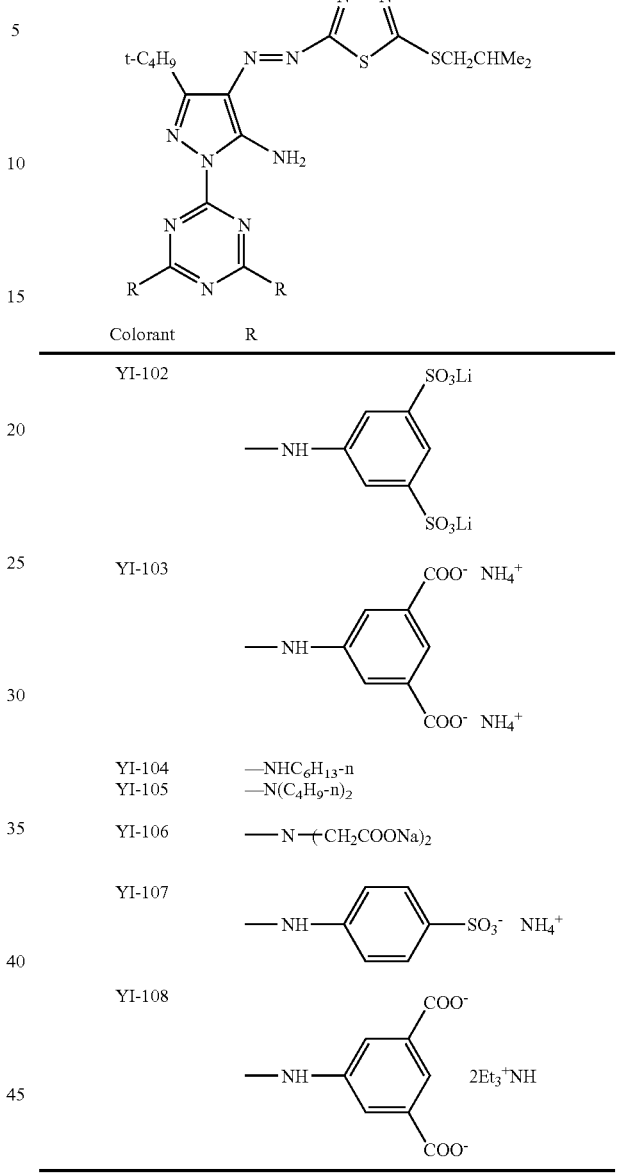

| Colorant | R |
|---|---|
| YI-102 | (3,5-disulfonate phenylamino, SO$_3$Li) |
| YI-103 | (3,5-dicarboxylate phenylamino, COO⁻ NH$_4$⁺) |
| YI-104 | —NHC$_6$H$_{13}$-n |
| YI-105 | —N(C$_4$H$_9$-n)$_2$ |
| YI-106 | —N—(CH$_2$COONa)$_2$ |
| YI-107 | —NH—C$_6$H$_4$—SO$_3$⁻ NH$_4$⁺ |
| YI-108 | (3,5-dicarboxylate phenylamino, 2Et$_3$⁺NH) |

The inkjet recording ink according to the invention contains the above-described yellow dye preferably in an amount of from 0.2 to 20% by mass, still preferably from 0.5 to 15% by mass.

Next, a black dye to be used in the invention will be illustrated in detail.

As the black ink for inkjet recording according to the invention, use is made of a dye (L) having λmax of from 500 nm to 700 nm and showing a half-value width (Wλ$_{1/2}$) in the absorption spectrum of a diluted solution having been standardized to give an absorbance of 1.0 of 100 nm or more (preferably from 120 nm to 50 nm and still preferably from 120 nm to 350 nm).

In the case where "distinct black color" (i.e., black color being independent of light sources and almost free from highlighting in any of B, G and R color tones) can be established by using this dye (L) exclusively, it is possible to use this dye alone as a black ink dye. However, it is a common practice to employ the dye together with another dye capable of compensating the black dye in a region where it shows poor absorption. It is usually preferred to combinedly employ a dye (S) having the main absorption in the yellow region. It is also possible to further employ an additional dye to give a black ink.

In the invention, a black ink is produced by dissolving or dispersing the above-described dye, either alone or as a mixture, in an aqueous medium. To satisfy desirable properties as an inkjet recording ink, namely, 1) being excellent in weatherability and/or 2) not getting off the black balance even after discoloration, an ink fulfilling the following requirements is produced.

First, black square marks in accordance with JIS CODE 2223 are printed at 48 point with the use of the black ink. Then the reflection density ($D_{vis}$) measured with a status A filter (visual filter) is specified as the initial density. As a reflection densitometer provided with the status A filter, use can be made of, for example, an X-Rite densitometer. To measure the "black" density, the measurement value with $D_{vis}$ is employed as a standard observation-reflection density. Next, this print is forcedly discolored by using an ozone discoloration test machine capable of continuously generating 5 ppm of ozone. The time (t) until the reflection density ($D_{vis}$) amounts to 80% of the initial reflection density is measured. Thus, forced discoloration kinetic constant ($k_{vis}$) is determined in accordance with the formula ($0.8 = \exp(-k_{vis} \cdot t)$).

In the invention, an ink is produced so that the above kinetic constant ($k_{vis}$) is regulated to $5.0 \times 10^{-2}$ (hour$^{-1}$) or less, preferably $3.0 \times 10^{-2}$ (hour$^{-1}$) or less and still preferably $1.0 \times 10^{-2}$ (hour$^{-1}$) or less (requirement 1).

Further, black square marks in accordance with JIS CODE 2223 are printed at 48 point with the use of the black ink. Then the reflection densities of three colors, i.e., cyan (C), magenta (M) and yellow (Y) other than $D_{vis}$ are measured with a status A filter and specified as the initial densities ($D_R$, $D_G$ and $D_B$), wherein ($D_R$, $D_G$ and $D_B$) respectively stand for the C reflection density using a red filter, the M reflection density using a green filter and the Y reflection density using a blue filter. Next, this print is forcedly discolored by using an ozone discoloration test machine capable of continuously generating 5 ppm of ozone. The times (t's) until the reflection densities ($D_R$, $D_G$ and $D_B$) amount to 80% of the respective initial reflection densities are measured. Thus, forced discoloration kinetic constants ($k_R$, $k_G$ and $k_B$) are determined. After determining these 3 kinetic constants, the ratio (R) of the largest one to the smallest one (in the case where $k_R$ is the largest while $k_G$ is the smallest, for example, $R = k_R/k_G$) is determined. In the invention, an ink is produced so that the above ratio (R) is regulated to 1.2 or less, preferably 1.1 or less and still preferably 1.05 or less (requirement 2).

In the print obtained by "printing black square marks in accordance with JIS CODE 2223 at 48 point" as used above, the image is printed in such a size as sufficiently covering an aperture of the densitometer so as to give a satisfactory size for measuring density.

At least one of the dyes to be used in the black ink has an oxidation potential nobler than 1.00 V (vs. SCE), preferably nobler than 1.1 V (vs. SCE), still preferably nobler than 1.15 V (vs. SCE), and most desirably nobler than 1.25 V (vs. SCE). It is also preferable that at least one of the dyes has λmax of 50 nm or more (requirement 3).

As oxidation potential in the invention, use is made of a value which is determined at a compound concentration of $1 \times 10^{-3}$ mol·dm$^{-3}$ in N,N-dimethylformamide containing 0.1 mol·dm$^{-3}$ of tetrapropylammonium perchlorate as a supporting electrolyte while using an SCE (saturated Calomel electrode) as the reference electrode, a graphite electrode as the working electrode and a platinum electrode as the counter electrode. It is sometimes observed that a water-soluble dye is hardly soluble directly in N,N-dimethylformamide. In such a case, the dye is dissolved with the use of water as little as possible and then diluted with N,N-dimethylformamide to give a moisture content of not more than 2% before measuring.

Although the oxidation potential value sometimes deviates about several 10 mV due to a potential difference between solutions or the solution resistance of the sample solution, the reproducibility of the potential can be assured by adding a standard (for example, hydroquinone).

As the black ink according to the invention, it is preferable to employ an azo dye represented by the following formula (BK1). As an example of the azo dye represented by the formula (BK1), citation is made of dyes (L) having λmax of from 500 nm to 700 nm and showing a half-value width in the absorption spectrum of a diluted solution having been standardized to give an absorbance of 1.0 of 100 nm or more. Moreover, dyes (S) having λmax of from 350 nm to 500 nm can be cited as the dyes corresponding to the formula (BK1). It is preferable that at least one of the dyes (L) is a dye of the formula (BK1). It is particularly preferable that at least one of the dyes (L) and at least one of the dyes (S) are dyes of the formula (BK1). Among all, it is preferable that 90% by mass of all of the dyes fall within the category of the dyes of the formula (BK1) (requirement 4).

Formula (BK1)

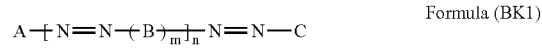

The black ink to be used in the invention is a black ink which satisfies at least one of above-described requirements 1 to 4.

Next, a dye corresponding to the dye (L), from among the dyes represented by the formula (BK1), will be illustrated in detail.

In the formula (BK1), A, B and C independently represent each an optionally substituted aromatic group or an optionally substituted heterocyclic group (A and C are monovalent groups while B is a divalent group). m is 1 or 2 and n is an integer of 0 or more.

Among all, a compound wherein m and n are each 1 or 2 is preferable and it is also preferable that at least 2 of A, B and C are optionally substituted unsaturated heterocyclic groups. In particular, a case wherein m and n are both 1 and at least B and C are unsaturated heterocyclic groups is preferable.

It is particularly preferable that the azo dye represented by the formula (BK1) is an azo dye represented by the following formula (BK2).

Formula (BK2)

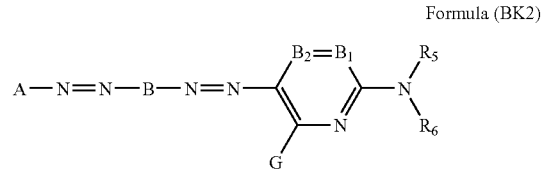

In the above formula (BK2), A and B are each as defined in the formula (BK1). $B_1$ and $B_2$ respectively represent =$CR_1$— and —$CR_2$=, or one of $B_1$ and $B_2$ is a nitrogen atom while the other represents =$CR_1$— or —$CR_2$=.

G, $R_1$ and $R_2$ independently represent each a hydrogen atom, a halogen atom, an aliphatic group, an aromatic group, a heterocyclic group group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group or a sulfo group, provided that each of these groups may be further substituted.

$R_5$ and $R_6$ independently represent each a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, provided that each of these groups may be further substituted. However, $R_5$ and $R_6$ do not represent both hydrogen atoms at the same time.

Moreover, $R_1$ and $R_5$ or $R_5$ and $R_6$ may be bonded to each other to form a 5- to 6-membered ring.

It is furthermore preferable that the azo dye represented by the formula (BK2) is a dye represented by the following formula (BK3).

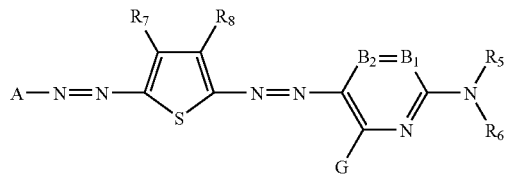

Formula (BK3)

In the above formula (BK3), $R_7$ and $R_8$ have the same meaning as $R_1$ defined in the formula (BK2).

Examples of the halogen atom include a fluorine atom, a chlorine atom and a bromine atom. The aliphatic group means an alkyl group, a substituted alkyl group, an alkenyl group, a substituted alkenyl group, an alkynyl group, a substituted alkynyl group, an aryalkyl group or a substituted aralkyl group. The aliphatic group may be branched or form a ring. It is preferable that the aliphatic group has from 1 to 20 carbon atoms, still preferably from 1 to 16 carbon atoms. As the aryl moiety in an aralkyl group or a substituted aralkyl group, phenyl or naphthyl is preferred and phenyl is particularly preferred. Examples of the aliphatic group include methyl, ethyl, butyl, isopropyl, t-butyl, hydroxyethyl, methoxethyl, cyanoethyl, trifluoromethyl, 3-sulfopropyl, 4-sulfobutyl, cyclohexyl, benzyl, 2-phenethyl, vinyl and allyl groups.

The monovalent aromatic group means an aryl group or a substituted aryl group. As the aryl group, phenyl or naphthyl is preferred and phenyl is particularly preferred. It is preferable that the monovalent aromatic group has from 6 to 20 carbon atoms, still preferably from 6 to 16 carbon atoms. Examples of the monovalent aromatic group include phenyl, p-tolyl, p-methoxyphenyl, o-chlorophenyl and m-(3-sulfopropylamino)phenyl groups. The divalent aromatic group is a divalent group derived from such a monovalent aromatic group and examples thereof include phenylene, p-tolylene, p-methoxyphenylene, o-chlorophenylene, m-(3-sulfopropylamino)phenylene, naphthylene and so on.

The heterocyclic group includes a substituted heterocyclic group and an unsubstituted heterocyclic group. Further, an aliphatic ring, an aromatic ring or another heterocycle may be fused to the heterocycle. As the heterocyclic group, a 5-membered or 6-membered heterocycle group is preferable. Examples of the hetero atom in the heterocycle include N, O and S. Examples of the substituent include aliphatic groups, halogen atoms, alkyl- and arylsulfonyl groups, acyl groups, acylamino groups, a sulfamoyl group, a carbamoyl group and ionic hydrophilic groups. Examples of the heterocycle to be used in monovalent and divalent heterocyclic groups include pyridine, thiophene, thiazole, benzothiazole, benzoxazole and furan rings.

The carbamoyl group includes a substituted carbamoyl group and an unsubstituted carbamoyl group. Examples of the substituent include alkyl groups. Examples of the above-described carbamoyl group include methylcarbamoyl and dimethylcarbamoyl groups.

The alkoxycarbonyl group includes a substituted alkoxycarbonyl group and an unsubstituted alkoxycarbonyl group. As the alkoxycarbonyl group, an alkoxycarbonyl group having from 2 to 20 carbon atoms is preferable. Examples of the substituent include ionic hydrophilic groups. Examples of the above-described alkoxycarbonyl group include methoxycarbonyl and ethoxycarbonyl groups.

The aryloxycarbonyl group includes a substituted aryloxycarbonyl group and an unsubstituted aryloxycarbonyl group. As the aryloxycarbonyl group, an aryloxycarbonyl group having from 7 to 20 carbon atoms is preferable. Examples of the substituent include ionic hydrophilic groups. Examples of the above-described aryloxycarbonyl group include a phenoxycarbonyl group.

The heterocyclic oxycarbonyl group includes a substituted heterocyclic oxycarbonyl group and an unsubstituted heterocyclic oxycarbonyl group. As the heterocyclic oxycarbonyl group, a heterocyclic oxycarbonyl group having from 2 to 20 carbon atoms is preferable. Examples of the substituent include ionic hydrophilic groups. Examples of the above-described heterocyclic oxycarbonyl group include a 2-pyridyloxycarbonyl group.

The acyl group includes a substituted acyl group and an unsubstituted acyl group. As the acyl group, an acyl group having from 1 to 20 carbon atoms is preferable. Examples of the substituent include ionic hydrophilic groups. Examples of the above-described acyl group include acetyl and benzoyl groups.

The alkoxy group includes a substituted alkoxy group and an unsubstituted alkoxy group. As the alkoxy group, an alkoxy group having from 2 to 20 carbon atoms is preferable. Examples of the substituent include alkoxy groups, a hydroxyl group and ionic hydrophilic groups. Examples of the above-described alkoxy group include methoxy, ethoxy, isopropoxy, methoxyethoxy, hydroxyethoxy and 3-acrboxypropoxy groups.

The aryloxy group includes a substituted aryloxy group and an unsubstituted aryloxy group. As the aryloxy group, an aryloxy group having from 6 to 20 carbon atoms is preferable. Examples of the substituent include alkoxy groups and ionic hydrophilic groups. Examples of the above-described aryloxy group include phenoxy, p-methoxyphenoxy and o-methoxyphenoxy groups.

The heterocyclic oxy group includes a substituted heterocyclic oxy group and an unsubstituted heterocyclic oxy group. As the heterocyclic oxy group, a heterocyclic oxy group having from 2 to 20 carbon atoms is preferable. Examples of the substituent include alkyl groups, alkoxy groups and ionic hydrophilic groups. Examples of the above-described heterocyclic oxy group include 3-pyridyloxy and 3-thienyloxy groups.

As the silyloxy group, a silyloxy group substituted by an aliphatic group or an aromatic group having from 1 to 20 carbon atoms is preferable. Examples of the silyloxy group include trimethylsilyloxy and diphenylmethylsilyloxy groups.

The acyloxy group includes a substituted acyloxy group and an unsubstituted acyloxy group. As the acyloxy group, an acyloxy group having from 1 to 20 carbon atoms is preferable. Examples of the substituent include ionic hydrophilic groups. Examples of the above-described acyloxy group include acetoxy and benzoyloxy groups.

The carbamoyloxy group includes a substituted carbamoyloxy group and an unsubstituted-carbamoyloxy group. Examples of the substituent alkyl groups. Examples of the above-described carbamoyloxy group include an N-methylcarbamoyloxy group.

The alkoxycarbonyloxy group includes a substituted alkoxycarbonyloxy group and an unsubstituted alkoxycarbonyloxy group. As the alkoxycarbonyloxy group, an alkoxycarbonyloxy group having from 2 to 20 carbon atoms is preferable. Examples of the above-described alkoxycarbonyloxy group include methoxycarbonyloxy and isopropoxycarbonyloxy groups.

The aryloxycarbonyl group includes a substituted aryloxycarbonyl group and an unsubstituted aryloxycarbonyl group. As the aryloxycarbonyl group, an aryloxycarbonyl group having from 7 to 20 carbon atoms is preferable. Examples of the above-described aryloxycarbonyl group include a phenoxycarbonyloxy group.

The amino group includes an amino group substituted by an alkyl group, an aryl group or a heterocyclic group and the alkyl group, aryl group and heterocyclic group may be further substituted. As the alkylamino group, an alkylamino group having from 1 to 20 carbon atoms is preferable. Examples of the substituent include ionic hydrophilic groups. Examples of the alkylamino group include methylamino and diethylamino groups.

The arylamino group includes a substituted arylamino group and an unsubstituted arylamino group. As the arylamino group, an arylamino group having from 6 to 20 carbon atoms is preferable. Examples of the substituent include halogen atoms and ionic hydrophilic groups. Examples of the above-described arylamino group include anilino and 2-chlorophenylamino groups.

The heterocyclic amino group includes a substituted heterocyclic amino group and an unsubstituted heterocyclic amino group. As the heterocyclic amino group, a heterocyclic amino group having from 2 to 20 carbon atoms is preferable. Examples of the substituent include alkyl groups, halogen atoms and ionic hydrophilic groups.

The acylamino group includes a substituted acylamino group and an unsubstituted acylamino group. As the acylamino group, an acylamino group having from 2 to 20 carbon atoms is preferable. Examples of the substituent include ionic hydrophilic groups. Examples of the above-described acylamino group include acetylamino, propionylamino, benzoylamino, N-phenylacetylamino and 3,5-disulfobenzoylamino groups.

The ureido group includes a substituted ureido group and an unsubstituted ureido group. As the ureido group, an ureido group having from 1 to 20 carbon atoms is preferable. Examples of the substituent include alkyl groups and aryl groups. Examples of the above-described ureido group include 3-methylureido, 3,3-dimetmhylureido and 3-phenylureido groups.

The sulfamoylamino group includes a substituted sulfamoylamino group and an unsubstituted sulfamoylamino group. Examples of the substituent include alkyl groups. Examples of the above-described sulfamoylamino group include an N,N-dipropylsulfamoyl group.

The alkoxycarbonylamino group includes a substituted alkoxycarbonylamino group and an unsubstituted alkoxycarbonylamino group. As the alkoxycarbonylamino group, an alkoxycarbonylamino group having from 2 to 20 carbon atoms is preferable. Examples of the substituent include ionic hydrophilic groups. Examples of the above-described alkoxycarbonylamino group include an ethoxycarbonylamino group.

The aryloxycarbonylamino group includes a substituted aryloxycarbonylamino group and an unsubstituted aryloxycarbonylamino group. As the aryloxycarbonylamino group, an aryloxycarbonylamino group having from 7 to 20 carbon atoms is preferable. Examples of the substituent include ionic hydrophilic groups. Examples of the above-described aryloxycarbonylamino group include a phenoxycarbonylamino group.

The alkyl- and arylsulfonylamino groups include substituted alkyl- and arylsulfonylamino groups and unsubstituted alkyl- and arylsulfonylamino groups. As the sulfonylamino group, a sulfonylamino group having from 1 to 20 carbon atoms is preferable. Examples of the substituent include ionic hydrophilic groups. Examples of these sulfonylamino groups include methylsulfonylamino, N-phenylmethylsulfonylamino, phenylsulfonylamino and 3-carboxyphenylsulfonylamino groups.

The heterocyclic sulfonylamino group includes a substituted heterocyclic sulfonylamino group and an unsubstituted heterocyclic sulfonylamino group. As the heterocyclic sulfonylamino group, a heterocyclic sulfonylamino group having from 1 to 12 carbon atoms is preferable. Examples of the substituent include ionic hydrophilic groups. Examples of the above-described heterocyclic sulfonylamino group include 2-thiophenesulfonylamino and 3-pyridinesulfonylamino groups.

The heterocyclic sulfonyl group includes a substituted heterocyclic sulfonyl group and an unsubstituted heterocyclic sulfonyl group. As the heterocyclic sulfonyl group, a heterocyclic sulfonyl group having from 1 to 20 carbon atoms is preferable. Examples of the substituent include ionic hydrophilic groups. Examples of the above-described heterocyclic sulfonyl group include 2-thiophenesulfonyl and 3-pyridinesulfonyl groups.

The heterocyclic sulfinyl group includes a substituted heterocyclic sulfinyl group and an unsubstituted heterocyclic sulfinyl group. As the heterocyclic sulfinyl group, a heterocyclic sulfinyl group having from 1 to 20 carbon atoms is preferable. Examples of the substituent include ionic hydrophilic groups. Examples of the above-described heterocyclic sulfinyl group include a 4-pyridinyesulfinyl group.

The alkyl, aryl and heterocyclic thio groups include substituted alkyl, aryl and heterocyclic thio groups and unsubstituted alkyl, aryl and heterocyclic thio groups. As the alkyl, aryl and heterocyclic thio groups, those having from 1 to 20 carbon atoms are preferable. Examples of the substituent include ionic hydrophilic groups. Examples of the above-described alkyl, aryl and heterocyclic thio groups include methylthio, phenylthio and 2-pyridylthio groups.

The alkyl- and arylsulfonyl groups include substituted alkyl- and arylsulfonyl groups and unsubstituted alkyl- and arylsulfonyl groups. Examples of the alkyl- and arylsulfonyl groups include a methylsulfonyl group and a phenylsulfonyl group respectively.

The alkyl- and arylsulfinyl groups include substituted alkyl- and arylsulfinyl groups and unsubstituted alkyl- and arylsulfinyl groups. Examples of the alkyl- and arylsulfinyl groups include a methylsulfinyl group and a phenylsulfinyl group respectively.

The sulfamoyl group includes a substituted sulfamoyl group and an unsubstituted sulfamoyl group. Examples of the substituent include alkyl groups. Examples of the above-described sulfamoyl group include dimethylsulfamoyl and di-(2-hydroxyethyl)sulfamoyl groups.

Next, the formulae (BK1), (BK2) and (BK3) will be illustrated.

In the following illustration, each group and substituent have the same meanings as described above.

In the formula (BK1), A, B and C independently represent each an optionally substituted aromatic group (A and C are monovalent aromatic groups such as an aryl group while B is a divalent aromatic group such as an arylene group) or an optionally substituted heterocyclic group (A and C are monovalent heterocyclic groups while B is a divalent heterocyclic group). Examples of the aromatic rings include benzene and naphthalene rings. Examples of the hetero atom in the heterocycle include N, O and S. Further, an aliphatic ring, an aromatic ring or another heterocycle may be fused to the heterocycle.

The substituent may be an arylazo group or a heterocyclic azo group.

It is preferable that at least 2 of A, B and C are heterocyclic groups.

As a preferable heterocyclic group C, an aromatic nitrogen-containing 6-membered heterocyclic group represented by the following formula (BK4) may be cited. In the case where C is an aromatic nitrogen-containing 6-membered-heterocyclic group represented by the formula (BK4), the formula (BK1) corresponds to the formula (BK2).

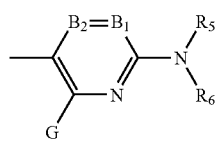

Formula (BK4)

In the formula (BK4), $B^1$ and $B^2$ each represents =CR$_1$— or —CR$_2$=, or one of them represents a nitrogen atom while the other represents =CR$_1$— or —CR$_2$=.

$R_5$ and $R_6$ independently represent each a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group and such a group may be further substituted. Preferable examples of the substituents represented by $R_5$ and $R_6$ include a hydrogen atom, aliphatic groups, aromatic groups, heterocyclic groups, acyl groups and alkyl- or arylsulfonyl groups. Still preferable examples thereof include a hydrogen atom, aromatic groups, heterocyclic groups, acyl groups and alkyl- or arylsulfonyl groups and a hydrogen atom, aryl groups and heterocyclic groups are most desirable, provided that $R_5$ and $R_6$ do not represent both hydrogen atoms at the same time.

G, $R^1$ and $R^2$ independently represent each a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group or a sulfo group and such a group may be further substituted.

Examples of the substituent represented by G include a hydrogen atom, halogen atoms, aliphatic groups, aromatic groups, a hydroxy group, alkoxy groups, aryloxy groups, acyloxy groups, heterocyclic oxy groups, amino groups (including alkylamino groups, arylamino groups and heterocyclic amino groups), acylamino groups, an ureido group, a sulfamoylamino group, alkoxycarbonylamino groups, aryloxycarbonylamino groups, alkyl- and arylthio groups and heterocyclic thio groups. Still preferable examples thereof include a hydrogen atom, halogen atoms, alkyl groups, a hydroxy group, alkoxy groups, aryloxy groups, acyloxy groups, an amino group (including alkylamino groups, arylamino groups and heterocyclic amino groups) and acylamino groups. Among all, a hydrogen atom, an anilino group and acylamino groups are most desirable. Each group may be further substituted.

Preferable examples of the substituents represented by $R_1$ and $R_2$ include a hydrogen atom, alkyl groups, halogen atoms, alkoxycarbonyl groups, a carboxyl group, a carbamoyl group, a hydroxy group, alkoxy groups and a cyano group. Each group may be further substituted.

Also, $R^1$ and $R^5$ or $R^5$ and $R^6$ may be bonded to each other to form a 5- or 6-membered ring.

In the case where the substituents represented by A, $R_1$, $R_2$, $R_5$, $R_6$ and G are further substituted, examples of the substituents are those cited above with regard to G, $R_1$ and $R_2$. It is preferable that an ionic hydrophilic group is further attached as a substituent to any of A, $R_1$, $R_2$, $R_5$, $R_6$ and G.

Examples of the ionic hydrophilic group as a substituent include a sulfo group, a carboxyl group, a phosphono group, a quaternary ammonium group and so on. As the above-described ionic hydrophilic group, a carboxyl group, a phosphono group and a sulfo group are preferable and a carboxyl group and a sulfo group are still preferable. These carboxyl group, phosphono group and sulfo group may be in the form of a salt. Examples of the counter ion forming the salt include ammonium ion, alkali metal ions (for example, lithium ion, sodium ion and potassium ion) and organic cations (for example, tetramethylammonium ion, tetramethylguanidium ion and tetramethylphosphonium).

In the case where B has a cyclic structure, preferable examples of the heterocycle include a thiophene ring, a thiazole ring, an imidazole ring, a benzothiazole ring and a thienothiazole ring. Each heterocyclic group may be further substituted. Among all, a thiophene ring, a thiazole ring, an imidazole ring, a benzothiazole ring and a thienothiazole ring represented by the following formulae (a) to (e) are preferable. m and n are each 1. When B is a thiophene ring represented by (a) and C has the structure represented by the above-described formula (4), then the formula (BK1) corresponds to the formula (BK3).

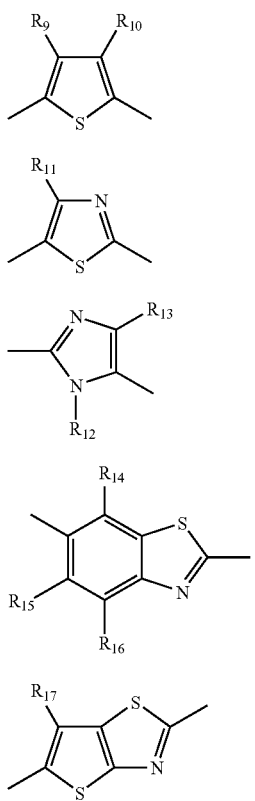

In the above formulae (a) to (e), $R_9$ to $R_{17}$ represent substituents having the same meanings as G, $R_1$ and $R_2$ in the formula (BK2).

A particularly preferable structure in the invention is the one represented by the following formula (BK5).

Formula (BK5)

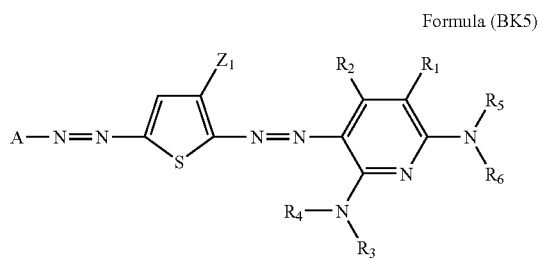

In the above formula, $Z_1$ represents an electron-withdrawing group having a Hammett's substituent constant σp of 0.20 or more. It is preferable that $Z_1$ is an electron-withdrawing group having a σp of 0.30 or more, still preferably an electron-withdrawing group having a σp of 0.45 or more and particularly preferably an electron-withdrawing group having a σp of 0.60 or more, though it is desirable that the σp does not exceed 1.0. As preferable examples of the substituent, citation may be made of electron-withdrawing groups as will be described hereinafter. Among all, acyl groups having from 2 to 20 carbon atoms, alkyloxycarbonyl groups having from 2 to 20 carbon atoms, a nitro group, a cyano group, alkylsulfonyl groups having from 2 to 20 carbon atoms, arylsulfonyl groups having from 2 to 20 carbon atoms, carbamoyl groups having from 2 to 20 carbon atoms and halogenated alkyl groups having from 1 to 20 carbon atoms are preferable. Particularly preferable examples thereof include cyano groups, alkylsulfonyl groups having from 1 to 20 carbon atoms and arylsulfonyl groups having from 6 to 20 carbon atoms, and a cyano group is most desirable therefor.

$R_1$, $R_2$, $R_5$ and $R_6$ have the same meanings as in the formula (BK2). $R_3$ and $R_4$ independently represent each a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group. Among all, a hydrogen atom, an aromatic group, a heterocyclic group, an acyl group, an alkyl- or arylsulfonyl group are preferable and a hydrogen atom, an aromatic group and a heterocyclic group are particularly preferable.

Each of the substituents illustrated with regard to the formula (BK5) may be further substituted. In the case where these substituents are further substituted, examples of the substituents include those illustrated with regard to the formula (BK2), the groups represented by G, $R_1$ and $R_2$ and ionic hydrophilic groups.

Next, the Hammett's substituent constant $\sigma_p$ used herein will be illustrated. Hammett's rule, which is an empirical rule proposed in 1935 by L. P. Hammett for quantitatively discussing the effect of a substituent on a reaction or equilibrium of a benzene derivative, has been widely accepted as reasonable today. Substituent's constants determined by Hammett's rule include σp and σm. These parameters are generally reported in detail in a large number of publications, for example, J. A. Dean, *Lange's Handbook of Chemistry*, 12th ed., 1979 (McGraw-Hill) and *Kagaku no Ryoiki*, extra issue No. 122, pp. 96–103, 1979 (Nankodo). Although each substituent is restricted or illustrated based on the Hammett's substituent constant $\sigma_p$ in the present invention, it is needless to say that such substituents are not restricted to substituents having known parameters as reported in the above publications but include substituents the parameters of which seemingly fall within the range when measured in accordance with Hammett's rule. Although the compounds of the formula (1) or (2) according to the invention include those which are not benzene derivatives, $\sigma_p$ is also employed as an indication of the electron effect of each substituent regardless of the substitution position. That is to say, $\sigma_p$ is employed in this meaning in the invention.

Examples of electron-withdrawing groups having a Hammett's substituent constant $\sigma_p$ of 0.60 or more include a cyano group, a nitro group, alkylsulfonyl groups (for example, a methanesulfonyl group) and arylsulfonyl groups (for example, a benzenesulfonyl group).

Examples of electron-withdrawing groups having a Hammett's substituent constant $\sigma_p$ of 0.45 or more include, in addition to those cited above, acyl groups (for example, an acetyl group), alkoxycarbonyl groups (for example, a dodecyloxycarbonyl group), aryloxycarbonyl groups (for example, m-chlorophenoxycarbonyl), alkylsulfinyl groups (for example, n-propylsulfinyl), arylsulfinyl groups (for example, phenylsulfinyl), sulfamoyl groups (for example, N-ethylsulfamoyl and N,N-dimethylsulfamoyl) and halogenated alkyl groups (for example, trifluoromethyl).

Examples of electron-withdrawing groups having a Hammett's substituent constant $\sigma_p$ of 0.30 or more include, in addition to those cited above, acyloxy groups (for example, acetoxy), carbamoyl groups (for example, N-ethylcarbamoyl and N,N-dibutylcarbamoyl),halogenated alkoxy groups (for example, trifluoromethyloxy), halogenated aryloxy groups (for example, pentafluorophenyloxy), sulfonyloxy groups (for example, methylsulfonyloxy), halogenated alkylthio groups (for example, difluoromethylthio), aryl groups having 2 or more electron-withdrawing substituents having a Hammett's substituent constant $\sigma_p$ of 0.15 or more (for example, 2,4-dinitrophenyl and pentachlorophenyl) and heterocyclic groups (for example, 2-benzoxazolyl, 2-benzothiazolyl and 1-phenyl-2-benzoimidazolyl).

Specific examples of electron-withdrawing groups having a Hammett's substituent constant $\sigma_p$ of 0.20 or more include, in addition to those cited above, halogen atoms and so on.

Concerning the combination of preferable substituents in the azo dye represented by the above-described formula (BK3), it is favorable that $R_5$ and $R_6$ are each a hydrogen atom, an alkyl group, an aryl group, a heterocyclic group, a sulfonyl group or an acyl group, still preferably a hydrogen atom, an aryl group, a heterocyclic group or a sulfonyl group and a hydrogen atom, an aryl group or a heterocyclic group is most desirable, provided that $R_5$ and $R_6$ do not represent hydrogen atoms at the same time.

It is preferable that G is a hydrogen atom, a halogen atom, an alkyl group, a hydroxyl group, an amino group or an acylamino group, still preferably a hydrogen atom, a halogen atom, an amino group or an acylamino group and a hydrogen atom, an amino group or an acylamino group is most desirable.

As A, an aromatic group, a pyridine ring, a pyrazole ring, an imidazole ring, an isothiazole ring, a benzoisothiazole ring, a thiadiazole ring, a thiazole ring, a benzothiazole ring and a triazole ring are preferable. It still preferably represents an aromatic ring, a pyridine ring, an isothiazole ring, a benzoisothiazole ring, a thiadiazole ring or a benzothiazole ring and an aromatic group, a pyridine ring and a benzotriazole ring are most desirable.

It is preferable that $B_1$ and $B_2$ are respectively =$CR_1$— and —$CR_2$= wherein $R_1$ and $R_2$ preferably represent each a hydrogen atom, an alkyl group, a halogen atom, a cyano group, a carbamoyl group, a carboxyl group, a hydroxyl group, an alkoxy group or an alkoxycarbonyl group, still preferably a hydrogen atom, an alkyl group, a carboxyl group, a cyano group or a carbamoyl group.

Concerning the combination of preferable substituents in the compound represented by the above-described formula (BK1), it is favorable that at least one of the substituents is selected from the above-described preferable groups. A compound having a larger number of substituents selected from the above-described preferable groups is still preferable and a compound all of the substituents of which are selected from the above-described preferable ones is most desirable.

Next, specific examples of azo dye represented by the above-described formula (BK1) will be presented, though the azo dye to be used in the invention is not restricted thereto.

The carboxyl group, phosphono group and sulfo group may be in the form of a salt. Examples of the counter ion forming the salt include ammonium ion, alkali metal ions (for example, lithium ion, sodium ion and potassium ion) and organic cations (for example, tetramethylammonium ion, tetramethylguanidium ion and tetramethylphosphonium).

TABLE 27

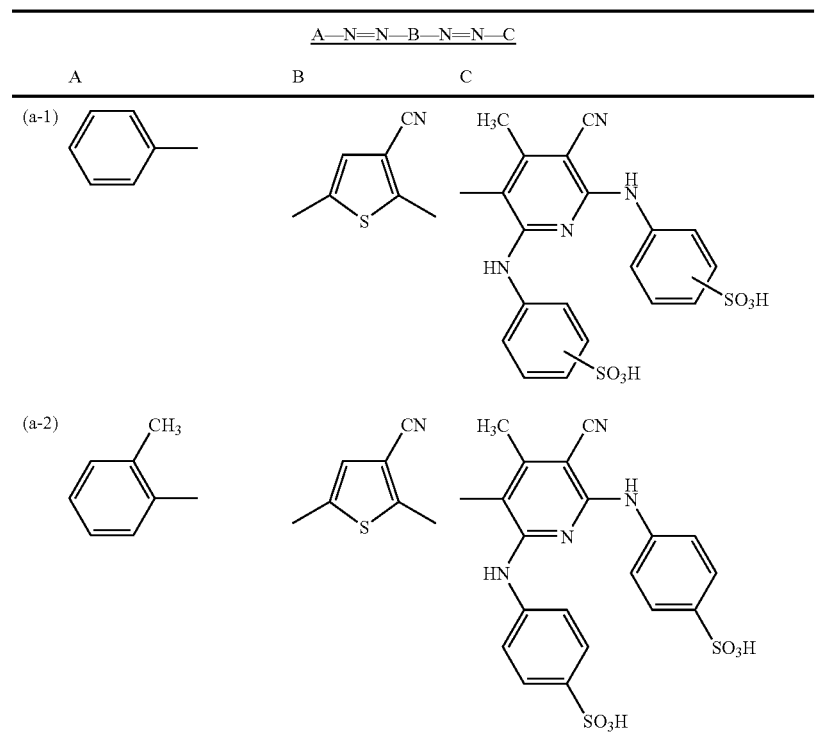

TABLE 27-continued
A—N=N—B—N=N—C
| A | B | C |
|---|---|---|
| (a-3) 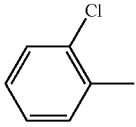 | 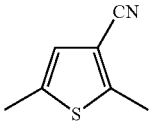 | 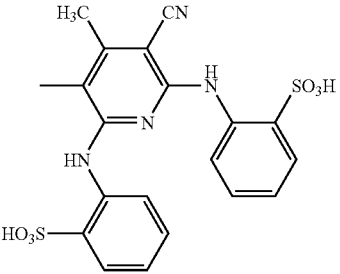 |
| (a-4) 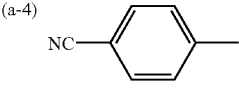 | 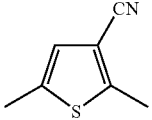 | 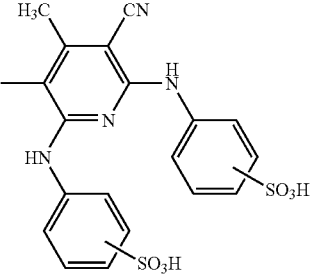 |
| (a-5) 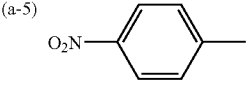 |  | 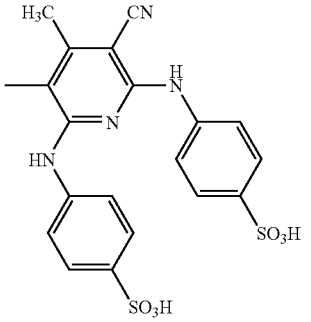 |
| (a-6) 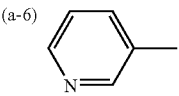 |  | 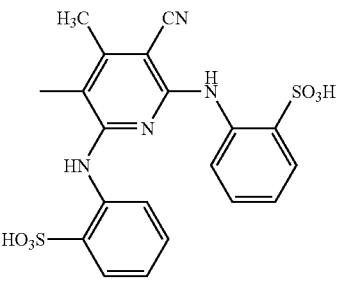 |

TABLE 28

A—N=N—B—N=N—C

| A | B | C |
|---|---|---|
| (b-1) 4-sulfophenyl (HO₃S-C₆H₄-) | 2,5-dimethyl-3-cyano-thiophene | 4-methyl-3-cyano-2,6-bis[(sulfophenyl)amino]pyridine with 5-methyl; NH-phenyl-SO₃H groups |
| (b-2) 2-methyl-1,4-benzenedisulfonic acid | 2,5-dimethyl-3-cyano-thiophene | 4-methyl-3-cyano-5-methyl-2,6-bis[(4-sulfophenyl)amino]pyridine |
| (b-3) 2-methylterephthalic acid | 2,5-dimethyl-3-cyano-thiophene | 4-methyl-3-cyano-5-methyl-2,6-bis[(2-sulfophenyl)amino]pyridine |
| (b-4) 5-methylisophthalic acid | 2,5-dimethyl-3-cyano-thiophene | 4-methyl-3-cyano-5-methyl-2,6-bis[(sulfophenyl)amino]pyridine |
| (b-5) 4-methyl-1-naphthalenesulfonic acid | 2,5-dimethyl-3-cyano-thiophene | 4-methyl-3-cyano-5-methyl-2,6-bis[(4-sulfophenyl)amino]pyridine |

TABLE 28-continued
A—N=N—B—N=N—C
| A | B | C |
|---|---|---|
(b-6)
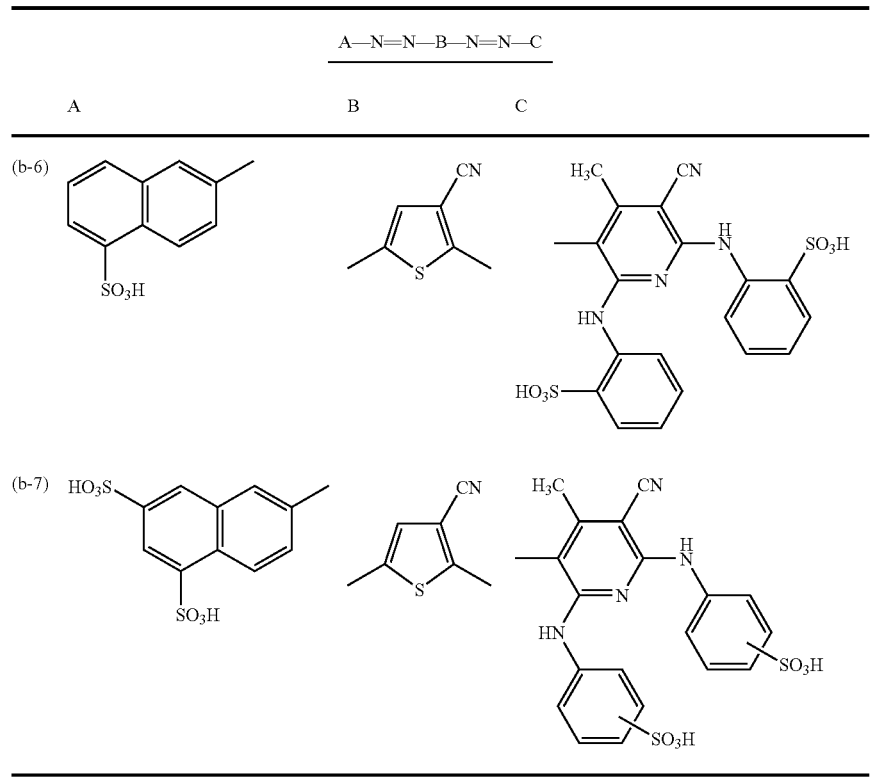
(b-7)
TABLE 29
A—N=N—B—N=N—C
| A | B | C |
|---|---|---|
(c-1)
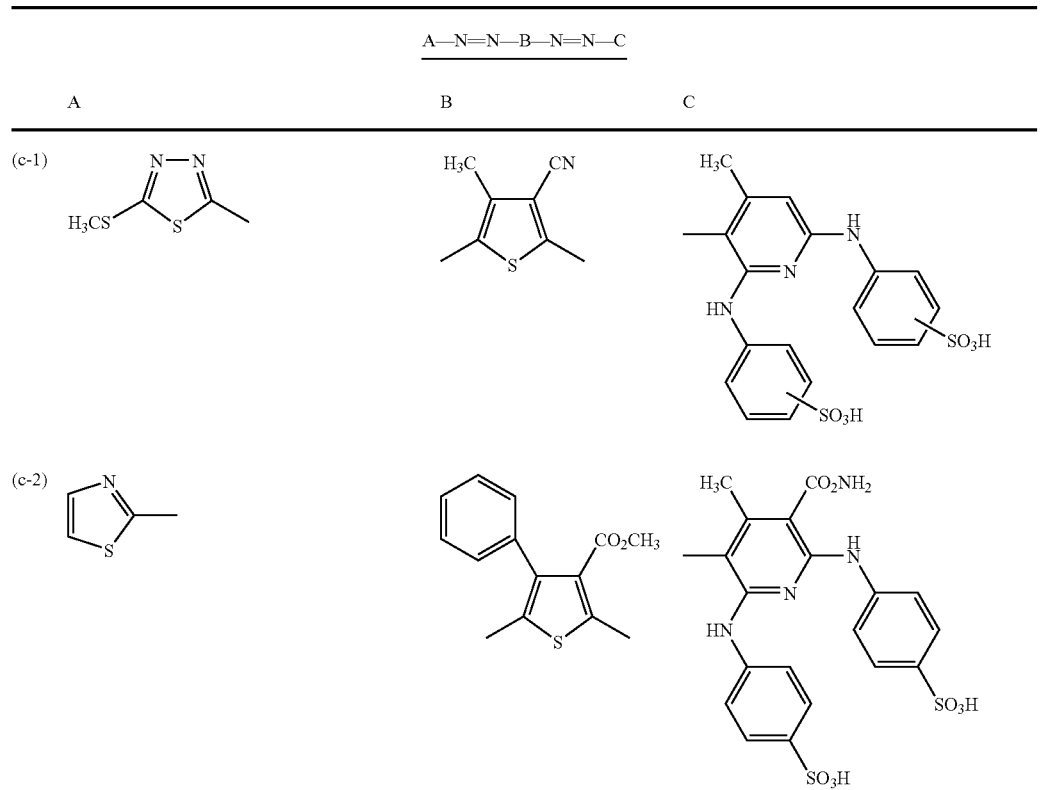
(c-2)

TABLE 29-continued
A—N=N—B—N=N—C
| A | B | C |
|---|---|---|
| (c-3) 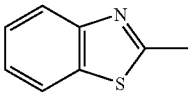 | 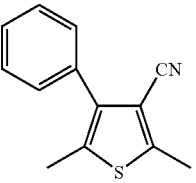 | 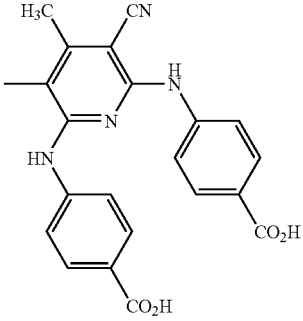 |
| (c-4) 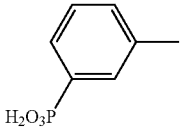 | 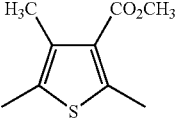 | 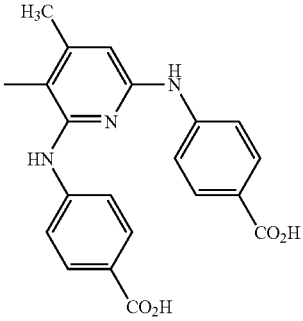 |
| (c-5) 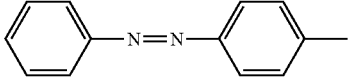 | 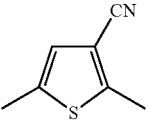 | 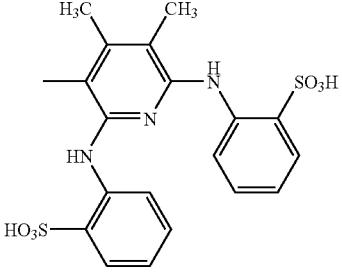 |
TABLE 30
A—N=N—B—N=N—C
| A | B | C |
|---|---|---|
| (d-1) 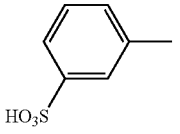 | 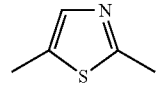 | 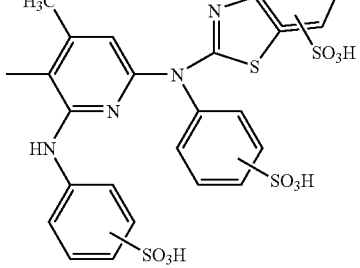 |

TABLE 30-continued

| | A | B | C |
|---|---|---|---|
| (d-2) | | | |
| (d-3) | | | |
| (d-4) | | | |
| (d-5) | | | |
| (d-6) | | | |

TABLE 31
A—N=N—B—N=N—C
| A | B | C |
|---|---|---|
| (e-1) 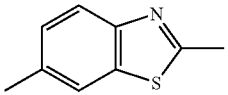 | 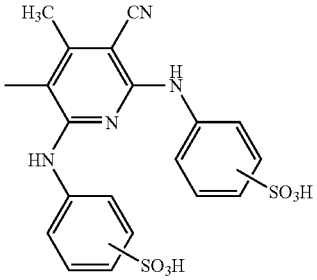 | 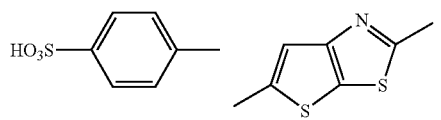 |
| (e-2) 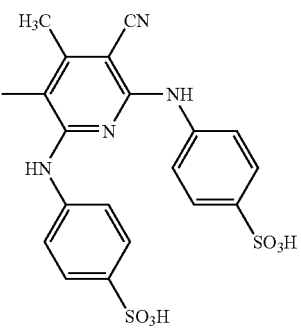 | 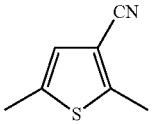 | 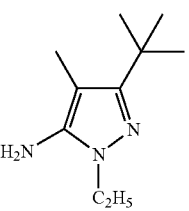 |
TABLE 32
A—N=N—B—N=N—C
| A | B | C |
|---|---|---|
| (f-1) 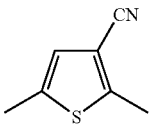 | | |
| (f-2) 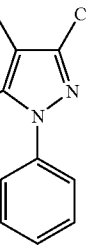 | | |

TABLE 32-continued

A—N=N—B—N=N—C

| A | B | C |
|---|---|---|
| (f-3) naphthalene with HO₃S and SO₃H | 2,5-dimethylthiophene with CN | triazine core with pyrazole (phenyl, methyl, H₂N) and two 3,5-dicarboxyphenylamino substituents |
| (f-4) phenyl-H₂O₃P | 2,4-dimethylthiazole | 3-tert-butyl-4-methyl-1-ethyl-5-amino pyrazole |

Dyes represented by the above-described formulae (BK1), (BK2), (BK3) and (BK5) can be synthesized by a coupling reaction between a diazo component and a coupler. The main synthesis can be carried out by the method reported in Japanese Patent Application 2002-113460.

In the case where "distinct black color" with favorable image qualities (i.e., black color being independent of light sources and almost free from highlighting in any of B, G and R color tones) can be established by using this dye (L) exclusively, it is possible to use this dye alone as a black ink dye. However, it is a common practice to employ the dye together with another dye capable of compensating the black dye in a region where it shows poor absorption. Usually, a dye or a pigment having the main absorption in the yellow region is used together with the above dye to achieve a favorable black color. As the yellow dye, use can be made of direct dyes and acidic dyes typified by azo dyes and azomethine dyes commonly employed in the art. As a pigment, use can be made of aqueous dispersions of commonly employed pigments having pigment numbers attached thereto. Among all, it is particularly preferable to use a dye represented by the formula (BK1) as the dye (S) in the shorter wave side as discussed above.

Among the dyes represented by the formula (BK1), azo dyes wherein m=n=0 are preferable as the dye (S) in the shorter wave side. In such a dye, it is preferable that A and C are aromatic heterocycles. Secondly preferred examples thereof are azo dyes wherein m=n=1.

In each case, a dye having an oxidation potential (Eox) as described above of 1.0 V (vs. SCE) is preferable and a dye having an oxidation potential of 1.15V (vs. SCE) is particularly preferred.

In a black ink, it is also possible to use 2 or more dyes in the loner wave side.

It is also possible to produce a black ink by using an additional dye.

The black ink for inkjet recording according to the invention contains from 0.2 to 25% by mass, preferably from 0.5 to 15% by mass, of the dye represented by the above-described formula (BK1) based on the whole ink.

As the dye having a λmax of from 350 to 500 nm, use can be also made of a yellow colorant and a yellow pigment as will be described hereinafter.

The above-described black dye according to the invention is substantially soluble in water or dispersible in water. It is particularly preferable that an ink composition containing the black dye according to the invention is a solution type ink composition comprising a water-soluble dye. More specifically speaking, it is preferable that the dye shows a solubility in water at 20° C. of 2% by mass or more, still preferably 5% by mass or more.

It is preferable that a dye other than the black dye according to the invention is substantially soluble in water or dispersible in water. More specifically speaking, it is preferable that the dye shows a solubility in water at 20° C. of 2% by mass or more, still preferably 5% by mass or more.

To produce 2 or more types of inks, one may be a light-colored ink while the other may be a dark-colored ink. In the invention, such inks of different colors can be produced. Alternatively, it is possible to produce ink compositions having almost the same color densities.

Examples of dyes usable herein other than the above-described black dyes include dyes publicly known in the art such as tirarylmethane dyes, anthraquinone dyes, anthrapyridone dyes, azomethine dyes, azo dyes, cyanine dyes merocyanine dyes and oxonol. Either one of these dyes or a combination thereof (preferably such a combination as providing a black dye). Among all, azo dyes are preferred.

More specifically speaking, yellow dyes include aryl or heteryl azo dyes having, for example, phenols, naphthols, anilines, pyrazolones, pyridones or open-chain active methylene compounds as a coupling component; azomethine dyes having, for example, open-chain active methylene compounds as a coupling component; methine dyes such as a benzylidene dye and a monomethine oxol dye; and quinone dyes such as a naphthoquinone dye and an anthraquinone dye. Examples of other dye species include quinophthalone dyes, nitro-nitroso dyes, acridine dyes and acridinone dyes. Such a dye may be one which would not develop a yellow color until a part of its chromophore thereof is dissociated. In this case, the counter ion may be either an inorganic cation such as an alkali metal or ammonium or an organic cation such as pyridinium or a quaternary ammonium salt. Moreover, a polymer cation having such a cation as its partial structure may be used.

Magenta dyes include aryl or heteryl azo dyes having, for example, phenols, naphthols or anilines as a coupling component; azomethine dyes having, for example, pyrazolones or pyrazolotriazoles as a coupling component; methine dyes such as an arylidene dye, a styryl dye, a merocyanine dye and an oxonol dye; carbonium dyes such as a diphenylmethane dye, a triphenylmethane dye and a xanthene dye; quinone dyes such as a naphthoquinone dye and an anthraquinone dye; and fused polycyclic dyes such as a dioxazine dye. Such a dye may be one which would not develop a magenta color until a part of its chromophore thereof is dissociated. In this case, the counter ion may be either an inorganic cation such as an alkali metal or ammonium or an organic cation such as pyridinium or a quaternary ammonium salt. Moreover, a polymer cation having such a cation as its partial structure may be used.

Cyan dyes include azomethine dyes such as an indoaniline dye and an indophenol dye; polymethine dyes such as a cyanine dye, an oxonol dye and a merocyanine dye; carbonium dyes such as a diphenylmethane dye, a triphenylmethane dye and a xanthene dye; phthalocyanine dyes; anthraquinone dyes; aryl or heteryl azo dyes having, for example, phenols, naphthols or anilines as a coupling component; and indigo-thioindigo dyes. Such a dye may be one which would not develop a cyan color until a part of its chromophore thereof is dissociated. In this case, the counter ion may be either an inorganic cation such as an alkali metal or ammonium or an organic cation such as pyridinium or a quaternary ammonium salt. Moreover, a polymer cation having such a cation as its partial structure may be used.

Examples of water-soluble dyes include direct dyes, acidic dyes, edible dyes, basic dyes, reactive dyes and so on. Preferable examples thereof are as follows.

C.I. Direct-Red Nos. 2, 4, 9, 23, 26, 31, 39, 62, 63, 7275, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247.

C.I. Direct Violet Nos. 7, 9, 47, 48, 51, 66, 90, 93, 94, 95, 98, 100 and 101.

C.I. Direct Yellow Nos. 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163.

C.I. Direct Blue Nos. 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291.

C.I. Direct Black Nos. 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199.

C.I. Acid Red Nos. 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397.

C.I. Acid Violet Nos. 5, 34, 43, 47, 48, 90, 103 and 126.

C.I. Acid Yellow Nos. 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227.

C.I. Acid Blue Nos. 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326.

C.I. Acid Black Nos. 7, 24, 29, 48, 52:1 and 172.

C.I. Reactive Red Nos. 3, 13, 17, 19, 21, 22, 23, 24, 29, 35, 37, 40, 41, 43, 45, 49 and 55.

C.I. Reactive Violet Nos. 1, 3, 4, 5, 6, 7, 8, 9, 16, 17, 22, 23, 24, 26, 27, 33 and 34.

C.I. Reactive Yellow Nos. 2, 3, 13, 14, 15, 17, 18, 23, 24, 25, 26, 27, 29, 35, 37, 41 and 42.

C.I. Reactive Blue Nos. 2, 3, 5, 8, 10, 13, 14, 15, 17, 18, 19, 21, 25, 26, 27, 28, 29 and 38.

C.I. Reactive Black Nos. 4, 5, 8, 14, 21, 23, 26, 31, 32 and 34.

C.I. Basic Red Nos. 12, 13, 14, 15, 18, 22, 23, 24, 25, 27, 29, 35, 36, 38, 39, 45 and 46.

C.I. Basic Violet Nos. 1, 2, 3, 7, 10, 15, 16, 20, 21, 25, 27, 28, 35, 37, 39, 40 and 48.

C.I. Basic Yellow Nos. 1, 2, 4, 11, 13, 14, 15, 19, 21, 23, 24, 25, 28, 29, 32, 36, 39 and 40.

C.I. Basic Blue Nos. 1, 3, 5, 7, 9, 22, 26, 41, 45, 46, 47, 54, 57, 60, 62, 65, 66, 69 and 71.

C.I. Basic Black No. 8, and so on.

To control the color tone for obtaining a full-color image, the ink according to the invention may further contain other colorant together with the above-described ink. Examples of other colorants usable herein include the above-described dyes and the following pigments.

As the pigment to be used in the invention, use can be made of commercially available products as well as publicly known ones reported in various documents. Examples of such documents include *Color Index*, (ed. by The Society of Dyers and Colourists); *Kaitei Shinpan Ganryo Binran*, ed. by Nippon Ganryo Gijutu Kyokai (1989); *Saishin Ganryo Oyo Gijutsu*, CMC Shuppan (1986); *Insatsu Inki Gijutsu*, CMC Shuppan (1984); W. Herbst and K. Hunger, Industrial Organic Pigments (VCH Verlagsgesellschaft, 1993); etc. More specifically speaking, examples thereof include organic pigments such as azo pigments (azo lake pigments, insoluble azo pigments, fused azo pigment and chelate azo pigment), polycyclic pigments (phthalocyanine pigments, anthraquuinone pigments, perylene and perynone pigments, indigo pigments, quinacridone pigments, dioxazine pigments, isoindolinone pigments, quinophthalone pigments, diketopyrrolopyrole pigments, etc.), dye lake pigments (lake pigments of acidic or basic dyes), azine pigments and so on, and inorganic pigments such as yellow pigments (C.I. Pigment Yellow Nos. 34, 37, 42, 53, etc.), red pigments (C.I. Pigment Red Nos. 101, 108, etc.), blue pigments (C.I. Pigment Blue Nos. 27, 29, 17:1, etc.), black pigments (C.I. Pigment Black No.7, magnetite, etc.) and white pigments (C.I. Pigment White Nos. 4, 6, 18, 21, etc.).

As pigments having favorable color tone for image formation, it is preferable to use, as blue or cyan pigments, phthalocyanine pigments, indanthrone pigments falling within the category of anthraquinone type (for example, C.I. Pigment Blue No.60) and triarylcarbonium pigments falling within the category of dye lake pigments. It is still preferable to use phthalocyanine pigments (preferable examples thereof including copper phthalocyanine pigments such as C.I. Pigment Blue Nos. 15:1, 15:2, 15:3, 15:4, 15:6, monochloro- or low-chlorinated copper phthalocyanine, aluminum phthalocyanine such as the one described in EP 860475, nonmetal phthalocyanine such as C.I. Pigment Blue No. 16 and phthalocyanine pigments having Zn, Ni or Ti as the center metal, and, among all, C.I. Pigment Blue Nos. 15:3 and 15:4 and aluminum phthalocyanine being most desirable).

As red or purple pigments, it is preferable to use azo pigments (preferable examples thereof including C.I. Pigment Red Nos. 3, 5, 11, 22, 38, 48:1, 48:2, 48:3, 48:4, 49:1, 52:1, 53:1, 57:1, 63:2, 144, 146 and 184), still preferably C.I. Pigment Red Nos. 57:1, 146 and 184; quinacridone pigments (preferable examples thereof including C.I. Pigment Red Nos. 122, 192, 202, 207 and 209 and C.I. Pigment Violet Nos. 19 and 42, and, among all, C.I. Pigment Red No. 122 being most desirable), triarylcarbonium pigments falling within the category of dye lake pigments (preferable examples thereof including xanthene-based C.I. Pigment Red No. 81:1 and C.I. Pigment Violet Nos. 1, 2, 3, 27 and 39), dioxane pigments (for example, C.I. Pigment Violet Nos. 23 and 37), diketopyrrolopyrole pigments (for example, C.I. Pigment Red 254), perylene pigments (for example, C.I. Pigment Violet No. 29), anthraquinone pigments (for example, C.I. Pigment Violet Nos. 5:1, 31 and 33) and thioindigo pigments (for example, C.I. Pigment Red Nos. 38 and 88).

As yellow pigments, it is preferable to use azo pigments (preferable examples thereof including monoazo pigments such as C.I. Pigment Yellow Nos. 1, 3, 74 and 98, disazo pigments such as C.I. Pigment Yellow Nos. 12, 13, 14, 16, 17 an d83, general azo type pigments such as C.I. Pigment Yellow Nos. 93, 94, 95, 128 and 155, benzimidazolone pigments such as C.I. Pigment Yellow Nos. 120, 151, 154, 156 an d180 and so on, and, among all, those not produced from benzidine compounds being still preferable), isoindoline and isoindolinone pigments (preferable examples including C.I. Pigment Yellow Nos. 109, 110, 137 and 139), quinophthalone pigments (preferable examples thereof including C.I. Pigment Yellow No. 138) and flavantrone pigments (for example, C.I. Pigment Yellow No. 24).

As black pigments, preferable examples include inorganic pigments (preferable examples thereof including carbon black and magnetite) and aniline black.

Furthermore, use may be made of orange pigments (C.I. Pigment Orange Nos. 13 and 16, etc.) or green pigments (C.I. Pigment Green No.7, etc.).

The pigment usable in the invention may be a naked pigment as described above. Alternatively, a surface-treated pigment may be used. Methods of the surface-treatment include coating the pigment surface with a resin or wax, adhering a surfactant, bonding a reactive substance (for example, a silane coupling agent, an epoxy compound, polyisocyanate or a radical formed from a diazonium salt) to the pigment surface. These methods are described in the following documents and patents.

(1) *Kinzoku Sekken no Seishitsu to Oyo* (Saiwai Shobo)
(2) *Insatsu Inki Insatsu* (CMC Shuppan, 1984)
(3) *Saishin Ganryo Oyo Gisutsu* (CMC Shuppan, 1986)
(4) U.S. Pat. No. 5,554,739 and U.S. Pat. No. 5,571,311
(5) JP-A-9-151342, JP-A-10-140065, JP-A-10-292143 and JP-A-11-166145

In particular, self-dispersible pigments prepared by treating carbon black with a diazonium salt as-described in the above US Patents (4) and capsulated pigments prepared by the method described in the above Japanese Patents (5) are effective, since high dispersion stability can be established thereby without using any excessive dispersant in the ink.

In the invention, a pigment may be dispersed by further using a dispersant. As the dispersant, use can be made of various publicly known dispersants (for example, a low-molecular weight dispersant of the surfactant type and a high-molecular weight dispersant) selected depending on the pigment to be employed. As examples of the dispersants, those described in JP-A-3-69949 and EP 549486 may be cited. In the case of using a dispersant, it is also possible to add a pigment derivative called a synergist to thereby promote the adsorption of the dispersant by the pigment.

It is preferable that the particle size of the pigment usable in the invention ranges from 0.01 to 10 μm, still preferably from 0.05 to 1 μm after the dispersion.

As a method of dispersing the pigment, use can be made of publicly known techniques employed in producing inks or toners Examples of dispersing machines include a vertical or horizontal agitator mill, an attoliter, a colloid mill, a ball mill, a three-roll mill, a pearl mill, a supermill, an impeller, a disperser, a KD mill, a Dynatron, a pressure kneader and so on. These machines are described in detail in *Saishin Ganryo Oyo Gijutsu* (CMC Shuppan, 1986).

Next, other components to be contained in the inkjet recording ink composition according to the invention will be illustrated.

The inkjet recording ink composition according to the invention may contain a surfactant by which the liquid properties of the ink composition can be controlled, thereby contributing to the improvement in the jetting stability of the ink composition, the improvement in the water resistance of a printed image and the prevention of the printed ink composition from bleeding.

Examples of the surfactant include anionic surfactants such as sodium dodecyl sulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonyl phenyl ether, polyoxyethylene naphthyl ether and polyoxyethylene octyl phenyl ether. Among all, it is preferable to use a nonionic surfactant.

The content of the surfactant ranges from 0.001 to 15% by mass, preferably from 0.005 to 10% by mass and still preferably from 0.01 to 5% by mass, based on the ink composition.

The inkjet recording ink according to the invention can be prepared by dissolving and/or dispersing the dye and the surfactant in an aqueous medium. The term "aqueous medium" as used herein means water or a mixture of water with a small amount of a water-miscible organic solvent containing, if necessary, an additive such as a moistening agent, a stabilizer or a preservative.

Examples of the water-miscible organic solvent (including water-soluble organic solvents) usable herein include alcohols (for example, methanol, ethanol, propanol, isopropanol, butanol isobutanol, sec-butanol, t-butanolpentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol and thiodiglycol), glycol derivatives (for example, ethylene glycol monometyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine) and other polar solvents (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-pxazolidone, 1,3-dimethyl-2-imidazolidinone, acetonitrile and acetone). Two or more of these water-miscible organic solvents may be used together. In the invention, it is particularly preferable to employ a water-soluble organic solvent having a boiling point of 150° C. or higher.

In the case where the above-described dye is a fat-soluble dye, the ink composition can be prepared by dissolving the fat-soluble dye in a high-boiling point organic solvent and then emulsified and dispersed in an aqueous medium.

The high-boiling point organic solvent to be used in the invention has a boiling point of 150° C. or higher, preferably 170° C. or higher.

Examples of the high-boiling point organic solvent include phthalic acid esters (for example, dibutyl phthalate, dioctyl phthalate, dicyclohexyl phthalate, di-2-ethylhexyl phthalate, decyl phthalate, bis(2,4-di-tert-amylphenyl) isophthalate and bis(1,1-diethylpropyl) phthalate), phosphoric acid or phosphone esters (for example, diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate and di-2-ethylhexylphenyl phosphate), beizoic acid esters (for example, 2-ethylhexyl benzoate, 2,4-dichloro benzoate, dodecyl benzoate and 2-ethylhexyl-o-hydroxybenzoate), amides (for example, N,N-diethyldecanamide and N,N-diethyllaurylamide) alcohols or phenols (isostearyl alcohol, 2,4-di-tert-amyl phenol, etc.), aliphatic esters (for example, dibutoxyethyl succinate, di-2-ethylhexyl succinate, h-hexyldecyl tetradecanoate, tributyl citrate, diethyl azelate, isostearyl lactate and trioctyl citrate), aniline derivatives (N,N-dibutyl-2-butoxy-5-tert-octylaniline, etc.), chlorinated paraffins (paraffins containing from 10% to 80% of chlorine), trimesic acid esters (for example, tributyl trimesate), dodecylbenzene, diisopropylnaphthalene, phenols (for example, 2,4-di-tert-amyl phenol, 4-dodecyloxy phenol, 4-dodecyloxycarbonyl phenol and 4-(4-dodecyloxyphenylsulfonyl) phenol)), carboxylic acids (for example, 2-(2,4-di-tert-amylphenoxybutyric acid and 2-ethoxyoctanedecanoic acid), alkylphosphoric acids (for example, di-2(ethylhexyl)phosphoric acid and diphenylphosphoric acid) and so on. Such a high-boiling point organic solvent can be used in an amount of from 0.01 to 3 times by mass, preferably form 0.01 to 1.0 time by mass, as much as the fat-soluble dye.

Either one of these high-boiling point organic solvent or a mixture of several types thereof (for example, tricresyl phosphate and dibutyl phthalate, trioctyl phosphate with di(2-ethylhexyl) cebacate, dibutyl phthalate with poly(N-t-butylacrylamide)) may be used.

Examples of the high-boiling point organic solvent to be used in the invention other than the compounds cited above and methods of synthesizing these high-boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patent 276,319A, European Patent 286,253A, European Patent 289,820A, European Patent 309,158A, European Patent 309,159A, European Patent 309,160A, European Patent 509,311A, European Patent 510, 576A, East Germany Patent 147,009, East Germany Patent 157,147, East Germany Patent 159,573, East Germany Patent 225,240A, British Patent 2,091,124A, JP-A-48-47355, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, JP-A-4-346338 and so on.

Such a high-boiling point organic solvent is used in an amount of from 0.01 to 3 times by mass, preferably form 0.01 to 1.0 time by mass, as much as the fat-soluble dye.

In the invention, the fat-soluble dye and the high-boiling point organic solvent are emulsified and dispersed in an aqueous medium before using. From the viewpoint of emulsification properties, use can be sometimes made of a low-boiling point organic solvent in the step of emulsification and dispersion. The term "low-boiling point organic solvent" means an organic solvent having a boiling point of from about 30° C. to 150° C. under atmospheric pressure. Preferable examples thereof include esters (for example, ethyl acetate, butyl acetate, ethyl propionate, β-ethoxyethyl acetate and methyl cellosolve acetate), alcohols (for example, isopropyl alcohol, n-butyl alcohol and secondary butyl alcohol), ketones (for example, methyl isobutyl ketone, methyl ethyl ketone and cyclohexanone), amides (for example, dimethylformamide and N-methylpyrrolidone), ethers (for example, tetrahydrofuran and dioxane), though the invention is not restricted thereto.

The emulsification and dispersion can be carried out by dissolving the oily phase in the high-boiling point organic solvent, which is optionally in the form of a solvent mixture with the low-boiling point organic solvent, dispersing the oily phase in an aqueous phase mainly comprising water and thus forming small oil droplets of the oily phase. In this step, it is possible to add an additive such as a surfactant, a moistening agent, a dye stabilizer, an emulsion stabilizer, a preservative or an antifungal agent either one of the aqueous phase and the oily phase or both of the same, if necessary.

Although emulsification is commonly carried out by adding the oily phase to the aqueous phase, it is also favorable to employ a so-called reversed phase emulsification method in which the aqueous phase is added in drops into the oily phase.

In the emulsification and dispersion step according to the invention, various surfactants can be used. Preferable examples of the surfactants include anionic surfactants such as fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid-formalin condensation product and polyoxyethylene alkylsulfuric acid ester salts, and nonionic surfactants such as polyoxyethylene alkyl ethers, polyoxyethylene alkyl aryl ethers, polyoxyethylene fatty acid esters, sorbitan fatty acid esters, polyoxyethylene sorbitan fatty acid esters, polyoxoyethylene alkylamines, glycerol fatty acid esters and oxyethylene oxypropylene block copolymers. It is also preferable to use SURFYNOLS (Air Products & Chemicals) which are acetylene polyoxyethylene oxide-based surfactants. It is also preferable to employ amine oxide type amphoteric surfactants such as N,N-dimethyl-N-alkylamine oxides. Moreover, use can be made of those cited as surfactants in JP-A-59-157,636, pp. 37–38 and Research Disclosure No. 308119 (1989).

To stabilize the produce immediately after the emulsification, a water-soluble polymer may be added together with the above-described surfactant. As the water-soluble polymer, it is preferable to use polyvinyl alcohol, polyvinylpyrrolidone, polyethylene oxide, polyacrylic acid, polyacrylamide or a copolymer thereof. It is also preferable to employ natural water-soluble polymers such as polysaccharides, casein and gelatin. To stabilize the dye dispersion, use can be also made of polyvinyl, polyurethane, polyester, polyamide, polyurea, polycarbonate, etc. which are obtained by polymerizing acrylic acid esters, methacrylic acid esters, vinyl esters, acrylamides, methacrylamides, olefins, styrenes, vinyl ethers, acrylonitriles and substantially insoluble in aqueous media. It is preferable that such a polymer has $—SO_3^-$ or $—COO^-$. In the case of using such a polymer substantially insoluble in aqueous media, it is used preferably in an amount of 20% by mass or less, still preferably 10% by mass or less based on the high-boiling point organic solvent.

To produce an aqueous ink composition by dispersing the fat-soluble dye and the high-boiling point organic solvent by emulsification and dispersion, it is particularly important to control the particle size. To elevate the color purity or density of an image formed by ink jetting, it is essentially required to lessen the average particle size. The volume-average particle size of 1 μm is preferable and an average particle size of from 5 to 100 nm is still preferable.

The volume-average particle diameter and the grain size distribution of the dispersed particles as described above can be easily measured by using publicly known methods, for example, the static light scattering method, the dynamic light scattering method, the centrifugal precipitation method, or the methods described in *Jikken Kagaku Koza*, 4th ed., pp. 417–418. For example, the ink composition is diluted with distilled water to give a particle concentration of 0.1 to 1% by mass and then the measurement can be easily made by using a commercially available volume-average particle size analyzer (for example, MICROTRAC UPA manufactured by NIKKISO). The dynamic light scattering method with the use of the laser Doppler effect is particularly preferable, since even a small particle size can be measured thereby.

"Volume-average particle diameter", which means the average particle diameter weighted with particle volume, is calculated by dividing the sum of the products of the diameters of individual particles by the volumes of the corresponding particles by the total volume of the particles. Volume-average particle diameter is reported in *Kobunshi Ratekkusu no Kagaku*, (Soichi Murai, Kobunshi Kanko-kai), p. 119.

Moreover, it has been clarified that the existence of coarse particles largely affects the printing performance. That is to say, coarse particles would result in nozzle head clogging or, at least, form stains to cause jetting failures or misdirection, thereby seriously affecting the printing performance. To prevent these phenomena, it is important to regulate the ratio of particles of 5 μm or larger to not more than 10 particles per μl of ink and the ratio of particles of 1 μm or larger to not more than 1000 particles per μl of ink.

To remove these coarse particles, use can be made of the publicly known centrifugation method, ultrafiltration method or the like. Such a separation procedure may be carried out immediately after the emulsification and dispersion. Alternatively, it may be carried out after adding various additives such as a moistening agent and a surfactant to the emulsion/dispersion and immediately before packing into an ink cartridge.

As an efficacious procedure for lessening the average particle size and removing coarse particles, use can be made of a mechanical emulsifying apparatus.

As an emulsifying apparatus, use can be made of publicly known apparatuses such as a simple stirrer, an impeller stirring system, an in-line stirring system, a milling system such as a colloid mill and an ultrasonication system. Among all, it is particularly preferable to employ a high-pressure homogenizer.

Detailed mechanism of a high-pressure homogenizer is described in U.S. Pat. No. 4,533,254, JP-A-6-47264, etc. Examples of commercially available apparatuses include a Gaulin Homogenizer (A.P.V. GAULIN INC.), a microfluidizer (MICROFLUIDEX INC.) and an ultimizer (SUGINO MACHINE, LTD.) and so on.

In recent years, there has been reported a high-pressure homogenizer having a mechanism of atomizing in an ultra-high pressure jet stream as described in U.S. Pat. No. 5,720,551. This apparatus is particularly effective in the emulsification and dispersion in the inventions. As an example of the emulsification apparatus with the use of the ultra-high pressure jet stream, DeBEE 2000 (BEE INTERNATIONAL LTD.) can be cited.

The pressure employed in the emulsification using the high-pressure emulsification apparatus is 50 MPa or more, preferably 60 MPa or more and still preferably 180 MPa or more.

It is a particularly preferable method to employ 2 or more emulsification apparatuses, for example, emulsifying by a stirring emulsification apparatus and then passing through a high-pressure homogenizer. It is also preferable to employ a method which comprises once emulsifying and dispersing with such an emulsification apparatus, then adding additives such as a moistening agent and a surfactant, and then passing through a high-pressure homogenizer before packing the ink into a cartridge.

In the case of an ink composition containing a high-boiling point organic solvent together with a low-boiling point organic solvent, it is favorable from the viewpoints of the stability of the emulsion and safety and hygiene to remove the low-boiling point organic solvent. To remove the low-boiling point organic solvent, various publicly known methods can be used depending on the type of the solvents. Namely, use can be made of the evaporation method, the vacuum evaporation method, the ultrafiltration method, etc. It is preferable to remove the low-boiling point organic solvent as quickly as possible immediately after the emulsification.

In the inkjet recording ink composition obtained by the invention, it is possible to use appropriately selected additives, for example, an anti-drying agent for preventing clogging at the jetting port due to drying, a penetration promoter for improving the penetration of the ink into paper, an UV absorber, an antioxidant, a viscosity controlling agent, a surface tension controlling agent, a dispersant, a dispersion stabilizer, an antifungal agent, an anti-rusting agent, a pH controlling agent and so on each in an appropriate amount.

As the anti-drying agent to be used in the invention, a water-soluble organic solvent having a vapor pressure lower than water is preferred. Specific examples thereof include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol and trimethylolpropane, polyhydric alcohol lower alkyl ethers such as ethylene glycol monomethyl (or ethyl) ether, diethylene glycol monomethyl (or ethyl) ether and triethylene glycol monomethyl (or ethyl) ether, heterocyclic compounds such as 2-pyrrolidone, N-methyl-2-pyrrolidone, 1,3-dimethyl-2-imidazolidinone and N-ethylmorpholine, sulfur-containing compounds such as sulfolane, dimethyl sulfoxide and 3-sulfolene, polyfunctional compounds such as diacetone alcohol and diethanolamine and urea derivatives. Among these compounds, polyhydric alcohols such as glycerol and diethylene glycol are still preferable. Either one of these anti-drying agents or a combination of two or more thereof may be used. It is preferable that the content of such an anti-drying agent in the ink ranges from 10 to 50% by mass.

As the penetration promoter to be used in the invention, it is possible to employ alcohols such as ethanol, isopropanol, butanol, di(tri)ethylene glycol monobutyl ether and 1,2-hexanediol, sodium lauryl sulfate, sodium oleate and nonionic surfactants. Such a penetration promoter exerts a sufficient effect at a content of from 10 to 30% by mass in the ink. It is preferably added in such an amount as not causing print bleeding or print through.

As the UV absorber to be use din the invention in order to improve the image storage properties, use can be made of benzotriazole compounds described in JP-A-58-185677, JP-A-61-190537, JP-A-2-782, JP-A-5-197075, JP-A-9-34057, etc., benzophenone compounds described in JP-A-46-2784, JP-A-5-19483, U.S. Pat. No. 3,214,463, etc., cinnamic acid compounds described in JP-B-48-30492, JP-B-56-21141, JP-A-10-88106, etc., triazine compounds described in JP-A-4-298503, JP-A-8-53427, JP-A-8-239368, JP-A-10-182621, JP-T-8-501291, etc., compounds described in Research Disclosure No. 24239, and compounds absorbing UV rays and generating fluorescence (i.e., so-called fluorescent whitening agents) typified by stilbene and benzoxazole compounds.

As the antioxidant to be used in the invention for improving image storage properties, use can be made of various discoloration inhibitors of the organic and metal complex types. Examples of the organic discoloration inhibitors include hydroquinones, alkoxyphenols, dialkoxyphenols, phenols, anilines, amines, indanes, chromans, alkoxyanilines and heterocyclic compounds. Examples of the metal complex discoloration inhibitors include nickel complexes and zinc. complexes. More specifically speaking, it is possible to employ compounds described in patents cited in Research Disclosure No. 17643, VII-I to J, Research Disclosure No. 15162, Research Disclosure No. 18716, p. 650, left column, Research Disclosure No. 36544, p. 527, Research Disclosure No. 307105, p. 872 and Research Disclosure No. 15162 and compounds included in the formula of typical compounds and compound examples given in JP-A-62-215272, pp. 127–137.

As the antifungal agent to be used in the invention, citation may be made of sodium dehydroacetate, sodium benzoate, sodium pyridinethione-1-oxide, ethyl ester of p-hydroxybenzoic acid, 1,2-benzisothiazolin-3-one and its salt. It is preferable that such an antifungal agent is used in an amount of from 0.02 to 5.00% by mass in the ink.

These compounds are illustrated in detail in Bokin Bobizai Jiten, (ed. by The Society of Antibacterial and Antifungal Agents, Japan) and so on.

Examples of the anti-rusting agent include acidic sulfites, sodium thiosulfate, ammon thioglycolate, diisopropylammonium nitrite, pentaerythritol tetranitrate, dicyclohexylammonium nitrite, benzotriazole and so on. Such an anti-rusting agent is preferably used in an amount of form 0.02 to 5.00% by mass in the ink.

In the invention, it is appropriate to use a pH controlling agent so as to control the pH value and impart dispersion stability. It is preferable that the pH value of the ink is controlled to 8 to 11 at 25° C. When the pH is lower than 8, the solubility of the ink is worsened and thus nozzle clogging frequently arises. When the pH exceeds 11, on the other hand, the water-resistance of the ink is liable to be worsened. Examples of the pH controlling agent include basic ones such as organic bases and inorganic alkalis and acidic ones such as organic acids and inorganic acids.

Examples of the above-described organic bases include triethanolamine, diethanolamine, N-methyldiethanolamine, dimethylethanolamine, etc. Examples of the above-described inorganic alkalis include alkali metal hydroxides (for example, sodium hydroxide, lithium hydroxide, potassium hydroxide, etc.), carbonic acid salts (for example, sodium carbonate, sodium hydrogen carbonate, etc.), ammonium and so on. Examples of the above-described organic acids include acetic acid, propionic acid, trifluoroacetic acid, alkylsulfonic acids and so on. Examples of the above-described inorganic acids include hydrochloric acid, sulfuric acid, phosphoric acid and so on.

Except the betaine compounds including surfactants as described above, use is made of a nonionic, cationic or anionic surfactant in the invention in order to control surface tension. Examples of the anionic surfactant include fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid-formalin condensation product polyoxyethylene alkylsulfuric acid ester salts and so on. Examples of the nonionic surfactant include sorbitan fatty acid esters, polyxoyethylene alkylamines, glycerol fatty acid esters, oxyethylene oxypropylene block copolymers and so on. It is also preferable to use SURFYNOLS (Air Products & Chemicals) which are acetylene polyoxyethylene oxide-based surfactants.

Concerning surface tension, it is preferable that the ink to be used in the invention has a dynamic surface tension and a static surface tension at 25° C. both ranging from 20 to 50 mN/m, still preferably from 20 to 40 mN/m. When the surface tension exceeds 50 mN/m, printing qualities (jetting stability, bleeding at color mixing, tailing, etc.) are seriously worsened. When the surface tension of the ink is controlled to 20 mN/m or lower, there sometimes arise printing failures due to the adhesion of the ink to the hard surface at jetting, etc.

The ink according to the invention has a viscosity at 25° C. of from 1 to 20 mPa·S, preferably from 2 to 15 mPa·S and still preferably from 2 to 10 mPa·S. When the ink viscosity exceeds 30 mPa·S, the fixation speed of the image is lowered and the jetting performance is worsened. When the ink viscosity is less than 1 mPa·S, on the other hand, the image suffers from bleeding and thus the text qualities are worsened.

The viscosity can be arbitrarily regulated by controlling the addition level of the ink solvent. Examples of the ink solvent include glycerol, diethylene glycol, triethanolamine, 2-pyrrolidone, diethylene glycol monobutyl ether, triethylene glycol monobutyl ether and so on.

It is also possible to employ a viscosity controlling agent. Examples of the viscosity controlling agent include water-soluble polymers such as cellulose and polyvinyl alcohol and nonionic surfactants. These substances are described in greater detail in *Nendo Chosei Gijutsu*, (Technical Information Institute, 1999) chap. 9; and Inku Jetto Purinta-yo Kemikaruzu (enlarged in '98) *Zairyo no Kaihatsu Doko Tenbo Chosa*, (CMC, 1997), pp. 162–174.

To prepare the ink according to the invention, it is preferable in the case of a water-soluble ink to first dissolve in water. Subsequently, various solvents and additives are added thereto and dissolved and mixed to give a homogeneous ink.

For the dissolution, use can be made of various methods such as dissolution under stirring, dissolution under ultrasonication, dissolution by shaking, etc. Among all, the stirring method is preferably employed. In the case of stirring, use can be made of various methods publicly known in the art, for example, fluidization stirring, stirring with the use of shear force (an inversion agitator, a dissolver, etc.) and so on. It is also preferable to employ a stirring system with the use of the shear force against the container bottom such as a magnetic stirrer.

Next, a recording paper and a recording film which are reflection media to be used in the image recording method according to the invention will be illustrated. As the substrate of the recording paper or the recording film, use can be made of a chemical pulp such as LBKP or NBKP, a mechanical pulp such as GP, PGW, RMP, TMP, CTMP, CMP or CGP, or a waste paper pulp such as DIP which contains, if necessary, various publicly known additives such as a pigment, a binder, a sizing agent, a fixing agent, a cationic agent or a paper reinforcing agent and processed by using various machines such as a long-wire paper machine or a round-wire paper machine. In addition to these substrates, use can be also made of synthetic papers or plastic film sheets. The thickness of the substrate preferably ranges from 10 to 250 μm, while the basis weight thereof preferably ranges from 10 to 250 g/m$^2$.

An ink absorbing layer and a back coat layer may be directly formed on the substrate as such to give an image-receiving material. Alternatively, a size press or an anchor coat layer may be formed using starch, polyvinyl alcohol, etc. followed by the formation of an ink absorbing layer and a back coat layer to give an image-receiving material. The substrate may be smoothened by using a calendering machine such as a machine calender, a TG calender or a soft calender.

As the substrate in the invention, it is preferable to employ a paper sheet or a plastic film having been laminated on both faces with a polyolefin (for example, polyethylene, polystyrene, polyethylene terephthalate, polybutene or a copolymer thereof). It is preferable to add a white pigment (for example, titanium oxide or zinc oxide) or a coloring dye (for example, cobalt blue, ultramarine blue or neodium oxide) to the polyolefin.

The ink absorbing layer to be formed on the substrate contains a porous material and an aqueous binder. It is also preferable that the ink absorbing layer contains a pigment which is preferably a white pigment. Examples of the white pigment include inorganic white pigments such as calcium carbonate, kaolin, talc, clay, diatamaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-based pigments, acrylic pigments, urea resins and melamine resins. Inorganic white pigments having porous natures are favorable and synthetic amorphous silica having a large pore size is particularly suitable therefor. As the synthetic amorphous silica, either silicic anhydride obtained by the dry production process and water-containing silicic acid obtained by the wet production process may be used, though it is preferred to employ the water-containing silicic acid. Two or more of these pigments may be used together.

Examples of the aqueous binder to be contained in the ink absorbing layer include water-soluble polymers such as polyvinyl alcohol, silanol-denatured polyvinyl alcohol, starch, cationized starch, casein, gelatin, carboxymethylcellulose, hydroxyethylcellulose, polyvinylpyrrolidone, polyalkylene oxides and polyalkylene oxide derivatives, and water-dispersible polymers such as styrene-butadiene latex and acrylic emulsion. Either one of these aqueous binders or a combination of 2 or more thereof may be used. Among all, polyvinyl alcohol and silanol-denatured polyvinyl alcohol are particularly preferable in the invention from the viewpoints of the stickiness to the pigment and peeling-resistance of the ink absorbing layer.

In addition to the pigment and the aqueous binder, the ink absorbing layer can further contain other additives such as a mordant, a water-fastness agent, a light-resistance improving agent, a surfactant, a film-hardening agent, etc.

It is preferable that the mordant to be added to the ink absorbing layer has been fixed. Therefor, it is favorable to employ a polymer mordant.

Polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. Among all, image-receiving materials containing the polymer mordants described in JP-A-A-161236, pp. 212–215 are particularly preferable. Using the polymer mordants described in this document, images with excellent qualities can be obtained and the light-resistance of the images can be improved.

A water-fastness agent is effective in making an image waterproof. As the water-fastness agent, cation resins are particularly preferable. Examples of the cation resins include polyamide polyamine epichlrohydrin, polyethyleneimine, polyaminesulfone, dimethyldiallyammonium chloride polymer, cation polyacrylamide, colloidal silica and so on. Among these cation resins, polyamide polyamine epichlrohydrin is appropriate. The content of such a cation resin preferably ranges form 1 to 15% by mass, still preferably from 3 to 10% by mass, based on the total solid content of the ink absorbing layer.

Examples of the light-resistance improving agent include zinc sulfate, zinc oxide, hinder amine type antioxidants and benzotriazole-based UV absorbers such as benzophenone. Among all, zinc sulfate is particularly preferable therefor.

The surfactant serves as a coating aid, a peeling properties improving agent, a slipperiness improving agent or an antistatic agent. Surfactants are described in JP-A-62-173463 and JP-A-62-183457.

The surfactant may be replaced by an organofluoro compound. It is preferable that the organofluoro compound has a hydrophobic nature. Examples of the organofluoro compound include fluorine-based surfactants, oily fluorine-based compound (for example, fluorine oil) and solid fluorine-based compound (for example, ethylene tetrafluoride resin). Organofluoro compounds are described in JP-B-57-9053 (columns 8 to 17), JP-A-61-20994 and JP-A-62-135826.

As the film-hardening agent, use can be made of materials described in JP-A-1-161236, p.222, etc.

As other additives to be added to the ink absorbing layer, a pigment dispersant, a thickener, a defoaming agent, a dye, a fluorescent whitening agent, a preservative, a pH controlling agent, a matting agent, a film-hardening agent, etc. can be cited. The ink absorbing layer may consist of either a single layer or two layers.

Further, the recording paper or the recording film may be provided with a back coat layer which may contain a white pigment, an aqueous binder and other components.

Examples of the white pigment to be contained in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate and magnesium hydroxide, and organic pigments such as styrene-based plastic pigments, acrylic plastic pigments, polyethylene, microcapsules, urea resins and melamine resins.

Examples of the aqueous binder to be contained in the back coat layer include water-soluble polymers such as styrene/maleic acid salt copolymers, styrene/acrylic acid salt copolymers, polyvinyl alcohol, silanol-denatured polyvinyl alcohol, starch, cationized starch, casein, gelatin, carboxymethylcellulose, hydroxyethylcellulose and polyvinylpyrrolidone and water-dispersible polymers such as styrene-butadiene latex and acrylic emulsion. As other additives to be added to the back coat layer, a defoaming agent, a foam-controlling agent, a dye, a fluorescent whitening agent, a preservative, a water-fastness agent, etc. can be cited.

A dispersion of fine polymer particles may be added to the layers (including the back coat layer) constituting the inkjet recording paper and recording film. The dispersion of fine polymer particles is employed to improve film properties, for example, dimensional stabilization, prevention of curling, prevention of sticking, prevention of film cracking, etc. Such dispersions of fine polymer particles are described in JP-A-62-245258, JP-A-62-1316648 and JP-A-62-110066. By adding a dispersion of fine polymer particles having a low glass transition temperature (40° C. or lower) to a layer containing a mordant, the layer can be prevented from cracking or curling. By adding a dispersion of fine polymer particles having a high glass transition temperature to the back layer, curing can be also prevented.

In the invention, the inkjet recording system is not particularly restricted. Namely, the invention is applicable to various publicly known systems, for example, the charge-control system wherein an ink is jetted using static attraction, the drop on demand system with the use of vibration pressure of a piezo element, a sonic inkjet system wherein an electric signal is converted into a sonic beam and irradiated to an ink so that the ink is jetted under the radiation pressure, and the thermal inkjet (bubble jet) system wherein ink is heated to form bubbles and the pressure thus generated is employed.

Inkjet recording systems include a system wherein a large number of inks with low density, which are called photoinks, are jetted each in a small volume; a system wherein plural inks having substantially the same color hue but different densities are employed to improve image qualities; and a system with the use of a colorless and transparent ink.

The inkjet recording ink according to the invention can be also used for purposes other than inkjet recording. For example, it is usable in display image materials, image-forming materials for interior decorating, image-forming materials for exterior decorating, etc.

The image-forming materials for exterior decorating means posters, wallpapers, decorative gadgets (figurines, dolls, etc.), advertising circulars, wrapping papers, wrapping materials, paper bags, plastic bags, packaging materials, advertising displays, images drawn on the side wall of transport facilities (automobiles, buses, trains, etc.), clothes with logo, and so on. In the case of using the dye according to the invention as a material for forming display images, these images include not only images in the narrow sense but also any patterns (abstractive designs, characters, geometric patterns, etc.) being drawn with the dye and perceivable with the human eye.

The image-forming materials for interior decorating mean wallpapers, decorative gadgets (figurines, dolls, etc.), lighting parts, furniture parts, floor and ceiling materials and so on. In the case of using the dye according to the invention as a material for forming display images, these images include not only images in the narrow sense but also any patterns (abstractive designs, characters, geometric patterns, etc.) being drawn with the dye and perceivable with the human eye.

The image-forming materials for exterior decorating mean wall materials, roofing materials, advertising signs, gardening materials, exterior decorative gadgets (figurines, dolls, etc.), exterior lighting parts, and so on. In the case of using the dye according to the invention as a material for forming display images, these images include not only images in the narrow sense but also any patterns (abstractive designs, characters, geometric patterns, etc.) being drawn with the dye and perceivable with the human eye.

As the media on which patterns are formed in the above-described uses, various materials such as paper, fibers, fabrics (including nonwoven fabrics), plastics, metals and ceramics can be cited. Concerning the dyeing methods, use can be made of mordanting or printing. It is also possible to fix a colorant in the form of a reactive dye having a reactive group introduced thereinto. Among these methods, the mordanting is preferred.

EXAMPLES

Now, the invention will be illustrated by reference to the following Examples, though the invention is not construed as being restricted thereto.

Example 1

Deionized water was added to the following components to give a total volume of 1 L. Then the mixture was heated to 30 to 40° C. under stirring for 1 hour. Next, it was filtered through a microfilter of 0.25 μm in average pore size under reduced pressure to thereby prepare a light magenta ink solution LM-101.

[Formulation of Light Magenta Ink LM-101]

(Solid Components)

| (Solid components) | |
|---|---|
| Magenta colorant (a-36) | 7.5 g/l |
| Urea | 37 g/l |
| (Liquid components) | |
| Diethylene glycol (DEG) | 140 g/l |
| Glycerol (GR) | 120 g/l |
| Triethylene glycol monobutyl ether (TGB) | 120 g/l |
| Triethanolamine (TEA) | 6.9 g/l |
| SURFYNOL STG (SW) | 10 g/l |

Further, a magenta ink solution M-101 was prepared in accordance with the above formulation but increasing the magenta colorant (a-36) content to 23 g.

[Formulation of Magenta Ink M-101]

(Solid Components)

| (Solid components) | |
|---|---|
| Magenta colorant (a-36) | 23 g/l |
| Urea | 37 g/l |
| (Liquid components) | |
| Diethylene glycol (DEG) | 140 g/l |
| Glycerol (GR) | 120 g/l |
| Triethylene glycol monobutyl ether (TGB) | 120 g/l |
| Triethanolamine (TEA) | 6.9 g/l |
| SURFYNOL STG (SW) | 10 g/l |

Moreover, inks LM-102 to 108 and M-102 to 108 were prepared respectively in accordance with the formulations of LM-101 and M-101 but adding the following additives.

TABLE 33

| | Surfactant (common to inks LM and M) |
|---|---|
| LM-101, M-101 (Comp. Ex.) | SW 10 g/l |
| LM-102, M-102 (Comp. Ex.) | X1-1 10 g/l |
| LM-103, M-103 (Comp. Ex.) | X1-1 10 g/l, POEP-1 10 g/l |
| LM-104, M-104 (Comp. Ex.) | W4-5 10 g/l |
| LM-105, M-105 (Invention) | X1-1 10 g/l, SW 10 g/l |
| LM-106, M-106 (Invention) | X1-1 10 g/l, W4-5 10 g/l |
| LM-107, M-107 (Invention) | X1-4 10 g/l, SW 10 g/l |
| LM-108, M-108 (Invention) | X1-4 10 g/l, W4-5 10 g/l |

POEP-1: polyoxyethylene nonyl phenyl ether (PEO chain average 30)

These inks were packed in magenta ink and light magenta ink cartridges of an ink jet printer Model PM-950C (EPSON). Using inks of PM-950C in other colors, a monocolor magenta image was printed. As an image-receiving sheet, use was made of a glossy inkjet photopaper GASAI manufactured by Fuji Photo Film Co., Ltd. The image qualities and image fastness under highly humid conditions were evaluated.

(Evaluation Experiment)

[1] Evaluation of Printing Qualities (Bronzing)

To evaluate printing qualities in a high-density part, an image pattern, in which seven colors C, M, Y, B, G, R and Bk showed changes in density gradually 8 steps, was formed using a software Adobe Photoshop 7 and then this pattern was printed at 15° C. under 80% RH.

In the evaluation, A means a case wherein a glossy print image was obtained from the low density part to the high density part; B means a case wherein 1 to 3 opaque points were observed in an image; and C means a case wherein 4 or more opaque points were observed.

[2] Evaluation of Image Fastness (Bleeding) Under Highly Humid Conditions

To evaluate bleeding of an image under highly humid conditions, a print pattern wherein 4 magenta squares (3 cm×3 cm) were arranged in 2 lows at intervals of 1 mm both in length and breadth was formed. After storing this image sample at 25° C. under 90% RH for 72 hours, bleeding of the dye into the white spaces was observed. In the evaluation, A means a case wherein an increase in the magenta density in the white spaces through a status A magenta filter was 0.01 or less compared with the case immediately after printing; B means a case wherein the increase was from 0.01 to 0.05; C means a case wherein the increase was 0.05 or more; and D means a case wherein serious bleeding of magenta was observed in the whole image.

The following table shows the obtained results.

TABLE 34

| | Bronzing | M bleeding |
|---|---|---|
| EPSON genuine ink (PM-950C) | A | B |
| LM-101, M-101 (Comp. Ex.) | A | C |
| LM-102, M-102 (Comp. Ex.) | C | A |
| LM-103, M-103 (Comp. Ex.) | B | A |
| LM-104, M-104 (Comp. Ex.) | A | C |
| LM-105, M-105 (Invention) | A | A |
| LM-106, M-106 (Invention) | A | A |
| LM-107, M-107 (Invention) | A | A |
| LM-108, M-108 (Invention) | A | A |

The results in the table indicate that the systems with the use of the ink sets according to the invention are superior to the comparative examples in bronzing and bleeding of M.

Example 2

Deionized water was added to the following components to give a total volume of 1 L. Then the mixture was heated to 30 to 40° C. under stirring for 1 hour. Next, it was filtered through a microfilter of 0.25 μm in average pore size under reduced pressure to thereby prepare a yellow ink solution Y-101.

[Formulation of Yellow Ink Y-101]

(Solid Components)

| (Solid components) | |
|---|---|
| Yellow colorant (YI-58) | 35 g/l |
| Urea | 10 g/l |
| (Liquid components) | |
| Triethylene glycol monobutyl ether (TGB) | 100 g/l |
| Glycerol (GR) | 115 g/l |

-continued

| | |
|---|---|
| Diethylene glycol (DEG) | 70 g/l |
| Triethanolamine (TEA) | 8 g/l |
| SURFYNOL STG (SW) | 10 g/l |

Moreover, inks Y-102 to 108 were prepared respectively in accordance with the formulations of Y-101 but adding the following additives.

TABLE 35

| | Surfactant | |
|---|---|---|
| Y-101 (Comp. Ex.) | SW 10 g/l | |
| Y-102 (Comp. Ex.) | X1-1 10 g/l | |
| Y-103 (Comp. Ex.) | X1-1 10 g/l, POEP-1 10 g/l | |
| Y-104 (Comp. Ex.) | W4-5 10 g/l | |
| Y-105 (Invention) | X1-1 10 g/l, SW | 10 g/l |
| Y-106 (Invention) | X1-1 10 g/l, W4-5 | 10 g/l |
| Y-107 (Invention) | X1-4 10 g/l, SW | 10 g/l |
| Y-108 (Invention) | X1-4 10 g/l, W4-5 | 10 g/l |

POEP-1: polyoxyethylene nonyl phenyl ether (PEO chain average 30)

These inks were packed in yellow ink cartridges of an ink jet printer Model PM-950C (EPSON). Using inks of PM-950C in other colors, a monocolor yellow image was printed. As an image-receiving sheet, use was made of a glossy inkjet photopaper EX manufactured by Fuji Photo Film Co., Ltd. The evaluation was made as in Example 1.

(Evaluation Experiment)

[1] Evaluation of Printing Qualities (Bronzing)

To evaluate printing qualities in a high-density part, an image pattern, in which seven colors C, M, Y, B, G, R and Bk showed changes in density gradually 8 steps, was formed using a software Adobe Photoshop 7 and then this pattern was printed at 15° C. under 80% RH.

In the evaluation, A means a case wherein a glossy print image was obtained from the low density part to the high density part; B means a case wherein 1 to 3 opaque points were observed in an image; and C means a case wherein 4 or more opaque points were observed.

[2] Evaluation of Image Fastness (Bleeding) Under Highly Humid Conditions

To evaluate bleeding of an image under highly humid conditions, a print pattern wherein 4 yellow squares (3 cm×3 cm) were arranged in 2 lows at intervals of 1 mm both in length and breadth was formed. After storing this image sample at 25° C. under 90% RH for 72 hours, bleeding of the dye into the white spaces was observed. In the evaluation, A means a case wherein an increase in the yellow density in the white spaces through a status A yellow filter was 0.01 or less compared with the case immediately after printing; B means a case wherein the increase was from 0.01 to 0.05; C means a case wherein the increase was 0.05 or more; and D means a case wherein serious bleeding of yellow was observed in the whole image.

The following table shows the obtained results.

TABLE 36

| | Bronzing | Y bleeding |
|---|---|---|
| EPSON genuine ink (PM-950C) | A | B |
| Y-101 (Comp. Ex.) | A | C |
| Y-102 (Comp. Ex.) | C | A |
| Y-103 (Comp. Ex.) | B | A |
| Y-104 (Comp. Ex.) | A | C |
| Y-105 (Invention) | A | A |
| Y-106 (Invention) | A | A |
| Y-107 (Invention) | A | A |
| Y-108 (Invention) | A | A |

The results in the table indicate that the systems with the use of the ink sets according to the invention are superior to the comparative examples in bronzing and bleeding of Y.

Using an ink set containing the inks LM-106, M-106 and Y-106 produced in Examples 1 and 2, a usual photographic image was also printed.

The effects of the invention could be observed in the image printed with the use of this ink set too.

The same effects could be achieved by using the ink and ink set according to the invention in a thermal inkjet printer.

According to the invention, an inkjet ink, an ink set and an inkjet recording method showing little bleeding of an image even under highly humid conditions can be provided.

Example 2-1

Deionized water was added to the following components to give a total volume of 1 L. Then the mixture was heated to 30 to 40° C. under stirring for 1 hour. Next, it was filtered through a microfilter of 0.25 μm in average pore size under reduced pressure to thereby prepare a light magenta ink solution 2-LM-101.

[Formulation of Light Magenta Ink 2-LM-101]

(Solid Components)

| | |
|---|---|
| (Solid components) | |
| Magenta colorant (MD-1) | 7.5 g/l |
| Urea | 37 g/l |
| (Liquid components) | |
| Diethylene glycol (DEG) | 140 g/l |
| Glycerol (GR) | 120 g/l |
| Triethylene glycol monobutyl ether (TGB) | 120 g/l |
| Triethanolamine (TEA) | 6.9 g/l |
| SURFYNOL STG (SW) | 10 g/l |

Further, a magenta ink solution 2-M-101 was prepared in accordance with the above formulation but increasing the magenta colorant (MD-1) content to 23 g.

[Formulation of Magenta Ink 2-M-101]

(Solid Components)

| | |
|---|---|
| (Solid components) | |
| Magenta colorant (MD-1) | 23 g/l |
| Urea | 37 g/l |
| (Liquid components) | |
| Diethylene glycol (DEG) | 140 g/l |
| Glycerol (GR) | 120 g/l |
| Triethylene glycol monobutyl ether (TGB) | 120 g/l |
| Triethanolamine (TEA) | 6.9 g/l |
| SURFYNOL STG (SW) | 10 g/l |

Moreover, inks 2-LM-102 to 108 and 2-M-102 to 108 were prepared respectively in accordance with the formulations of 2-LM-101 and 2-M-101 but adding the following additives.

TABLE 2-31

| | Surfactant (common to inks 2-LM and 2-M) |
|---|---|
| 2-LM-101, 2-M-101 (Comp. Ex.) | SW 10 g/l |
| 2-LM-102, 2-M-102 (Comp. Ex.) | X1-1 10 g/l |
| 2-LM-103, 2-M-103 (Comp. Ex.) | X1-8 10 g/l |
| 2-LM-104, 2-M-104 (Comp. Ex.) | X2-6 10 g/l |
| 2-LM-105, 2-M-105 (Invention) | X1-3 5 g/l, X1-8 5 g/l |
| 2-LM-106, 2-M-106 (Invention) | X1-3 10 g/l, X2-6 5 g/l |
| 2-LM-107, 2-M-107 (Invention) | X1-3 4 g/l, X1-8 3 g/l, X2-6 3 g/l |
| 2-LM-108, 2-M-108 (Invention) | X1-3 2 g/l, X1-8 2 g/l, X2-6 6 g/l |

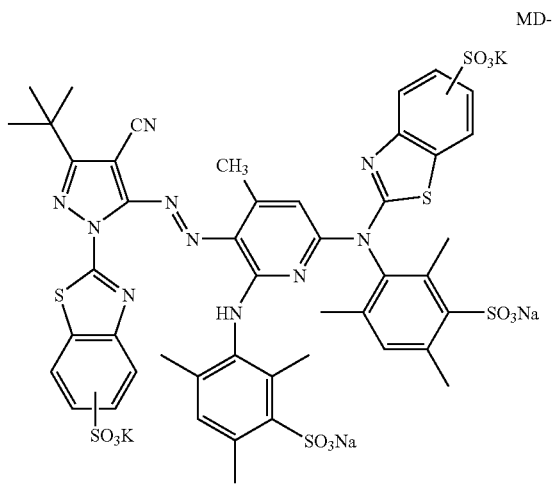

MD-1

These inks were packed in magenta ink and light magenta ink cartridges of an ink jet printer Model PM-950C (EPSON). Using inks of PM-950C in other colors, a monocolor magenta image was printed. As an image-receiving sheet, use was made of a glossy inkjet photopaper GASAI manufactured by Fuji Photo Film Co., Ltd. The image qualities and image fastness under highly humid conditions were evaluated.

(Evaluation Experiment)

[1] Evaluation of Printing Qualities (Bronzing)

To evaluate printing qualities in a high-density part, an image pattern, in which seven colors C, M, Y, B, G, R and Bk showed changes in density gradually 8 steps, was formed using a software Adobe Photoshop 7 and then this pattern was printed at 15° C. under 80% RH.

In the evaluation, A means a case wherein a glossy print image was obtained from the low density part to the high density part; B means a case wherein 1 to 3 opaque points were observed in an image; and C means a case wherein 4 or more opaque points were observed.

[2] Evaluation of Image Fastness (Bleeding) Under Highly Humid Conditions

To evaluate bleeding of an image under highly humid conditions, a print pattern wherein 4 magenta squares (3 cm×3 cm) were arranged in 2 lows at intervals of 1 mm both in length and breadth was formed. After storing this image sample at 25° C. under 90% RH for 72 hours, bleeding of the dye into the white spaces was observed. In the evaluation, A means a case wherein an increase in the magenta density in the white spaces through a status A magenta filter was 0.01 or less compared with the case immediately after printing; B means a case wherein the increase was from 0.01 to 0.05; C means a case wherein the increase was 0.05 or more; and D means a case wherein serious bleeding of magenta was observed in the whole image.

The following table shows the obtained results.

TABLE 2-32

| | Bronzing | M bleeding |
|---|---|---|
| EPSON genuine ink (PM-950C) | A | B |
| 2-LM-101, 2-M-101 (Comp. Ex.) | A | C |
| 2-LM-102, 2-M-102 (Comp. Ex.) | C | A |
| 2-LM-103, 2-M-103 (Comp. Ex.) | B | A |
| 2-LM-104, 2-M-104 (Comp. Ex.) | A | A |
| 2-LM-105, 2-M-105 (Invention) | A | A |
| 2-LM-106, 2-M-106 (Invention) | A | A |
| 2-LM-107, 2-M-107 (Invention) | A | A |
| 2-LM-108, 2-M-108 (Invention) | A | A |

The results in the table indicate that the systems with the use of the ink sets according to the invention are superior to the comparative examples in bronzing and bleeding of M.

Example 2-2

Deionized water was added to the following components to give a total volume of 1 L. Then the mixture was heated to 30 to 40° C. under stirring for 1 hour. Next, it was filtered through a microfilter of 0.25 μm in average pore size under reduced pressure to thereby prepare a yellow ink solution 2-Y-101.

[Formulation of Yellow Ink 2-Y-101]

| (Solid components) | |
|---|---|
| Yellow colorant (YI-58) | 35 g/l |
| Urea | 10 g/l |
| (Liquid components) | |
| Triethylene glycol monobutyl ether (TGB) | 100 g/l |
| Glycerol (GR) | 115 g/l |
| Diethylene glycol (DEG) | 70 g/l |
| Triethanolamine (TEA) | 8 g/l |
| SURFYNOL STG (SW) | 10 g/l |

Moreover, inks 2-Y-102 to 2-108 were prepared respectively in accordance with the formulations of 2-Y-101 but adding the following additives.

TABLE 2-33

| | Surfactant |
|---|---|
| 2-Y-101 (Comp. Ex.) | SW 10 g/l |
| 2-Y-102 (Comp. Ex.) | X1-3 10 g/l |
| 2-Y-103 (Comp. Ex.) | X1-8 10 g/l |
| 2-Y-104 (Comp. Ex.) | X2-3 10 g/l |
| 2-Y-105 (Invention) | X1-3 5 g/l, SW 10 g/l |
| 2-Y-106 (Invention) | X1-1 10 g/l, X1-8 5 g/l |
| 2-Y-107 (Invention) | X1-3 5 g/l, X2-3 5 g/l |
| 2-Y-108 (Invention) | X1-3 2 g/l, X1-8 2 g/l, X2-3 6 g/l |

YD-1

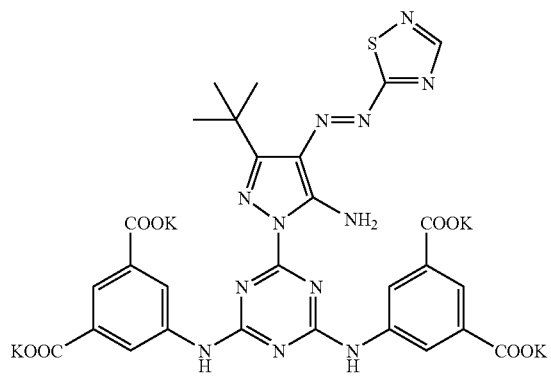

These inks were packed in yellow ink cartridges of an ink jet printer Model PM-950C (EPSON). Using inks of PM-950C in other colors, a monocolor yellow image was printed. As an image-receiving sheet, use was made of a glossy inkjet photopaper EX manufactured by Fuji Photo Film Co., Ltd. The evaluation was made as in Example 2-1.

(Evaluation Experiment)

[1] Evaluation of Printing Qualities (Bronzing)

To evaluate printing qualities in a high-density part, an image pattern, in which seven colors C, M, Y, B, G, R and Bk showed changes in density gradually 8 steps, was formed using a software Adobe Photoshop 7 and then this pattern was printed at 15° C. under 80% RH.

In the evaluation, A means a case wherein a glossy print image was obtained from the low density part to the high density part; B means a case wherein 1 to 3 opaque points were observed in an image; and C means a case wherein 4 or more opaque points were observed.

[2] Evaluation of Image Fastness (Bleeding) Under Highly Humid Conditions

To evaluate bleeding of an image under highly humid conditions, a print pattern wherein 4 yellow squares (3 cm×3 cm) were arranged in 2 lows at intervals of 1 mm both in length and breadth was formed. After storing this image sample at 25° C. under 90% RH for 72 hours, bleeding of the dye into the white spaces was observed. In the evaluation, A means a case wherein an increase in the yellow density in the white spaces through a status A yellow filter was 0.01 or less compared with the case immediately after printing; B means a case wherein the increase was from 0.01 to 0.05; C means a case wherein the increase was 0.05 or more; and D means a case wherein serious bleeding of yellow was observed in the whole image.

The following table shows the obtained results.

TABLE 2-34

|  | Bronzing | Y bleeding |
| --- | --- | --- |
| EPSON genuine ink (PM-950C) | A | B |
| 2-Y-101 (Comp. Ex.) | A | C |
| 2-Y-102 (Comp. Ex.) | C | A |
| 2-Y-103 (Comp. Ex.) | B | A |
| 2-Y-104 (Comp. Ex.) | A | C |
| 2-Y-105 (Invention) | A | A |
| 2-Y-106 (Invention) | A | A |
| 2-Y-107 (Invention) | A | A |
| 2-Y-108 (Invention) | A | A |

The results in the table indicate that the systems with the use of the ink sets according to the invention are superior to the comparative examples in bronzing and bleeding of 2-Y.

Using an ink set containing the inks 2-LM-106, 2-M-106 and 2-Y-106 produced in Examples 2-1 and 2-2, a usual photographic image was also printed.

The effects of the invention could be observed in the image printed with the use of this ink set too.

The same effects could be achieved by using the ink and ink set according to the invention in a thermal inkjet printer.

According to the invention, an inkjet ink and an ink set showing neither bronzing nor bleeding of Y even under highly humid conditions can be provided.

This application is based on Japanese Patent application JP 2003-80677, filed Mar. 24, 2003, and Japanese Patent application JP 2003-80828, filed Mar. 24, 2003, the entire contents of those are hereby incorporated by reference, the same as if set forth at length.

What is claimed is:

1. An ink containing water, a water-soluble organic solvent, a dye, a non-ionic surfactant and a betaine compound, wherein the dye has at least two heterocyclic groups and at least one of the heterocyclic groups contains at least one of pyridine, thiophene, thiazole, benzothiazole, benzoxazole and furan rings.

2. The ink according to claim 1, wherein the betaine compound is a compound represented by the following formula (1):

$$(R^k)_p\text{-N-}[L^m\text{-}(COOM)_q]_r \tag{1}$$

wherein R represents a hydrogen atom, an alkyl group, an aryl group or a heterocyclic group; L represents a divalent linking group; M represents a hydrogen atom, an alkali metal atom, an ammonium group, a protonated organic amine- or nitrogen-containing heterocyclic group or a quaternary ammonium ion group, provided that when p+r is 4, one of M's is not present; q is an integer of 1 or more, r is an integer of from 1 to 4, k is an integer of from 0 to 4, m is an integer of 1 or more, and p is an integer of from 0 to 4, provided that p+r is 3 or 4; in a case where p+r is 4, the N atom is a protonated ammonium atom; in a case where m is 2 or more, L's may be either the same or different; in a case where q is 2 or more, COOM's may be either the same or different; in a case where r is 2 or more, $L^m\text{-}(COOM)_q$'s may be either the same or different; in a case where k is 2 or more, R's may be either the same or different; and in a case where p is 2 or more, $R^k$'s may be either the same or different.

3. The ink according to claim 1, wherein the nonionic surfactant is a compound selected from compounds represented by the following formulae (2) to (4):

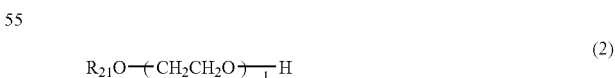
(2)

wherein $R_{21}$ represents an alkyl group having from 5 to 40 carbon atoms; and $m^1$ represents an average number of ethylene oxide moles added which ranges from 2 to 40;

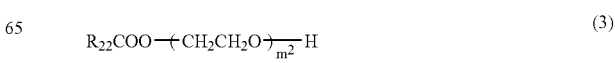
(3)

wherein $R_{22}$ represents an alkyl group having from 5 to 40 carbon atoms; and $m^2$ represents an average number of ethylene oxide moles added which ranges from 2 to 40; and

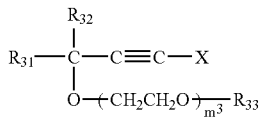

(4)

wherein $R_{31}$ and $R_{32}$ each independently represent an alkyl group having from 1 to 18 carbon atoms; $R_{33}$ represents a hydrogen atom, an alkyl group having from 1 to 6 carbon atoms or a phenyl group; and X represents a hydrogen atom or

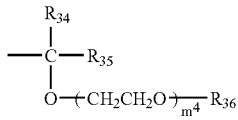

wherein $R_{34}$ and $R_{35}$ each independently represent an alkyl group having from 1 to 18 carbon atoms; $R_{36}$ represents a hydrogen atom, an alkyl group having from 1 to 6 carbon atoms or a phenyl group; and $m^3$ and $m^4$ each independently represent an average number of ethylene oxide moles added provided that $m^3+m^4$ is from 0 to 100;

in a case where $m^3$ is 0, $R_{33}$ represents a hydrogen atom; in a case where $m^4$ is 0, $R_{36}$ represents a hydrogen atom; and in a case where X is a hydrogen atom, $m^3$ is from 1 to 100.

4. The ink according to claim 1, wherein the betaine compound is a compound which has both of a cationic site and an anionic site in its molecule.

5. The ink according to claim 1, wherein the betaines has a cationic site is selected from the group consisting of an aminic nitrogen atom, a nitrogen atom in an aromatic heterocycle, a boron atom having 4 carbon-bonds, and a phosphorus atom and an anionic site selected from the group consisting of a hydroxyl group, a thio group, a sulfonamido group, a sulfo group, a carboxyl group, an imido group, a phosphate group, and a phosphonate group.

6. The ink according to claim 1, wherein the dye has an oxidation potential nobler than 1.0 V (vs. SCE).

7. The ink according to claim 1, wherein the dye is a phthalocyanine dye containing at least one of —SO—, —$SO_2$—, —CO— and —$CO_2$—.

8. An ink set containing at least one ink according to claim 1.

9. An inkjet recording method wherein an image is recorded with an inkjet printer by using at least one of (a) an ink containing water, a water-soluble organic solvent, a dye, a betaine compound and a nonionic surfactant and (b) an ink set containing at least one ink containing water, a water-soluble organic solvent, a dye, a betaine compound and a nonionic surfactant, wherein the dye in (a) and (b) has at least two heterocyclic groups and at least one of the heterocyclic groups contains at least one of pyridine, thiophene, thiazole, benzothiazole, benzoxazole and furan rings.

10. The ink according to claim 1, wherein the ink contains at least two different betaine compounds.

11. An ink set containing at least one ink according to claim 10.

12. An inkjet recording method wherein an image is recorded with an inkjet printer by using at least one of (a) an ink containing water, a water-soluble organic solvent, a dye and at least two different betaine compounds an ink set containing at least one ink containing water, a water-soluble organic solvent, a dye and at least two different betaine compounds, wherein the dye in (a) and (b) has at least two heterocyclic groups and at least one of the heterocyclic groups contains at least one of pyridine, thiophene, thiazole, benzothiazole, benzoxazole and furan rings.

* * * * *